United States Patent
Fu et al.

(10) Patent No.: US 11,997,341 B2
(45) Date of Patent: May 28, 2024

(54) DISPLAY APPARATUS AND METHOD FOR PERSON RECOGNITION AND PRESENTATION

(71) Applicant: HISENSE VISUAL TECHNOLOGY CO., LTD., Shandong (CN)

(72) Inventors: Yansong Fu, Shandong (CN); Yazhou Meng, Shandong (CN); Kejing Lu, Shandong (CN); Congcong Mu, Shandong (CN)

(73) Assignee: Hisense Visual Technology Co., Ltd., Qingdao (CN)

( * ) Notice: Subject to any disclaimer, the term of this patent is extended or adjusted under 35 U.S.C. 154(b) by 0 days.

(21) Appl. No.: 17/950,747

(22) Filed: Sep. 22, 2022

(65) Prior Publication Data

US 2023/0018502 A1    Jan. 19, 2023

Related U.S. Application Data

(63) Continuation of application No. PCT/CN2021/102287, filed on Jun. 25, 2021.

(30) Foreign Application Priority Data

Jul. 14, 2020    (CN) .......................... 202010673447.0
Jul. 14, 2020    (CN) .......................... 202010673819.X
(Continued)

(51) Int. Cl.
*H04N 21/41*    (2011.01)
*G06F 16/58*    (2019.01)
*G06V 40/16*    (2022.01)

(52) U.S. Cl.
CPC ..... *H04N 21/4104* (2013.01); *G06F 16/5866* (2019.01); *G06V 40/172* (2022.01)

(58) Field of Classification Search
CPC ......... H04N 21/23418; H04N 21/4104; H04N 21/44218; G06F 16/535; G06F 16/5854;
(Continued)

(56) References Cited

U.S. PATENT DOCUMENTS

2006/0107301 A1* 5/2006 Leibbrandt ........... H04L 69/168
348/E7.054
2014/0229990 A1    8/2014 Kim et al.
(Continued)

FOREIGN PATENT DOCUMENTS

CN    102542299 A    7/2012
CN    103051934 A    4/2013
(Continued)

OTHER PUBLICATIONS

"SATO, Face checking system (Mar. 24, 2005, JP-2005078590-A" English translation (Year: 2005).*
(Continued)

*Primary Examiner* — Rong Le
(74) *Attorney, Agent, or Firm* — Meunier Carlin & Curfman LLC

(57) ABSTRACT

Provided are a display apparatus and a person recognition and presentation method. The display apparatus includes a display and a controller that is in communication with the display. The controller is configured to: associated information of a display interface of the display and generate a scenario image for recognition in response to a user command; obtain facial feature information for recognition in the scenario image; obtain similar facial feature information when a matching confidence level of pre-stored facial feature information in a database with the facial feature information for recognition does not exceed a preset confidence level; obtain average-person recognition data; generate a sharing control uniquely matching with the facial feature
(Continued)

information for recognition; and control the display to present the average-person recognition data and the sharing control on a current display interface.

19 Claims, 27 Drawing Sheets

(30) Foreign Application Priority Data

Dec. 11, 2020 (CN) .......................... 202011459807.3
Dec. 11, 2020 (CN) .......................... 202011461720.X

(58) Field of Classification Search
CPC .. G06F 16/5866; G06V 10/235; G06V 20/41; G06V 40/172
See application file for complete search history.

(56) References Cited

U.S. PATENT DOCUMENTS

| | | | |
|---|---|---|---|
| 2016/0295291 A1 | 10/2016 | Oh et al. | |
| 2018/0075289 A1 | 3/2018 | Zhang et al. | |
| 2019/0138815 A1 | 5/2019 | Dai et al. | |
| 2019/0197316 A1* | 6/2019 | Bornfreedom | H04N 21/8549 |
| 2019/0306671 A1* | 10/2019 | Rivkin | H04W 4/12 |
| 2020/0275048 A1 | 8/2020 | Fu et al. | |
| 2021/0248356 A1* | 8/2021 | Gu | G06F 18/22 |
| 2023/0290177 A1* | 9/2023 | Jacobs | G06V 40/16 |
| | | | 709/204 |

FOREIGN PATENT DOCUMENTS

| | | | |
|---|---|---|---|
| CN | 103051942 A | | 4/2013 |
| CN | 103425993 A | | 12/2013 |
| CN | 103986973 A | | 8/2014 |
| CN | 104463177 A | | 3/2015 |
| CN | 106649710 A | | 5/2017 |
| CN | 106708823 A | | 5/2017 |
| CN | 107105340 A | | 8/2017 |
| CN | 107454305 A | | 12/2017 |
| CN | 107563336 A | | 1/2018 |
| CN | 107563897 A | | 1/2018 |
| CN | 108040125 A | | 5/2018 |
| CN | 108259973 A | | 7/2018 |
| CN | 108848419 A | | 11/2018 |
| CN | 109151502 A | | 1/2019 |
| CN | 109271982 A | | 1/2019 |
| CN | 109299326 A | | 2/2019 |
| CN | 109771936 A | | 5/2019 |
| CN | 109858371 A | | 6/2019 |
| CN | 109922363 A | | 6/2019 |
| CN | 110245572 A | | 9/2019 |
| CN | 111461097 A | | 7/2020 |
| CN | 111818378 A | | 10/2020 |
| CN | 112580625 A | | 3/2021 |
| CN | 112601117 A | | 4/2021 |
| JP | 2005078590 A | | 3/2005 |
| JP | 2005078590 A | * | 3/2005 |
| JP | 2010166212 A | | 7/2010 |
| WO | 2017088340 A1 | | 6/2017 |
| WO | 2020113020 A1 | | 6/2020 |

OTHER PUBLICATIONS

Chinese Second Office Action, 2023013000577650, dated Jan. 30, 2023.

* cited by examiner

DISPLAY APPARATUS AND METHOD FOR PERSON RECOGNITION AND PRESENTATION

CROSS-REFERENCE OF RELATED APPLICATIONS

The application is a continuation application of International Application No. PCT/CN2021/102287 filed on Jun. 25, 2021, which claims the priorities from Chinese Patent Applications No. 202010673447.0 filed on Jul. 14, 2020, No. 202010673819.X filed on Jul. 14, 2020, No. 202011459807.3 filed on Dec. 11, 2020, and No. 202011461720.X filed on Dec. 11, 2020, which are hereby incorporated by reference in their entireties.

TECHNICAL FIELD

The disclosure relates to display technology, and in particular, to a display apparatus and a method for person recognition and presentation.

BACKGROUND

A smart TV is a television set with integrated audio/video function, entertainment function, and data communication function, and can realize human-machine interaction. In order to meet the various demands of users, the operators are committed to developing various convenient functions that are convenient for use, to improve the use experience of the smart TVs.

At present, when a user watches a movie through a smart TV, he or she can take a screenshot of the currently displayed interface through a remote controller or send the relevant information of the currently displayed interface to a server by other means. The server recognizes the scene-related information such as persons, commodities or locations on the display interface, and sends relevant scene information to the smart TV, so that the smart TV can display the relevant scene information for the user to view or select, etc.

SUMMARY

In some embodiments of the disclosure, a display apparatus is disclosed, including: a display, a user input interface configured to receive a command from a user; and a controller in communication with the display and the user input interface. The controller being configured to: while the display is presenting a display interface, receive a command for information on the display interface, where the information on the display interface includes one or more person objects; in response to the command for information on the display interface, obtain associated information on the display interface and generate a scene image for recognition; obtain facial feature information for recognition corresponding to the one or more person objects in the scene image; in response to a matching confidence level of pre-stored facial feature information in a database with the facial feature information for recognition not exceeding a preset confidence level, obtain similar facial feature information, where the similar facial feature information is first pre-stored facial feature information whose matching confidence level with the facial feature information for recognition satisfies a preset condition, and the database is configured in a server and includes a collection of pieces of pre-stored facial feature information; obtain average-person recognition data, where the average-person recognition data is presentation data corresponding to a person recognized in the scene image, and the average-person recognition data includes presentation data corresponding to the facial feature information for recognition and presentation data corresponding to the similar facial feature information; generate a sharing control for the facial feature information for recognition, where the sharing control is configured for sharing the average-person recognition data and available for selection from a user; and control the display to present the average-person recognition data and the sharing control on an interface.

In some embodiments of the disclosure, a method for person recognition and presentation is disclosed. The method includes: while a display of a display apparatus is presenting a display interface, receiving a command for information on the display interface via a user input interface of the display apparatus, where the information on the display interface includes one or more person objects; in response to the command for information on the display interface, obtaining associated information on the display interface and generating a scene image for recognition; obtaining facial feature information for recognition corresponding to the one or more person objects in the scene image; in response to a matching confidence level of pre-stored facial feature information in a database with the facial feature information for recognition not exceeding a preset confidence level, obtaining similar facial feature information, where the similar facial feature information is first pre-stored facial feature information whose matching confidence level with the facial feature information for recognition satisfies a preset condition, and the database is configured in a server and includes a collection of pieces of pre-stored facial feature information; obtaining average-person recognition data, where the average-person recognition data is presentation data corresponding to a person recognized in the scene image, and the average-person recognition data includes presentation data corresponding to the facial feature information for recognition and presentation data corresponding to the similar facial feature information; generating a sharing control for the facial feature information for recognition, where the sharing control is configured for sharing the average-person recognition data and available for selection from a user; and controlling the display to present the average-person recognition data and the sharing control on an interface.

DETAILED DESCRIPTION

In order to make the purposes, embodiments and advantages of the disclosure clearer, the embodiments of the disclosure will be described clearly and completely below in combination with the accompanying drawings in embodiments of the disclosure. Obviously the described embodiments are only some but not all the embodiments.

It should be noted that the brief description of the terms in the disclosure is only for the convenience of understanding the embodiments described hereafter, and is not intended to limit the embodiments of the disclosure. Unless indicated otherwise, these terms should be understood according to the plain and ordinary meanings.

The terms such as "first", "second", etc. in the specification, claims and drawings of the disclosure are used to distinguish similar objects, but not necessarily to describe a particular order or sequence, unless otherwise indicated. It should be understood that the terms used in this way is interchangeable under appropriate circumstances, for example, it can be implemented in an order other than those given in the illustration or description of the embodiments of the disclosure.

The term "remote controller" used in the present application refers to a component of an electronic device (such as the display device disclosed in the present application), which can generally control the electronic device wirelessly within a relatively short distance range. This component is generally be connected with the electronic device by using the infrared ray and/or Radio Frequency (RF) signal and/or Bluetooth, and may also include the WiFi, wireless USB, Bluetooth, motion sensor and other functional modules. For example, the handheld touch remote controller uses a user interface in the touch screen to replace most of the physical built-in keys on the general remote control device.

Figure 1:
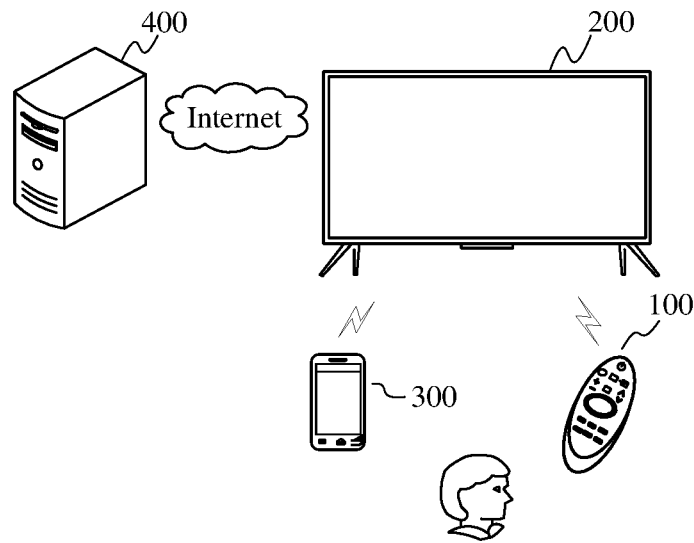
FIG. 1 shows a schematic diagram illustrating an operation scenario between a display apparatus and a control device according to some embodiments.

FIG. 1 shows a schematic diagram illustrating an operation scenario between a display apparatus and a control device according to some embodiments. As shown in FIG. 1, a user can operate the display device 200 through the mobile terminal 300 and the control device 100.

In some embodiments, the control device 100 may be a remote controller, which includes the infrared protocol communication or Bluetooth protocol communication and other short-range communication methods, etc., and controls the display device 200 wirelessly or by other wired methods.

In some embodiments, a mobile terminal, tablet computer, computer, laptop and other smart devices may also be used to control the display device 200.

In some embodiments, the mobile terminal 300 and the display device 200 may install software applications, and implement the connection and communication through the network communication protocols, achieving the purpose of one-to-one control operation and data communication. As also shown in FIG. 1, the display apparatus 200 further performs the data communication with a server 400 through various communication methods. The display apparatus 200 may be a liquid crystal display, an OLED display, or a projection display apparatus.

In addition to the broadcast receiving television function, the display device 200 may additionally provide the smart network television function that computer supports. Exemplarily, it includes: network television, smart television, Internet Protocol television (IPTV), etc.

Figure 2:
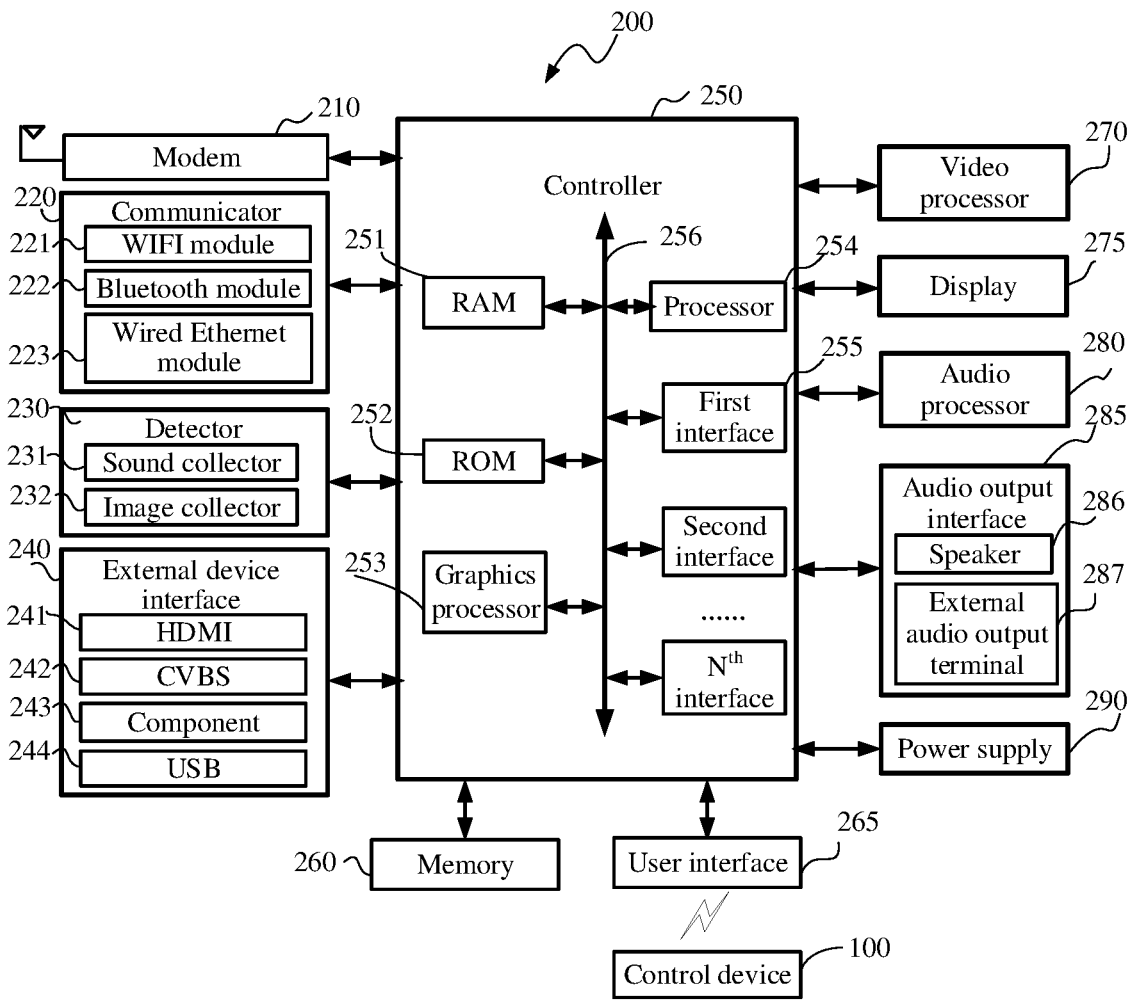
FIG. 2 shows a schematic diagram of the hardware configuration in the display apparatus 200 according to some embodiments.

FIG. 2 shows a block diagram of the hardware configuration of the display apparatus 200 according to some embodiments.

In some embodiments, the display apparatus 200 includes at least one of a controller 250, a modem 210, a communicator 220, a detector 230, an input/output interface 255, a display 275, an audio output interface 285, a memory 260, a power supply 290, a user interface 265 and an external device interface 240.

In some embodiments, the display 275 is a component for receiving image signals output from a first processor and displaying the video content and images as well as a menu control interface.

In some embodiments, depending on the type of the display 275, a drive component for driving the display is also included.

In some embodiments, the display 275 is a projection display, and may also include a projection device and a projection screen.

In some embodiments, the communicator 220 is a component for communicating with an external device or external server according to various types of communication protocols. The display apparatus 200 may establish the sending and receiving of control signals and data signals with an external control device 100 or content providing device through the communicator 220. The user interface 265 may be used to receive infrared control signals from the control device 100 (e.g., an infrared remote controller, etc.). The detector 230 is used by the display apparatus 200 to collect the external environment or interactive signals with the outside.

In some embodiments, the detector 230 may further include an image collector, such as camera, webcam, etc., which may be used to collect the external environment scenes and to collect the user attributes or interact gestures with the user, may adaptively change the display parameters, and may also identify the user gestures to achieve the function of interaction with the user.

The detector 230 may also include a temperature sensor or the like, such as by sensing the ambient temperature.

The detector 230 may also include a sound collector or the like, such as a microphone, which may be used to receive the user's voice, exemplarily including a voice signal of the user's command to control the display apparatus 200, or collect the environmental sounds to identify the type of the environmental scene, so that the display apparatus 200 can adapt to the environmental noise.

In some embodiments, as shown in FIG. 2, the input/output interface 255 is configured to communicate data between the controller 250 and other external device or other controller 250, for example: receive the video signal data and audio signal data or the instruction data from the external device, etc.

In some embodiments, the controller 250 controls the operations of the display apparatus and responds to the user's operations through various software programs stored in the memory. The controller 250 may control the overall operation of the display apparatus 200. For example, in response to receiving a user command for selecting a UI object displayed on the display 275, the controller 250 may perform the operations related to the object selected by the user command.

In some embodiments, the object may be any one of selectable objects, e.g., hyperlink or icon. The operations related to the selected object include, for example, the operation of displaying the connection to the hyperlink page, document, image or the like, or the operation of launching an application corresponding to the icon. The user command for selecting the UI object may be a command input through various input devices (for example, mouse, keyboard, touch pad, etc.) connected with the display apparatus 200 or a voice command corresponding to the voice uttered by the user.

As shown in FIG. 2, the controller 250 includes at least one of a Random Access Memory (RAM) 251, a Read-Only Memory (ROM) 252, a video processor 270, an audio processor 280, other processor 253 (e.g., a Graphics Processing Unit (GPU)), a Central Processing Unit (CPU) 254, a communication interface, and a communication bus 256. Here, the communication bus connects various components.

In some embodiments, when receiving a power-on signal, the power supply of the display apparatus 200 starts up, and the CPU runs the system startup commands in the ROM 252 and copies the temporary data of the operating system stored in the memory into the RAM 251, to facilitate running the operating system. When the startup of the operating system is completed, the CPU then copies the temporary data of various applications in the memory into the RAM 251, to facilitate launching or running various applications.

In some embodiments, the CPU processor 254 is used to run the operating system and application instructions stored in the memory, and run various applications, data and content according to various interactive instructions received from the outside so as to finally display and play various audio and video contents.

In some embodiments, the graphics processor 253 is used to generate various graphics objects, such as icons, operation menus, display graphics of user input commands, etc. It includes an arithmetic unit, which performs the operations by receiving various interactive commands input from users and displays various objects according to the display attributes, and includes a renderer, which renders various objects obtained based on the operator. The rendered objects are used to be displayed on the screen.

In some embodiments, the video processor 270 is configured to receive an external video signal, and process it according to the standard codec protocol of the input signal to obtain a signal that can be directly displayed or played on the display apparatus 200.

In some embodiments, the video processor 270 includes a de-multiplexing module, a video decoding module, an image synthesis module, a frame rate conversion module, a display formatting module, etc.

In some embodiments, the graphics processor 253 may be integrated with the video processor, and may process graphics signals output to the display; or the graphics processor 253 may be separated from the video processor, and may perform different functions.

In some embodiments, the audio processor 280 is used to receive an external audio signal, and perform decompression and decoding, etc. according to the standard codec protocol of the input signal, to obtain a sound signal that can be played in the speaker.

In some embodiments, the video processor 270 may include one or more chips. The audio processor may also include one or more chips.

In some embodiments, the video processor 270 and the audio processor 280 may be separate chips, or may be integrated into one or more chips together with the controller.

In some embodiments, the audio output interface receives the sound signal output from the audio processor 280 under the control of the controller 250, such as a speaker 272; may include an external audio output terminal for outputting to a speaker of an external device, such as an external audio interface or a headphone interface, etc, in addition to the speaker carried by the display apparatus 200 itself; and may also include a short-range communication module in the communication interface, such as a Bluetooth module for outputting sound from a Bluetooth speaker.

The power supply 290 provides the power supply support for the display apparatus 200 through the power input from an external power supply under the control of the controller 250. The power supply 290 may include a built-in power supply circuit installed inside the display apparatus 200, or may be a power supply installed outside the display apparatus 200, and a power interface of the external power supply is provided in the display apparatus 200.

The user interface 265 is used to receive user input signals, and then send the user input signals to the controller 250. The user input signals may be remote controller signals received through the infrared receiver, and various user control signals may be received through the network communication module.

In some embodiments, the user inputs a command through the control device 100 or the mobile terminal 300, the user input interface is based on the user's input, and the display apparatus 200 responds to the user's input through the controller 250.

In some embodiments, the user may input a user command on the Graphical User Interface (GUI) displayed on the display 275, and the user input interface receives the command through the Graphical User Interface (GUI). Alternatively, the user may input a user command by inputting the particular sound or gesture, and the user input interface recognizes the sound or gesture through the sensor to receive the command.

The memory 260 includes various software modules for driving the display apparatus 200. For example, various software modules stored in the first memory include at least one of: a basic module, a detection module, a communication module, a display control module, a browser module, and various service modules, etc.

The basic module is an underlying software module for the signal communications among various hardware in the display apparatus 200 and sending the processing and control signals to the upper modules. The detection module is a management module for collecting various information from various sensors or user input interfaces and performing digital-to-analog conversion and analysis management.

For example, the voice recognition module includes a voice parsing module and a voice command database module. The display control module is a module for controlling the display to display the image content, and can be used to play the information such as multimedia image content and UI interface. The communication module is a module for performing the control and data communications with external devices. The browser module is a module for performing the data communications among browsing servers. The service module is a module for providing various services and various applications. Meanwhile, the memory 260 is further used to store the received external data and user data, images of various items on various user interfaces, and visual effect diagrams of focus objects, etc.

Figure 3:
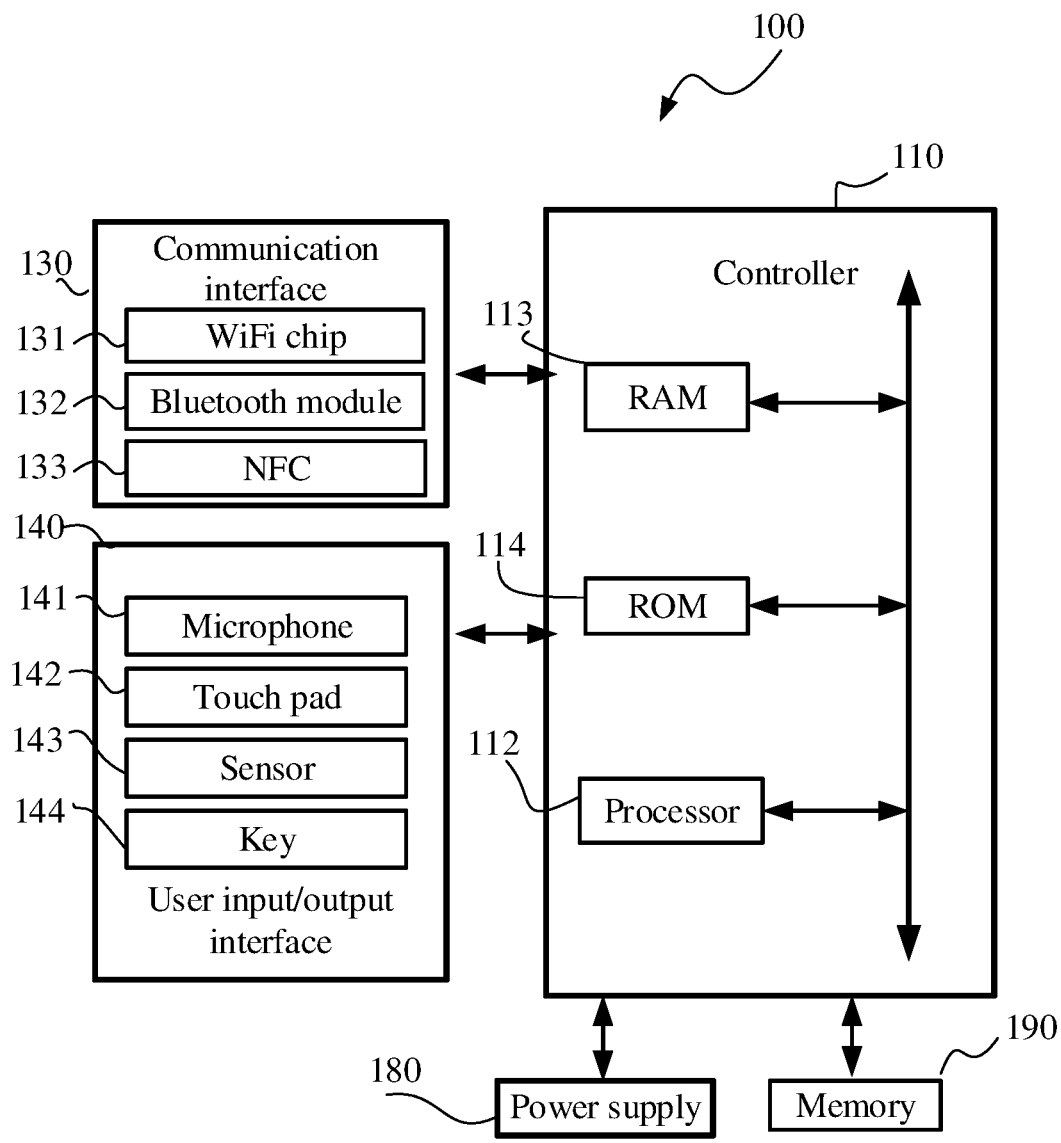
FIG. 3 shows a schematic diagram of the hardware configuration in the control device 100 according to some embodiments.

FIG. 3 shows a configuration block diagram of the control device 100 according to some embodiments. As shown in FIG. 3, the control device 100 includes a controller 110, a communication interface 130, a user input/output interface, a memory, and a power supply.

The control device 100 is configured to control the display apparatus 200, receive the input operation commands from the user, and convert the operation commands into instructions that can be recognized and responded by the display apparatus 200, playing an intermediary role between the user and the display apparatus 200. For example, the user operates the channel+/−keys on the control device 100, and the display apparatus 200 responds to the channel+/−operations.

In some embodiments, the control device 100 may be a smart device. For example, the control device 100 may install various applications for controlling the display apparatus 200 according to the user requirement.

In some embodiments, as shown in FIG. 1, the mobile terminal 300 or another smart electronic device may perform the function similar to the control device 100 after installing an application for controlling the display apparatus 200. For example, the user may provide various function keys or virtual buttons on the graphical user interface of the mobile terminal 300 or another smart electronic device by installing applications, to realize the functions of the physical keys on the control device 100.

The controller 110 includes a processor 112, an RAM 113, a ROM 114, a communication interface 130, and a communication bus. The controller is used to control the running and operations of the control device 100, and the communication cooperation among internal components as well as the external and internal data processing functions.

The communication interface 130 realizes the communications of control signals and data signals with the display apparatus 200 under the control of the controller 110. For example, the received user input signal is sent to the display apparatus 200. The communication interface 130 may include at least one of a WiFi chip 131, a Bluetooth module 132, an NFC module 133 and other near field communication modules.

In the user input/output interface 140, the input interface includes at least one of a microphone 141, a touch panel 142, a sensor 143, a key 144 and other input interfaces.

The input interface includes an interface for sending the received user command to the display apparatus 200. In some embodiments, it may be an infrared interface or a radio frequency interface.

In some embodiments, the control device 100 includes at least one of the communication interface 130 and the input/output interface 140. The communication interface 130 is configured in the control device 100, and may encode the command input from the user according to the WiFi protocol, Bluetooth protocol or NFC protocol and send it to the display apparatus 200.

The memory 190 is used to store various operating programs, data and applications that drive and control the control device 100 under the control of the controller. The memory 190 may store various kinds of control signal commands input from the user.

The power supply 180 is used to provide operating power support for all the elements in the control device 100 under the control of the controller. It may be a battery and a related control circuit.

Figure 4:
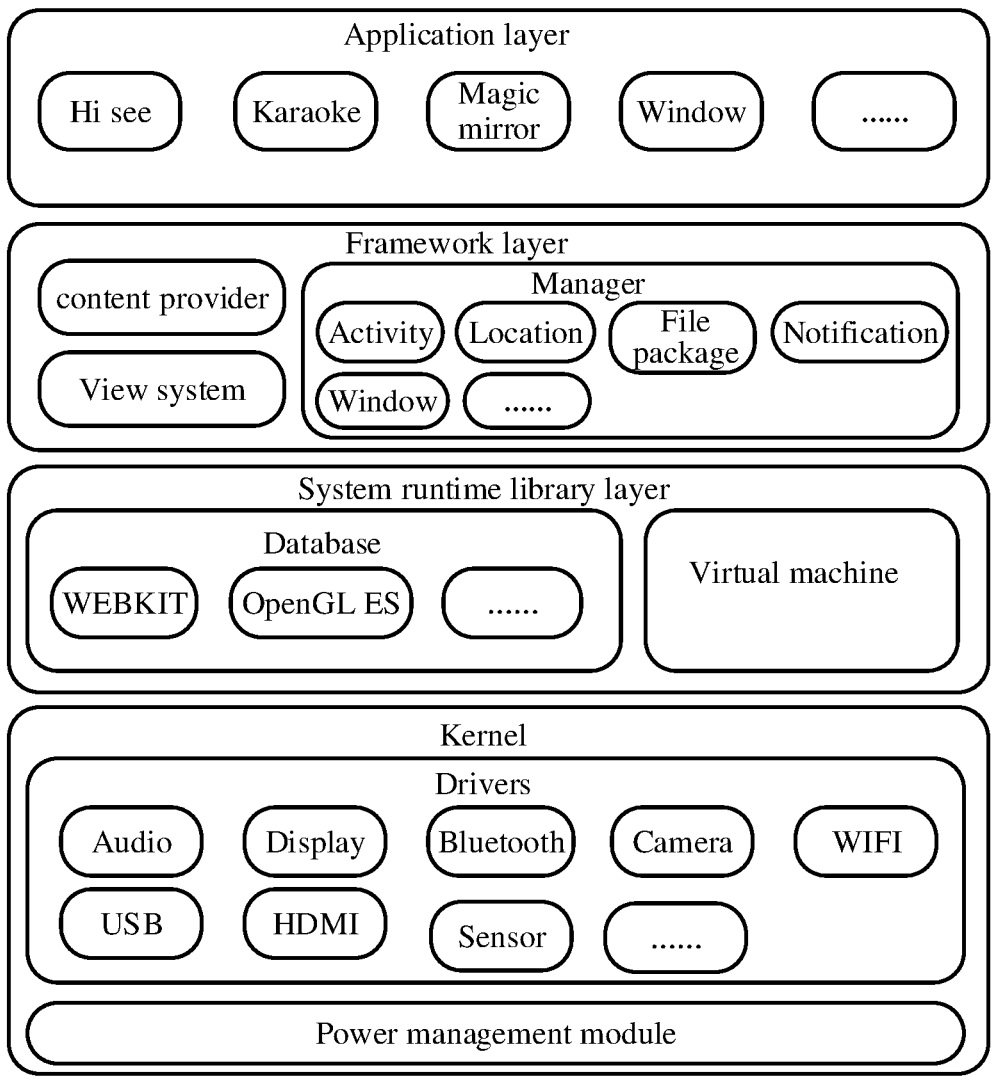
FIG. 4 shows a schematic diagram of the software configuration in the display apparatus 200 according to some embodiments.

Referring to FIG. 4, in some embodiments, the system is divided into four layers, which are, from top to bottom, an applications layer (referred to as "application layer" for short), an application framework layer (referred to as "framework layer" for short), an Android runtime and system library layer (referred to as "system runtime library layer" for short), and a kernel layer.

As shown in FIG. 4, the application framework layer in embodiments of the disclosure includes a manager, a content provider, etc., where the manager includes at least one of: an Activity Manager used to interact with all activities running in the system; a Location Manager used to provide system services or applications with access to system location services; a Package Manager used to retrieve various information related to application packages currently installed on the device; a Notification Manager used to control the display and clearing of notification messages; a Window Manager used to manage icons, windows, toolbars, wallpapers and Desktop widget on the user interface.

In some embodiments, the kernel layer is a layer between hardware and software. As shown in FIG. 4, the kernel layer at least includes at least one of: audio driver, display driver, Bluetooth driver, camera driver, WIFI driver, USB driver, HDMI driver, sensor driver (such as fingerprint sensor, temperature sensor, touch sensor, pressure sensor, etc.), etc.

In some embodiments, the kernel layer further includes a power driver module for power management.

In some embodiments, the software programs and/or modules corresponding to the software architecture in FIG. 4 are stored in the first memory or the second memory shown in FIG. 2 or FIG. 3.

In some embodiments, taking a magic mirror application (camera application) as an example, when the remote controller receiving device receives an input operation from the remote controller, a corresponding hardware interrupt is sent to the kernel layer. The kernel layer processes the input operation into an original input event (including the value of the input operation, the timestamp of the input operation and other information). The original input event is stored in the kernel layer. The application framework layer obtains the original input event from the kernel layer, identifies the control corresponding to the input event according to the current position of the focus, and identifies the input operation as a confirmation operation, where the control corresponding to the confirmation operation is the control of the icon of the magic mirror application, the mirror application calls the interface of the application framework layer, the mirror application starts, and then the camera driver starts by calling the kernel layer, to capture static images or videos through the camera.

In some embodiments, for a display apparatus with a touch function, taking a split-screen operation as an example, the display apparatus receives an input operation (such as a split-screen operation) performed by the user on the display screen, and the kernel layer can generate a corresponding input event according to the input operation and report the event to the application framework layer. The activity manager of the application framework layer sets the window mode (such as multi-window mode), window position and size, etc. corresponding to the input operation. The window manager of the application framework layer draws a window according to the settings of the activity manager and then sends the drawn window data to the display driver of the kernel layer, and the display driver presents corresponding application interfaces in different display areas of the display screen.

Figure 5:
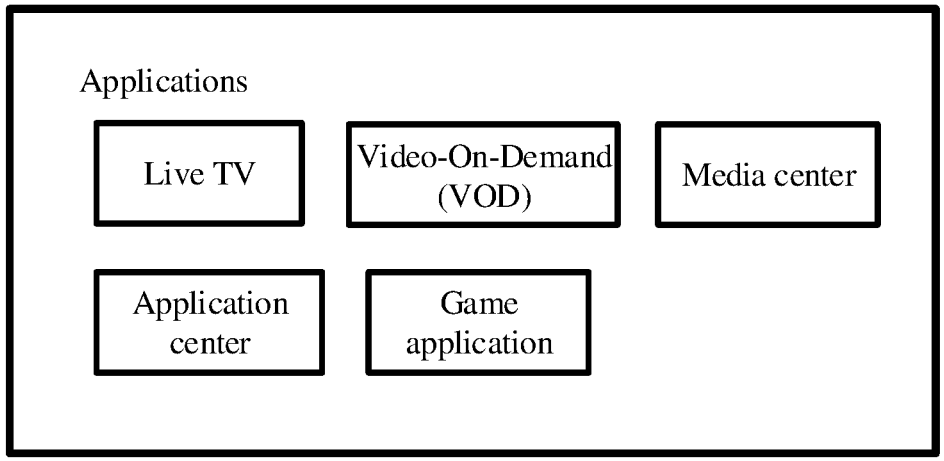
FIG. 5 shows an interface displaying icons of applications in the display apparatus 200 according to some embodiments.

In some embodiments, as shown in FIG. 5, the application layer includes at least one application whose icon can be shown on the display, such as: icon of live TV application, icon of video-on-demand application, icon of media center application, icon of application center, icon of game application, etc.

In some embodiments, the live TV application may provide live TV through different signal sources. For example, the live TV application may provide television signals from the cable television, radio broadcast, satellite service, or other types of live TV services. In addition, the live TV application may display the video of the live TV signals on the display apparatus 200.

In some embodiments, the video-on-demand application may provide videos from different storage sources. Unlike the live TV application, the video on demand provides the video display from some storage sources. For example, the video on demand may come from cloud storage at the server side, or from a local hard disk storage including stored video programs.

In some embodiments, the media center application is an application which can play various multimedia contents. For example, the media center is different from live broadcast television or video on demand, and the user is able to access various images or services through the media center application.

In some embodiments, the application center may store various applications. The application may be a game application or some other applications that are related to the computer system or other devices which can run on the display device. The application center can acquire these applications from different sources, and store them in the local memory, and then the applications can run on the display device 200.

In order to improve the user's experience of the smart TV, the smart TV usually has the function of recognizing the display scene and recognizing the persons or objects in the scene image. In some embodiments, the scene image may be a screenshot corresponding to the display interface. In other embodiments, the scene image may be the scene-related information identified by timestamp information or other tag information. In the following embodiments, a screenshot is taken as a scene image for description. The current smart TV can only obtain the relevant information of the actors in the scene image corresponding to the display interface, that is, the relevant information can be obtained and presented only when the person identified in the scene image is an actor. With the development of social TVs, especially the increase of cameras in smart TVs, a user can watch his current picture directly through a camera, and watch more faces other than actors (i.e., more average-person faces) when chatting with relatives and friends in social scenarios (such as video calls). For the average persons in the screenshots, there is no relevant data for presentation in smart TVs. In order to enrich the content recognition range of the smart TVs, the embodiments of the disclosure provide a display apparatus and a method for person recognition and presentation. It should be noted that the display apparatus in the disclosure not only refers to a smart TV, but also refers to a computer, a tablet computer, or the like.

The display apparatus 200 in the embodiments of the disclosure can improve the content recognition ability and obtain more available data through screenshots for display. The controller 250 in the display apparatus 200 is in communication with the display 275 and configured to perform the process of person recognition and presentation. The process of person recognition and presentation according to the embodiments of the disclosure will be described below with reference to the accompanying drawings.

Figure 6:
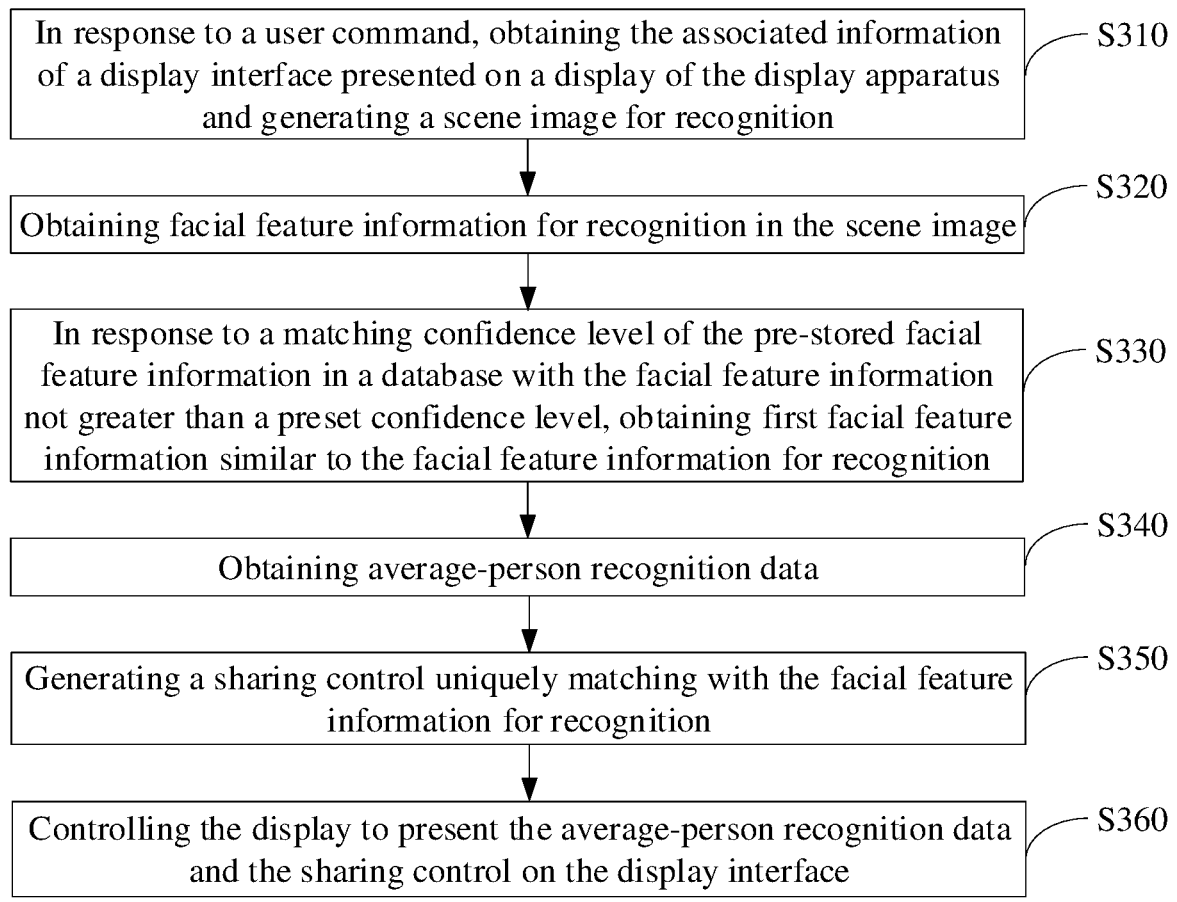
FIG. 6 shows a schematic flowchart of a method for person recognition and presentation according to some embodiments.

FIG. 6 shows a schematic flowchart of a method for person recognition and presentation according to some embodiments. Referring to FIG. 6, the method includes the following steps.

S310: in response to a user command, obtaining the associated information of a display interface presented on a display of the display apparatus and generating a scene image for recognition.

In the embodiments of the disclosure, when viewing the media resources presented on the display apparatus 200, if the user wants to know more about the person information in the current display interface, the user can issue a command, such as a recognition command, to the display apparatus 200. Then, upon receiving the recognition command, the controller 250 in the display apparatus 200 can know, according to the recognition command, that the user wants to know the information of persons on the current display interface on the display.

In some embodiments, the user can use the "screenshot" button configured on the remote controller or a specific button configured with the screenshot function (for example, the favorite button configured with the screenshot function or the live button configured with the screenshot function) on the remote controller to issue the recognition command. If the user wants to take a screenshot during watching media resources, the user can issue the recognition command through the "screenshot" button on the remote controller or the specific button configured with the screenshot function.

In some embodiments, the user may issue a recognition command through voice input. For example, the user long presses the voice input key on the remote controller and says "who is this person". After receiving the user's voice input, the controller 250 firstly uploads the user's voice input information to the server 400. The server 400 parses the voice input information, and sends a screenshot command to the display apparatus 200 when the voice input information is parsed into the information that indicates the user wants to know the persons in the current display interface. The display apparatus 200 takes a screenshot of the current display interface on the display 275 according to the screenshot command.

In embodiments of the disclosure, the controller receives the recognition command sent from the user through the screenshot button on the remote controller or through voice input, and takes a screenshot of the display interface on the display according to the recognition command and generates a screenshot image, or obtains the scene image corresponding to the display interface in other ways, and then obtains the recognition data in the screenshot image through subsequent steps, for presentation on the display 275. It should be noted that the screenshot image in the disclosure may be captured from movie and television programs, variety shows, news programs, etc., or may be captured from video calls, user-made video recordings, etc.

S320: obtaining facial feature information for recognition in the scene image.

In embodiments of the disclosure, after obtaining the scene image, such as screenshot image, the display apparatus 200 sends the screenshot image to the server 400, and the server 400 receives the screenshot image and extracts the facial feature information in the screenshot image based on image content recognition technologies. Here the facial feature information includes features such as forehead, eyebrows, eyes, nose, lip, and chin. In the disclosure, when the facial feature information is extracted, the position information of each facial feature can also be marked.

It should be noted that the display apparatus 200 and the server 400 in the disclosure may also be the same device, that is, the functions that can be implemented by the display apparatus 200 and the server 400, and the specific process will omit here.

S330: in response to a matching confidence level of the pre-stored facial feature information in a database with the facial feature information not greater than a preset confidence level, obtaining first facial feature information similar to the facial feature information for recognition.

In embodiments of the disclosure, the server 400 has a database that stores a plurality of pieces of pre-stored facial feature information and can be regarded as a set of pre-stored facial feature information in the server. Here, the pre-stored facial feature information refer to information about facial features of celebrities, such as actors, singers, artists, etc. who are well known to most people. After extracting the facial feature information for recognition from the screenshot image, the server 400 compares the facial feature information for recognition with multiple pieces of pre-stored facial feature information in the database one by one, to obtain multiple matching confidence level levels respectively.

In some embodiments, a preset confidence level is set in the server 400. When none of the obtained multiple matching confidence level levels exceeds the preset confidence level level, it can be determined that the matching confidence level of the facial feature information for recognition with the pre-stored facial feature information of each celebrity in the database is relatively small, so the facial feature information for recognition can be considered as the facial feature information corresponding to an average person. Here the average person is an ordinary people in life, and the average person can be understood as a person who is not known to others except relatives and friends. For example, the preset confidence level is set as 98%. If there is no pre-stored facial feature information whose matching confidence level with the facial feature information for recognition is more than 98%, it can be determined that the facial feature information for recognition is extracted from the face of an average person. Then the server 400 obtains, from the database, the pre-stored facial feature information whose matching confidence level with the facial feature information for recognition satisfies a condition, as the similar facial feature information. For example, the server 400 may sort multiple matching confidence levels in descending order, and select the similar facial feature information. The server 400 may return the similar facial feature information to the display apparatus 200, and the controller 250 obtains the similar facial feature information. Here the similar facial feature information refers to the pre-stored facial feature information whose matching confidence level with the facial feature information for recognition is ranked among the top N, and N is greater than or equal to 1. That is, when the similar facial feature information is obtained, at least the first one is selected from the sorted matching confidence levels, and the pre-stored facial feature information corresponding to this matching confidence level is used as the similar facial feature information.

In some embodiments, the standard facial feature information is obtained when a matching confidence level of any pre-stored facial feature information in the database with the facial feature information for recognition exceeds the preset confidence level. Here the standard facial feature information refers to pre-stored facial feature information whose matching confidence level with the facial feature information for recognition is highest. That is, when any one of the obtained multiple matching confidence levels exceeds the preset confidence level, it can be determined that the matching confidence level of the facial feature information for recognition with the pre-stored facial feature information of a celebrity in the database is relatively high, so the facial feature information for recognition can be considered as the facial feature information corresponding to the celebrity. Meanwhile, the server 400 can select the pre-stored facial feature information with the highest matching confidence level as the standard facial feature information, the server 400 can feed back the standard facial feature information to the display apparatus 200, and the controller 250 obtains the standard facial feature information. For example, the preset confidence level is set to 98%. If there is pre-stored facial feature information whose matching confidence level with the facial feature information for recognition is more than 98%, it can be determined that the facial feature information for recognition is extracted from the face of a celebrity, here the celebrity corresponding to the pre-stored facial feature information with a matching confidence level of more than 98% is the celebrity recognized in the screenshot image.

It should be noted that the preset confidence level can be set according to the accuracy of the algorithm. Only when the facial feature information for recognition and the pre-stored face information are from the same person, the matching confidence level between them can reach the preset confidence level or above, and can reach 100% at most. If the facial feature information for recognition of an average person is compared with the pre-stored facial feature information in the database, the matching confidence level may be lower than 50%.

In some embodiments, after the standard facial feature information is selected, the server 400 can know which celebrity the standard facial feature information is extracted from according to the standard facial feature information, and searches for the profile information and related media resource corresponding to the standard facial feature information according to the celebrity. After the corresponding profile information and related media resource are found, the server 400 feeds back the data to the display apparatus 200 to allow the controller 250 to obtain them. For example, after the facial feature data for recognition is obtained from a screenshot image, the facial feature data for recognition matches with the pre-stored facial feature information extracted from Zhang San in the database, so it can be determined that the person in the screenshot image is Zhang San, and then the profile information of Zhang San is obtained, such as Zhang San, born in Shanghai on July xx, XXXX, a singer, film and TV actor, and music producer in mainland China, graduated from YY university. In 2005, he made his official debut by participating in the talent show "WXWX". In 2006, he released his first album, and then gained widespread attention with the song "RZDX" and so on. Meanwhile, the relevant media resources of Zhang San are obtained, such as "HXQBJ", "TZZLM2" and so on. In addition, Zhang San's gossip news can also be obtained.

The recognition process when only one person is included in the screenshot image is illustrated above. Of course, when the screenshot image includes a plurality of persons, the controller in the display apparatus according to embodiments of the disclosure is configured to: obtain the facial feature information of the plurality of persons for recognition respectively, and obtain a matching confidence level result of each person of the plurality of persons respectively, here the matching confidence level result includes a matching confidence level of each piece of pre-stored facial feature information in the database with the facial feature information of one person for recognition; for each person in the screenshot image, compare a corresponding matching confidence level with the preset confidence level; obtain the corresponding standard facial feature information when the matching confidence level result indicates that there is pre-stored facial feature information whose matching confidence level with the facial feature information for recognition exceeding the preset confidence level; or obtain the corresponding similar facial feature information when the matching confidence level result indicates that there is no pre-stored facial feature information whose matching confidence level with the facial feature information for recognition exceeding the preset confidence level. It should be noted that the plurality of persons in the screenshot image may all belong to average person, or may all belong to celebrity, or some of them may belong to average person and the other may belong to celebrity. Regardless of celebrity or average person, it is only necessary to obtain the similar facial feature information or standard facial feature information correspondingly, and the corresponding presentation data is further obtained based on the similar facial feature information and/or standard facial feature information.

S340: obtaining average-person recognition data.

In embodiments of the disclosure, the controller 250 further obtains the average-person recognition data after obtaining the similar facial feature information. Here the average-person recognition data refers to presentation data corresponding to a person recognized in the screenshot image, and the average-person recognition data includes presentation data corresponding to the facial feature information for recognition and presentation data corresponding to the similar facial feature information.

The flowchart of a method for obtaining the average-person recognition data will be illustrated below with reference to the drawings.

Figure 7:
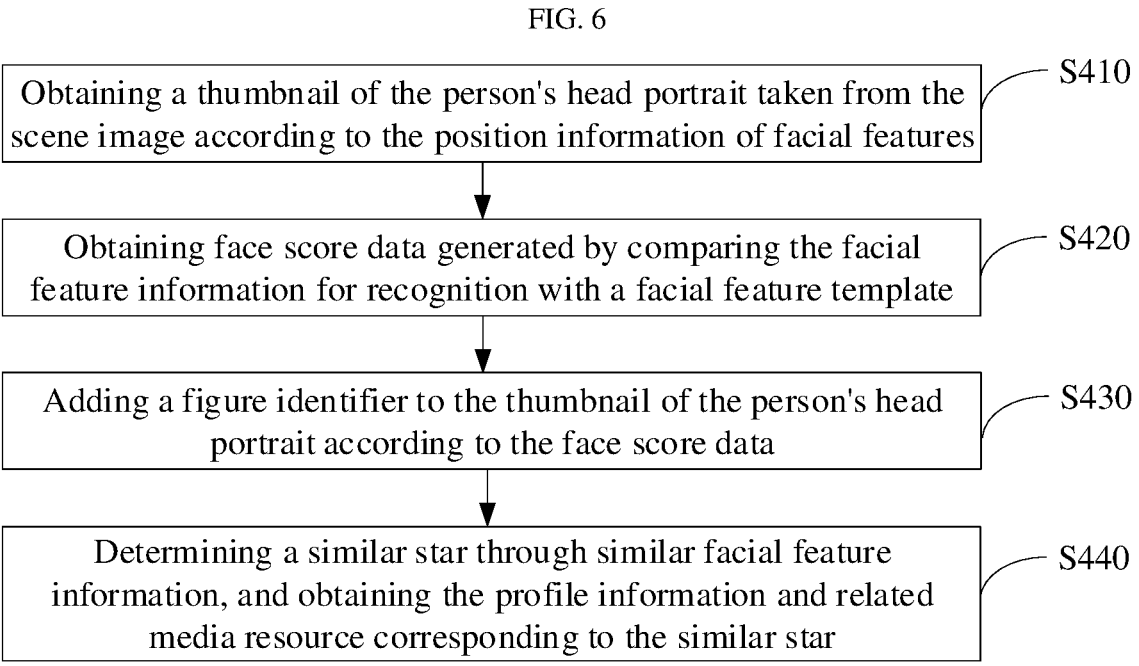
FIG. 7 shows a schematic flowchart of a method for obtaining the average-person recognition data according to some embodiments.

FIG. 7 shows a schematic flowchart of a method for obtaining the average-person recognition data according to some embodiments. This process will be illustrated with reference to Steps S410 to S440 in FIG. 7.

S410: obtaining a thumbnail of the person's head portrait taken from the scene image according to the position information of facial features.

In embodiments of the disclosure, when the facial feature information for recognition is extracted, the position information of the facial features such as forehead, eyebrows, eyes, nose, lip and chin is marked at the same time, and the position information of the person can be known in the screenshot image through the position information of the facial features. The controller 250 can take the thumbnail of the person's head portrait from the screenshot image, that is, the controller cuts the head portrait out based on the position information of the person to obtain the thumbnail of the person's head portrait.

S420: obtaining face score data generated by comparing the facial feature information for recognition with a facial feature template.

In embodiments of the disclosure, the face score data of a corresponding person can be obtained based on the facial feature information for recognition. Based on public aesthetics, general facial features accepted by the public can be obtained. For example, for nose, it is usually considered that a high nose bridge is more beautiful than a short nose bridge; and for eyes, it is usually considered that double eyelids are more beautiful than single eyelids. The server 400 can compare the extracted facial feature information for recognition with a preset facial feature template to obtain a corresponding face score, face score ranking, age estimation, etc. For different servers, the obtained face score data may be different. The server 400 feeds back the determined face score data to the display apparatus 200.

In some embodiments, the face modifier data of a corresponding person can be obtained based on the facial feature information for recognition, for example, special facial features, unique temperament, beauty, dignified appearance and so on.

S430: adding a figure identifier to the thumbnail of the person's head portrait according to the face score data.

In embodiments of the disclosure, based on the facial feature information for recognition, the face score data of the corresponding person can be obtained, such as face score, face score ranking, age estimation, etc. The server 400 adds the corresponding figure identifier to the corresponding thumbnail of the person's head portrait according to the face score data. For example, for a male around 45 years old, his figure identifier can be set as "handsome guy"; for a woman around 70 years old, her figure identifier can be set as "grandma", and so on. After obtaining the corresponding figure identifier, the server 400 may return it to the display apparatus 200 along with the face score data.

S440: determining a similar star through similar facial feature information, and obtaining the profile information and related media resource corresponding to the similar star.

In embodiments of the disclosure, the similar star can be determined based on similar facial feature information whose similarity degree with the facial feature information for recognition extracted from the scene image is greater than a predetermined threshold. Since the similar facial feature information is extracted from the pre-stored facial feature information, each piece of similar facial feature information can have a corresponding celebrity, who is regarded as a similar star. The server 400 searches for the corresponding profile information and related media resource according to the similar star, and feeds back the data to the display apparatus 200.

In the above embodiments, the average-person recognition data includes head thumbnail, face score data, figure identifier, similar star, and corresponding profile information and related media resource about the similar star, etc. Among the above data, some data are directly obtained by the controller 250 in the display apparatus 200, and some data are obtained indirectly by the controller 250 through the server 400.

S350: generating a sharing control uniquely matching with the facial feature information for recognition.

In some embodiments of the disclosure, the controller 250 generates a character string according to the figure identifier in combination with a timestamp for generating the screenshot image, a domain name of a server and an identifier of the display apparatus. Here the server refers to a server that extracts the facial feature information in the screenshot image. A two-dimensional code is generated according to the character string. The two-dimensional code is used as a sharing control for sharing the average-person recognition data with other people. When the user wants to obtain the average-person recognition data from the display apparatus 200, he or she can scan the two-dimensional code presented on the display of the display apparatus through a mobile terminal with a camera such as a mobile phone, an iPad or a laptop computer. The server 400 obtains the corresponding average-person recognition data based on a request from the mobile terminal and feeds back it to the mobile terminal, to realize the sharing of the average-person recognition data. If the mobile terminal wants to obtain the average-person recognition data, the mobile terminal needs to obtain the time point of the screenshot through the timestamp for generating the screenshot image, know which server to access through the domain name of the server, and determine which display apparatus generated the screenshot image through the identifier of the display apparatus. When the mobile terminal wants to obtain the average-person recognition data, the mobile terminal can request the server by scanning the two-dimensional code.

S360: controlling the display to present the average-person recognition data and the sharing control on the display interface.

Figure 8:
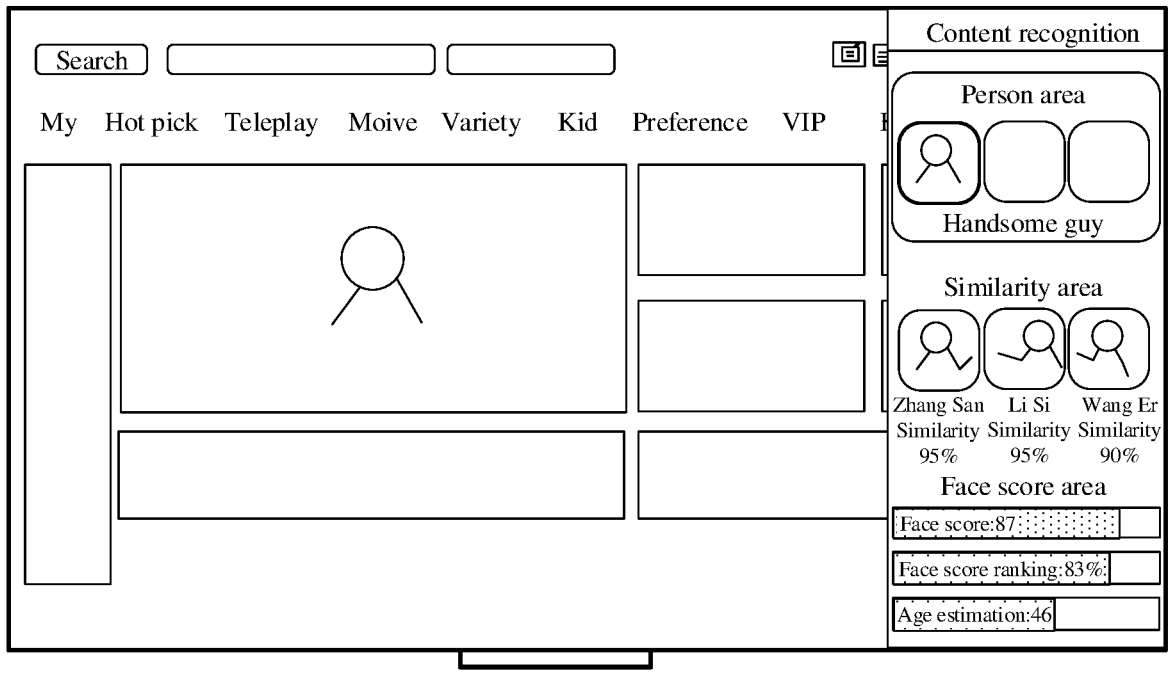
FIG. 8 shows a diagram of a presentation interface of the average-person recognition data according to some embodiments.
Figure 9:
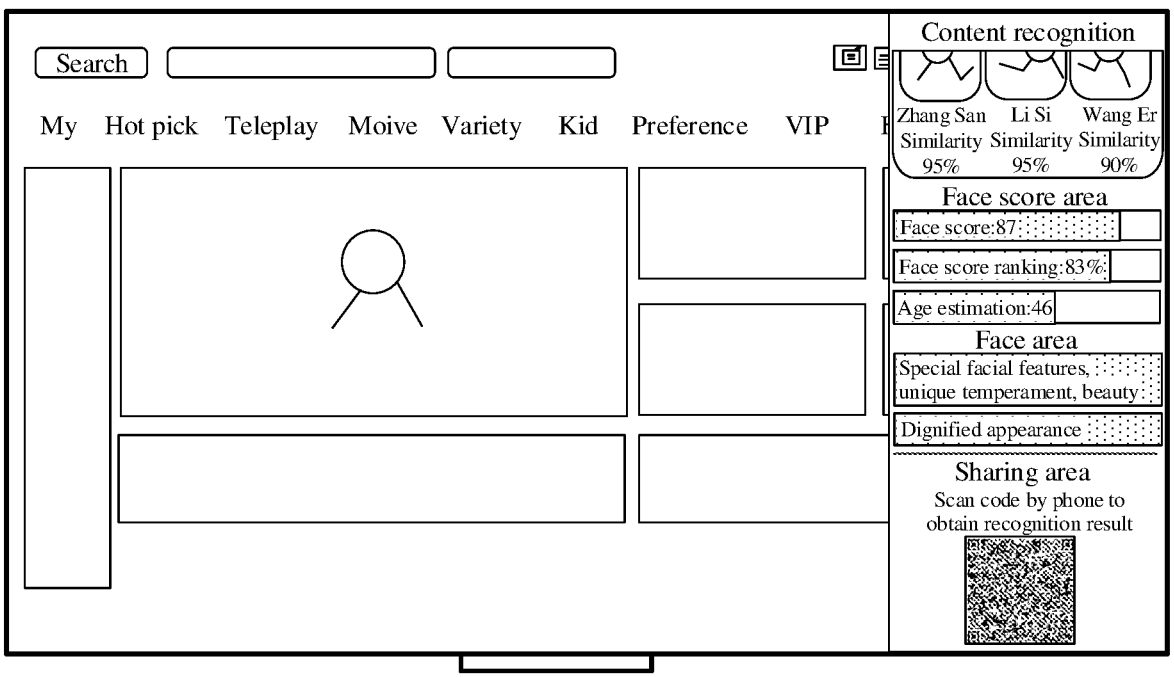
FIG. 9 shows a diagram of a presentation interface of the average-person recognition data according to some embodiments.

In some embodiments of the disclosure, after obtaining the average-person recognition data, the controller 250 controls the display 275 to pop up an information floating layer on the current display interface. Here the information floating layer is presented or floating above an interface display layer or a video display layer, and includes a person area, a similar area, a face score area and a sharing area, where the person area includes one or more person controls that contain the thumbnail of a person's head portrait. FIG. 8 shows a diagram of a presentation interface of the average-person recognition data according to some embodiments, and FIG. 9 shows a diagram of a presentation interface of the average-person recognition data according to some embodiments. In combination with FIGS. 8 and 9, an information floating layer of "Content recognition" pops up on the right side of the current display interface of the display 275, where the information floating layer of "Content recognition" includes a person area, a similarity area, a face score area and a sharing area. The thumbnail of the person's head portrait is presented in the person area, and the thumbnail of the person's head portrait serves as a person control. Below the thumbnail of the person's head portrait, there is a figure identifier of the thumbnail of the person's head portrait, such as "Handsome guy" in FIG. 8. In the person area, when the focus is moved to a different person control through the left or right direction button on the remote controller, the controller 250 controls the similarity area, face score area, face area and sharing area to present the average-person recognition data and sharing controls for the different person recognized in the screenshot image. The focus can be moved to the similarity area, face score area, face area and sharing area for a selected person control through the up/down direction buttons on the remote controller. The similar stars, such as Zhang San, Li Si and Wang Er in FIG. 8, are presented in the similarity area, and the similarity between the average person and each similar star in the screenshot image is presented below the similar star. The face score area is used to present the face score data. As shown in FIG. 8, the face score of an average person in the screenshot image is 87, the face score ranking is 83%, and the age is estimated to be 46. A face evaluation is presented in the face area. The sharing area presents sharing controls, and has a text prompt which says "Scan code by phone to obtain recognition result".

Figure 10:
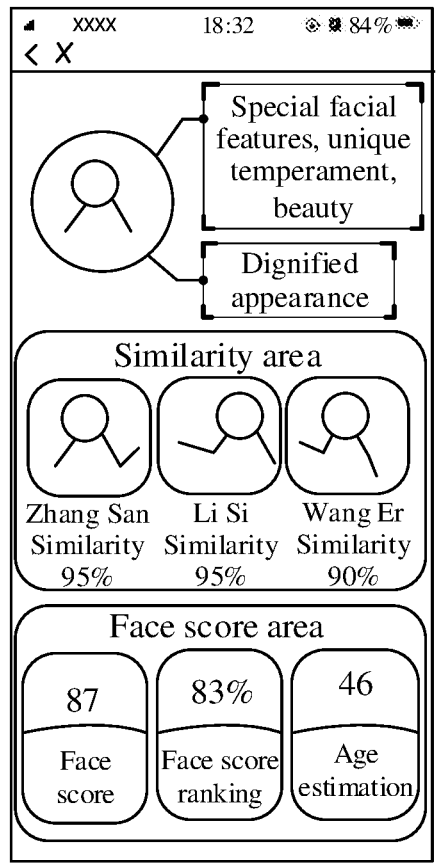
FIG. 10 shows a diagram of a presentation interface of the average-person recognition data of a mobile terminal according to some embodiments.

FIG. 10 shows a diagram of a presentation interface of the average-person recognition data of a mobile terminal according to some embodiments. In FIG. 10, after a user scans the sharing control in the sharing area through the mobile terminal, the display interface shown in FIG. 10 is correspondingly presented on the screen of the mobile terminal.

Figure 11:
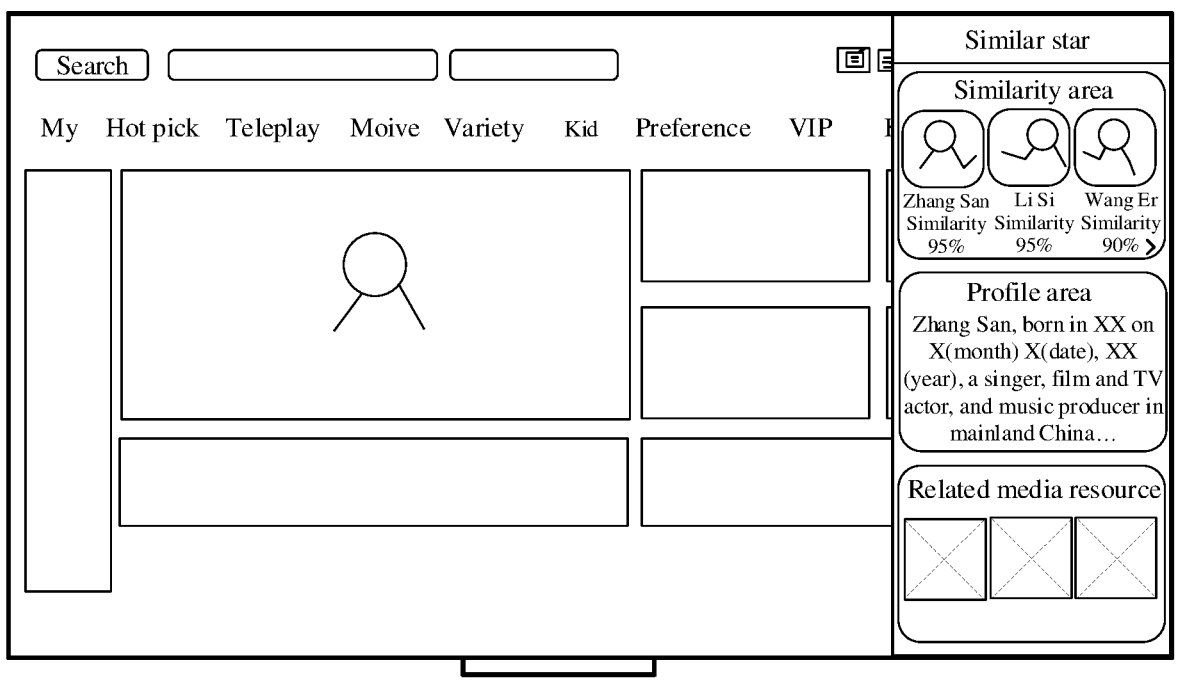
FIG. 11 shows a diagram of a presentation interface of a details page of a similar star according to some embodiments.

In some embodiments of the disclosure, the similarity area in the information floating layer in FIG. 8 includes a plurality of star controls corresponding to a plurality of similar stars respectively. After the focus lands on the similarity area and confirms a selection, the controller 250 controls the information floating layer to skip to a similar star details page. Then the similar star details page is also in a form of a floating layer, which presents on the display and overlay the information floating layer as a response to a selection of the similarity area on the information floating layer. Here the similar star details page includes the similarity area, a profile area and a media resource area, the profile area is used to present the profile information, and the media resource area is used to present the related media resource. Referring to FIG. 11, FIG. 11 shows a diagram of a presentation interface of a similar star details page according to some embodiments. As shown in FIG. 11, the similar star details page is displayed through a floating layer of "Similar star". A similarity area, a profile area and a media resource area are arranged in sequence on the similar star details page. In the similarity area, when the focus moves to a different star control, the controller 250 controls to present the profile information and related media resources of the different similar star in the profile area and the media resource area. That is, when the focus is moved to a different celebrity head portrait icon, the profile information and related media resource of the corresponding celebrity are presented in the profile area and the media resource area below. Only 3 similar stars are shown in FIG. 11. According to the number of selected similar facial features, a plurality of similar stars can be set here. In the similarity area, the focus can be moved to different star controls through the left/right direction buttons on the remote controller. In addition, an entertainment area may also be set on the similar star details page, and the gossip news of the corresponding star is presented in the entertainment area.

In the disclosure, the display apparatus can obtain the average-person recognition data based on the screenshot image, and present the average-person recognition data on the floating layer of the display interface, so as to improve the user's experience. In addition, the controller 250 can also generate a sharing control uniquely matching with the facial feature information for recognition, and the sharing control is also displayed on the floating layer of the display interface. Through the sharing control, the user can use the mobile terminal to share the average-person recognition data. The disclosure greatly enriches the recognition range of persons in the screenshot image, and interests users more by adding the sharing function of recognition data.

Some embodiments of the disclosure further provide a method for person recognition and presentation, including: the controller 250 is configured to receive an instruction for indicating getting a screenshot of the display interface on the display 275 and generate a screenshot image in response to the instruction. The controller 250 is further configured to obtain facial feature information for recognition from the screenshot image, and compares the facial feature information for recognition with the pre-stored face information in a database one by one. The controller 250 obtains the similar facial feature information when a matching confidence level of the pre-stored facial feature information in the database with the facial feature information for recognition does not exceed a preset confidence level, here the similar facial feature information refers to pre-stored facial feature information whose matching confidence level with the facial feature information for recognition satisfies a threshold, and the database refers to a collection of pieces of pre-stored facial feature information in a server. In some embodiments, the pre-stored facial feature information may come from many celebrities. The comparison between the facial feature information for recognition and the pre-stored facial feature information is implemented by comparing one person's facial features with a celebrity's facial features. The controller 250 obtains the average-person recognition data, here the average-person recognition data refers to presentation data corresponding to a person recognized in the screenshot image, and the average-person recognition data includes presentation data corresponding to the facial feature information for recognition and presentation data corresponding to the similar facial feature information. The controller 250 generates a sharing control for uniquely matching with the facial feature information for recognition, here the sharing control is for sharing the average-person recognition data; and controls the display 275 to present the average-person recognition data and the sharing control on the display interface.

In some embodiments, when comparing the facial feature information for recognition with the pre-stored face information in the database one by one, like comparing a person's facial features with a celebrity's facial features, the controller 250 obtains standard facial feature information when a matching confidence level of any pre-stored facial feature information in the database with the facial feature information for recognition exceeds the preset confidence level, where the standard facial feature information refers to pre-stored facial feature information whose matching confidence level with the facial feature information for recognition is highest. The controller 250 obtains the profile information and related media resource corresponding to the standard facial feature information.

The current smart TV can acquire a static image through a button for screenshot or a button for scene recognition. With the development of social TVs, especially the increase of cameras in smart TVs, the smart TVs can not only play videos, but also play videos captured by its cameras, or for video calls to allow the user to chat with relatives and friends. Since there is currently no way to record dynamic pictures, it is impossible for users to record and share some interesting video clips in the browsed videos or video clips that they want to record when making videos through social TVs. In order to increase the user's experience, the embodiments of the disclosure provide a display apparatus and a screen recording and sharing method.

The display apparatus 200 in embodiments of the disclosure can add a screen recording function. The user obtains some interesting video clips in the browsed video or video clips that he wants to record when making a video through a social TV, etc., through screen recording. The controller 250 in the display apparatus 200 is in communication with the display 275 and is configured to perform the screen recording and sharing process. The screen recording and sharing process will be described below with reference to the accompanying drawings.

Figure 12:
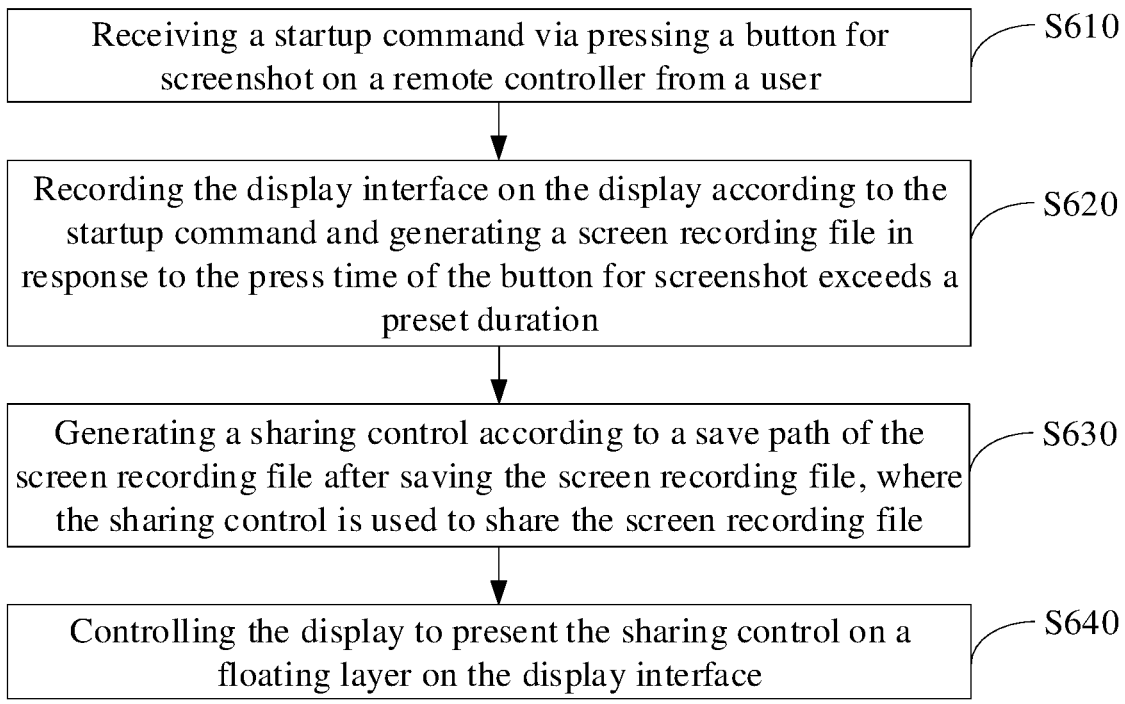
FIG. 12 shows a schematic flowchart of a screen recording and sharing method according to some embodiments.

FIG. 12 shows a schematic flowchart of a screen recording and sharing method according to some embodiments. Referring to FIG. 12, the method includes the following steps.

S610: receiving a startup command via pressing a button for screenshot on a remote controller from a user.

In some embodiments of the disclosure, a button for screenshot is provided on the remote controller, or a specific button on the remote controller is configured with screenshot function, for example, a favorite key or a live key is configured with screenshot function. Hereafter, the two types of button are also referred to as screenshot button. When the display apparatus 200 is normally powered on, the user can issue a command, such as a startup command, by pressing the screenshot button or a button for scene recognition at any time. After receiving the startup command, the controller 250 takes a screenshot or records the screen accordingly.

S620: recording the display interface on the display according to the startup command and generating a screen recording file in response to the press time of the button for screenshot exceeds a preset duration.

In some embodiments of the disclosure, the preset duration is set in the display apparatus 200. By comparing the press time of the screenshot button with the preset duration, it is determined whether a next step is to take a screenshot according to the startup command or to record the screen according to the startup command Here the press time of the screenshot button refers to the duration between pressing the screenshot button and releasing the screenshot button by the user.

In some embodiments, when the press time of the screenshot button does not exceed the preset duration, a screenshot of the display interface presented on the display is taken according to the startup command, and a screenshot image is generated. For example, the preset duration is set to 300 milliseconds. When the user is watching a video on the display 275, he can press the screenshot button on the remote control if he wants to save the content currently displayed on the display 275. When the user starts to press the screenshot button, the startup command has been sent to the display apparatus 200. When the controller 250 determines that the pressing duration does not exceed 300 milliseconds, that is, the user presses the screenshot button and releases the screenshot button within 300 milliseconds, it can be considered that the user only wants to save the picture of the current display interface of the display 275. In this case, the controller 250 takes a screenshot of the display interface shown on the display 275 according to the startup command and generates a screenshot image.

In some embodiments, when the press time of the screenshot button exceeds the preset duration, the display interface shown on the display is recorded according to the startup command, and a screen recording file is generated. For example, the preset duration is set to 300 milliseconds. When the user is watching a video through the display 275, he can press the screenshot button and press it for a longer time if he wants to record the currently played content. When the user starts to press the screenshot button, a startup command has been sent to the display apparatus 200. After receiving the startup command, the controller 250 firstly takes a screenshot of the display interface displayed on the display 275 and generates a screenshot image. If the controller 250 determines that the pressing duration exceeds 300 milliseconds, it is determined that the user wants to record the screen. In this case, the controller 250 records the display interface shown on the display 275 and generates a screen recording file.

In some embodiments of the disclosure, the controller 250 is further configured to obtain a person recognition result in the screenshot image, and control the display to present the person recognition result on the floating layer of the display interface. In the disclosure, the display apparatus 200 may firstly generate a screenshot image regardless of whether the screen is recorded. If the screen is recorded, the display interface will continue to be recorded on the basis of the screenshot image, thereby generating a screen recording file. After receiving the startup command input from the user, the display apparatus 200 needs to feed back a part of data to the user and show it through the display 275, so that the user knows that the display apparatus 200 is taking a screenshot or recording the screen. After obtaining the screenshot image, the controller 250 uploads the screenshot image to the server 400, and the server 400 performs the person recognition on the screenshot image based on the image recognition technology as a response to the screenshot image uploaded by the controller 250. The server 400 obtains, based on the screenshot image, the thumbnails of persons' head portraits in the image and the corresponding figure identifiers. For example, for a celebrity like a movie star in the screenshot, the figure identifier is the name of the person, such as WK, GJF, etc. For the video recorded by the user, there are ordinary persons in the screenshot, and the figure identifiers thereof may be handsome guy, beautiful woman, old grandmother, elementary school student, and so on. The server 400 feeds back the obtained person recognition result, i.e., the thumbnail of person's head portrait and a corresponding figure identifier, to the display apparatus 200, and the controller 250 controls the display 275 to show the corresponding person recognition result on the floating layer of the display interface.

The process of generating a screen recording file will be described below with reference to the accompanying drawings.

Figure 13:
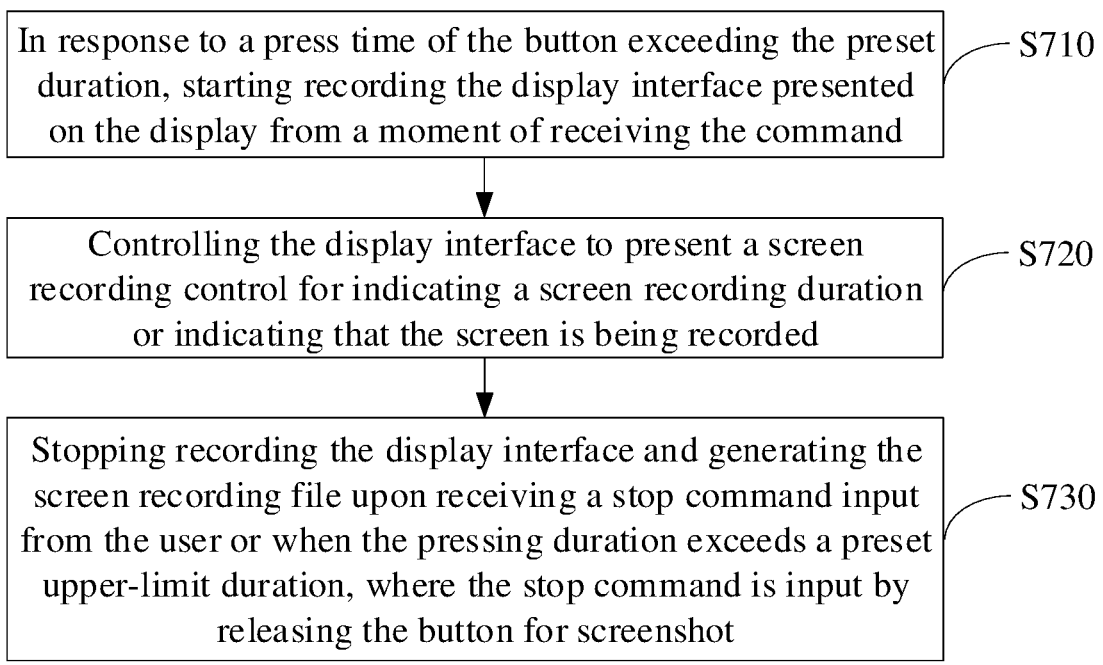
FIG. 13 shows a schematic flowchart of a method for generating a screen recording file according to some embodiments.

FIG. 13 shows a schematic flowchart of a method for generating a screen recording file according to some embodiments. With reference to FIG. 13, the generation of the screen recording file is described through Steps S710 to S730.

S710: in response to a press time of the button exceeding the preset duration, starting recording the display interface presented on the display from a moment of receiving the command.

In some embodiments of the disclosure, a startup command is sent to the display apparatus 200 by pressing the screenshot button, and the controller 250 first takes a screenshot of the display interface currently presented on the display according to the startup command to generate a screenshot image. While performing the screenshot operation, the controller 250 also starts timing to determine the press duration of the screenshot button. When the press duration of the screenshot button exceeds the preset startup duration, the controller 250 starts recording the display interface which starts from a moment when the startup command is received, that is, the controller 250 starts recording the display interface starting from a frame where the screenshot image is taken.

S720: controlling the display interface to present a screen recording control for indicating a screen recording duration or indicating that the screen is being recorded.

Figure 14:
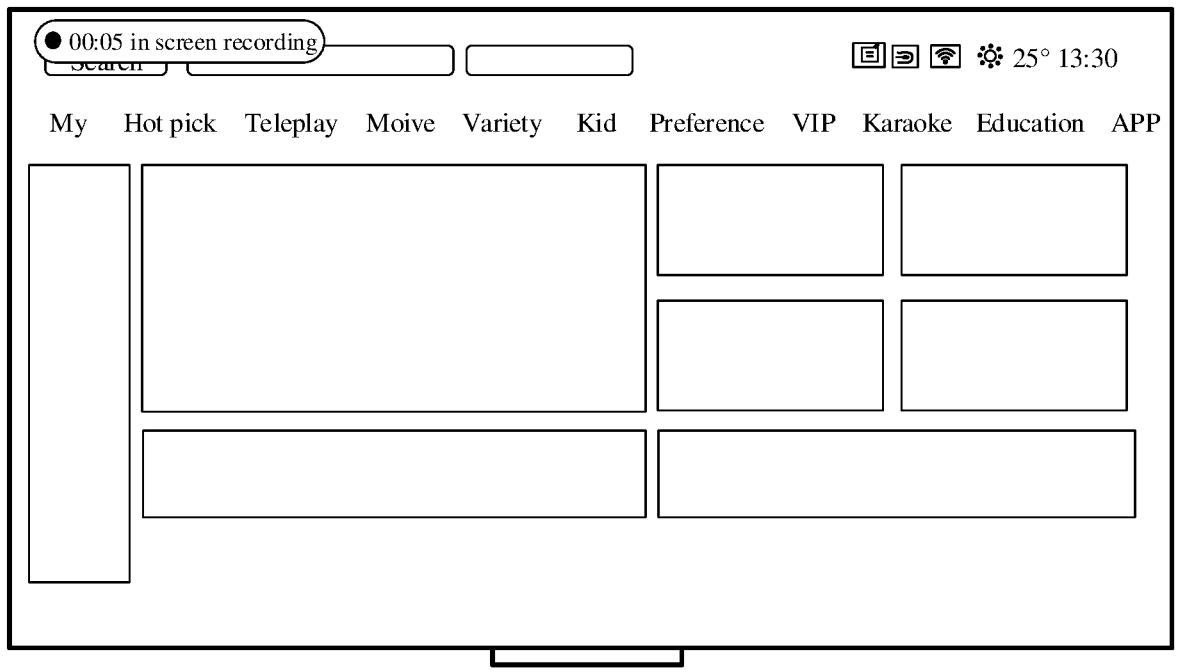
FIG. 14 shows a diagram of a presentation interface for generating a screen recording file according to some embodiments.
Figure 15:
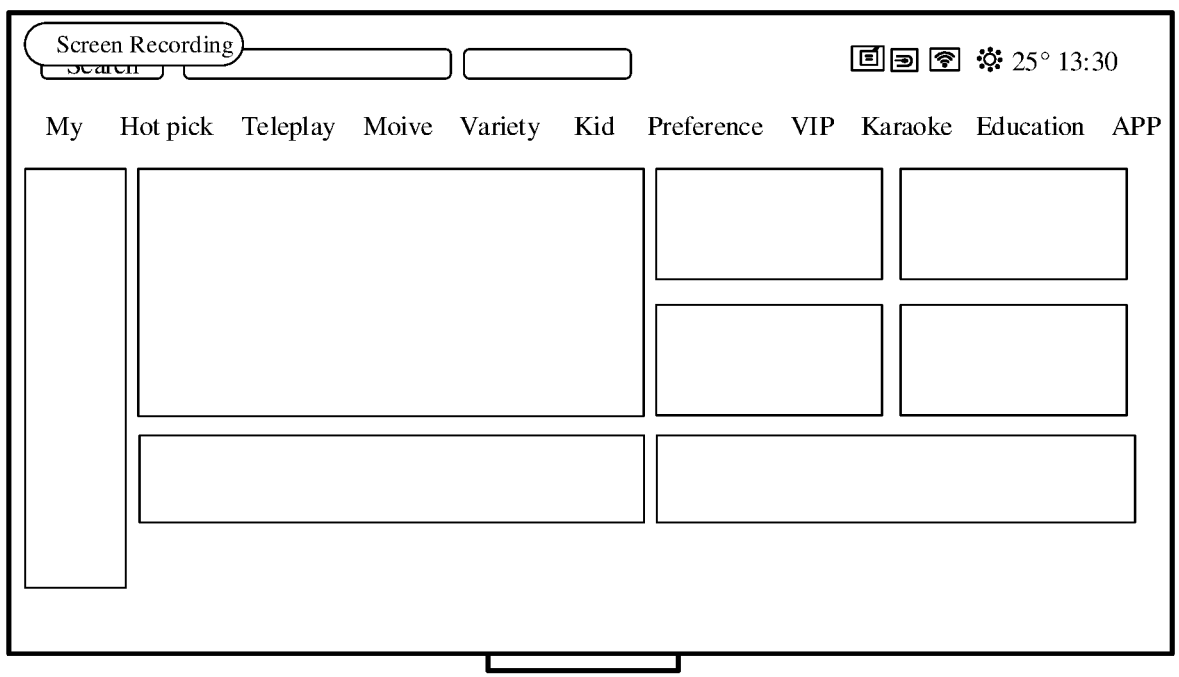
FIG. 15 shows a diagram of another presentation interface for generating a screen recording file according to some embodiments.
Figure 16:
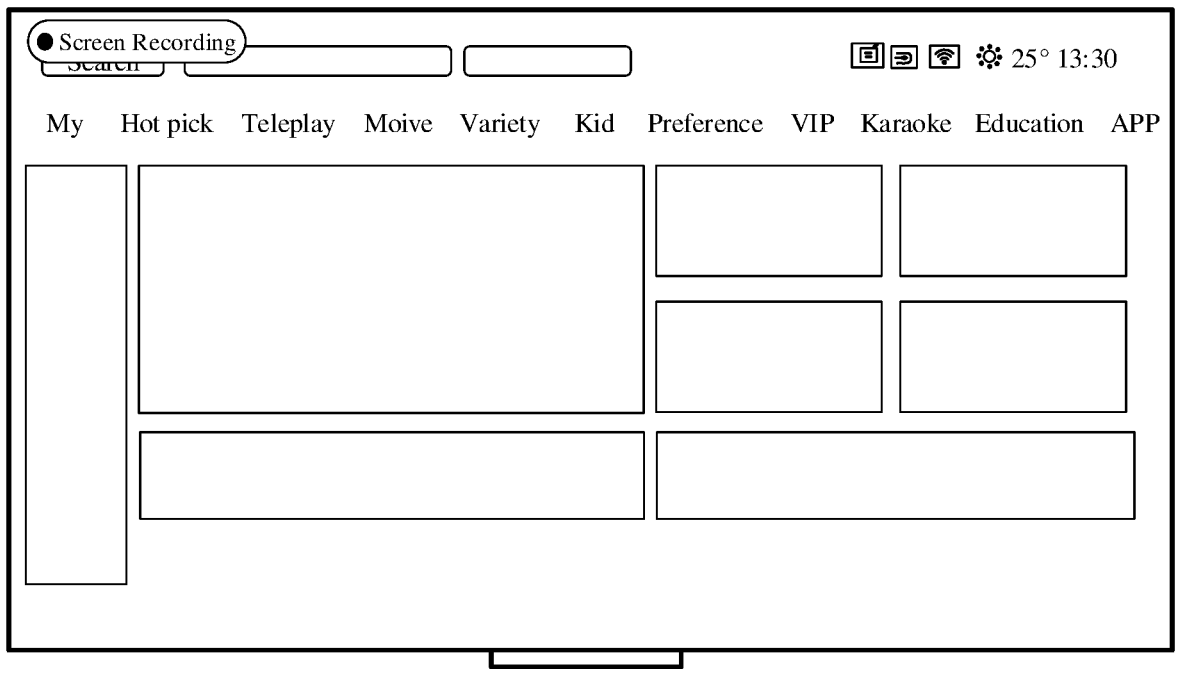
FIG. 16 shows a diagram of another presentation interface for generating a screen recording file according to some embodiments.

In some embodiments of the disclosure, when the controller 250 starts recording the display interface from a starting point when the startup command is received, the controller 250 controls the display interface to present the screen recording control. In some embodiments, the screen recording control is used to prompt the user how long the recording is. FIG. 14 shows a diagram of a presentation interface for generating a screen recording file according to some embodiments. As shown in FIG. 14, "00:05 screen recording" is presented at the upper left corner, which means that the screen recording file has been recorded for 5 seconds. In another implementation, the screen recording control is used to prompt the user that the display apparatus 200 is currently performing screen recording. FIG. 15 shows a diagram of another presentation interface for generating a screen recording file according to some embodiments, and FIG. 16 shows a diagram of another presentation interface for generating a screen recording file according to some embodiments. The difference between screen recording controls in FIG. 15 and FIG. 16 is that: one is presenting the screen recording control as "Screen Recording" at the upper left corner, and the other is presenting the screen recording control as "Screen Recording" at the upper left corner. Through the alternate presentation of the screen recording control in two states, that is, two states of the recording control take turns to present on the display interface, the user is prompted that the display apparatus 200 is currently recording the screen.

S730: stopping recording the display interface and generating the screen recording file upon receiving a stop command input from the user or when the pressing duration exceeds a preset upper-limit duration, where the stop command is input by releasing the button for screenshot.

In some embodiments of the disclosure, the user continuously presses the screenshot button on the remote control to record the screen. During the recording process, when the user finds that the clip he wants to record has been recorded, he can release the screenshot button to stop recording. That is to say, releasing the screenshot button is a signal for stop recording, the key event associated with the releasing of the screenshot button is used as a stop command to the controller 250. After receiving the stop command, the controller 250 stops recording the current display interface of the display 275 and generates a screen recording file.

In other embodiments, the user continuously presses the screenshot button on the remote control to record the screen. During the recording process, the controller 250 keeps timing. When the duration of pressing the screenshot button, i.e., the duration of recording the screen recording file exceeds the preset upper-limit duration, the controller 250 stops recording the current display interface of the display 275 and generates a screen recording file, here the preset upper-limit duration may be set to 60 seconds, and may be set according to the size of the storage space of the display apparatus, which is not limited here.

In some embodiments of the disclosure, after the controller 250 starts recording the display interface from a moment when the startup command is received by the controller, the recording of the display interface is stopped and an unqualified screen recording file is generated when the pressing duration does not exceed the preset lower-limit duration according to the timing of the controller 250, where the unqualified screen recording file refers to a screen recording file generated within a pressing duration that does not exceed the preset lower-limit duration. That is to say, after the user presses the screenshot button of the remote control, the pressing duration exceeds the preset startup duration, and the controller 250 starts to record the file, but the user then releases the screenshot button. The duration from pressing the screenshot button to releasing the screenshot button has not reached the preset lower-limit duration, resulting in the short recording time of the screen recording file. Thus the controller 250 generates an unqualified screen recording file after stopping the recording of the display interface. For example, the user presses the screenshot button for more than 300 milliseconds, and the controller 250 starts recording the screen recording file. After the pressing duration reaches 2 seconds, the user releases the screenshot button. In this case, the controller stops the recording of the screen recording file, and the generated screen recording file is regarded as an unqualified screen recording file.

After generating the unqualified screen recording file, the controller controls the display interface to present a first prompt toast, which is used to indicate that the screen recording file is unqualified. The text reminder "screen recording time is too short to play, and re-recording is needed" may be set in the first prompt toast. Since the unqualified screen recording file cannot be played and thus not worth being saved, the controller 250 can delete the unqualified screen recording file to prevent it from occupying the storage space.

In the above embodiments, by presetting the lower-limit duration, it can avoid a situation where the user intends to take a screenshot but actually makes the recording because the pressing duration slightly exceeds the preset startup duration. Furthermore, it can also avoid a situation where the user mistakenly considers a playback failure of the display apparatus because the screen recording file just flashes due to the short screen-recording time when the recorded file is played later even if the user intends to record the screen.

In some embodiments of the disclosure, in view of a case where the display apparatus 200 has no enough storage space to store the screen recording file after the screen recording file is generated, the controller 250 is configured to check the remaining storage space before starting recording the screen. A preset remaining amount is stored in the display apparatus 200, where the preset remaining amount is greater than or equal to the size of the screen recording file generated under the preset upper-limit duration. After checking the remaining storage space in the memory, the controller 250 determines the sizes of the remaining storage space and the preset remaining amount. When the remaining storage space exceeds the preset remaining amount, that is to say, the remaining storage space can also store at least one screen recording file generated under the preset upper-limit duration. In this case, the display interface is recorded according to the startup command and a screen recording file is generated.

In some embodiments, after checking the remaining storage space in the memory, the controller 250 determines the sizes of the remaining storage space and the preset remaining amount. When the remaining storage space does not exceed the preset remaining amount, if there are historical screen recording files stored in the storage space, the historical screen recording files are deleted, and the display interface is recorded and a screen recording file is generated according to the startup command That is to say, when the controller 250 checks that the remaining storage space cannot store a screen recording file generated under the preset upper-limit duration, the controller 250 needs to further check the files stored in the storage space. For a historical screen recording file that has been generated before, the user may have already shared it, and it is of little significance to continue storing the historical screen recording file, so the controller 250 may delete the historical screen recording file, so that the storage space in the memory is sufficient to store a new screen recording file. It should be noted that, when the historical screen recording files are deleted, the files can be deleted in chronological order, for example, the historical screen recording file with the earliest recording time is deleted at first.

In some other embodiments, after checking the remaining storage space in the memory, the controller 250 determines the sizes of the remaining storage space and the preset remaining amount. When the remaining storage space does not exceed the preset remaining amount, a second prompt toast pops up if there is no historical screen recording file stored in the storage space, where the second prompt toast is used to prompt the user that the storage space is full and the screen cannot be recorded. That is to say, when the controller 250 checks that the remaining storage space cannot store a screen recording file generated under the preset upper-limit duration, the controller 250 needs to further check the files stored in the storage space. If there is no historical screen recording file in the storage space, the display apparatus 200 cannot continue to store a newly-generated screen recording file. In this case, the controller 250 needs to prompt the user that the storage space is full and the screen cannot be recorded through the second prompt toast.

S630: generating a sharing control according to a save path of the screen recording file after saving the screen recording file, where the sharing control is used to share the screen recording file.

In some embodiments, after generating a screen recording file according to the startup command, the controller 250 saves the screen recording file to the local storage space, that is, a local memory. According to the save path of the screen recording file and the domain name of the display apparatus, the controller 250 generates a character string, and further generates a two-dimensional code according to the character string. The two-dimensional code is used as a sharing control to share the screen recording file. When the user wants to obtain the screen recording file from the display apparatus 200, he or she can scan the two-dimensional code through a mobile terminal with a camera such as a mobile phone, an iPad or a notebook computer. The controller 250 determines whether the display apparatus 200 and the mobile terminal are located in the same local area network. If the display apparatus 200 and the mobile terminal are located in the same local area network, the controller 250 directly transmits the screen recording file to the mobile terminal according to a communication protocol such as MQTT (Message Queuing Telemetry Transport) or Bluetooth. If the display apparatus 200 and the mobile terminal are not located in the same local area network, the controller 250 pops up a third prompt toast on the display 275 to prompt the user that the mobile terminal needs to connect to the local area network where the display apparatus 200 is located and then obtain the screen recording file. The above sharing method belongs to the sharing of the screen recording file in the local area network. It can be understood that the mobile terminal is connected with the display apparatus 200 through a network router. If the mobile terminal wants to obtain the screen recording file stored on the display apparatus 200, there is a need to know the current domain name of the display apparatus and the save path of the screen recording file through the two-dimensional code. When the mobile terminal wants to read the file, there is only a need to transmit the screen recording file in the same local area network.

In other embodiments, after generating the screen recording file according to the startup command, the controller 250 uploads the screen recording file to the server 400, so that the server 400 saves the screen recording file to the database. After storing the screen recording file, the server 400 feeds back the storage address of the screen recording file to the display apparatus 200. The controller 250 extracts a character string based on the timestamp for generating the screenshot image, the domain name of the server, the identifier of the display apparatus and the storage address, and generates a two-dimensional code according to the character string. The two-dimensional code is used as a sharing control to share the screen recording file. When the user wants to obtain the screen recording file from the display apparatus 200, the user can scan the two-dimensional code through a mobile terminal with a camera such as a mobile phone, an iPad or a notebook computer. The server 400 obtains the corresponding screen recording file based on the request of the mobile terminal and feeds back it to the mobile terminal, to share the screen recording file. The above sharing method belongs to the sharing of the screen recording file in the non-local area network. If the mobile terminal wants to obtain the screen recording file stored on the server 400, there is a need to obtain the time point when the screen recording file just starts through the timestamp for generating the screenshot image, know which server to access through the domain name of the server, determine which display apparatus generated the screen recording file through the identifier of the display apparatus, and obtain the specific screen recording file through the storage address. When the mobile terminal wants to read the file, the mobile terminal can request the screen recording file from the server by scanning the two-dimensional code.

S640: controlling the display to present the sharing control on a floating layer on the display interface.

In some embodiments of the disclosure, the screen recording file generated by the display apparatus 200 can support the local playback on the display apparatus 200, and can also be shared by using the mobile terminal to scan the sharing control. After the mobile terminal obtains the screen recording file, it can be shared among friends. When the display apparatus 200 generates a screenshot image or a screen recording file, it has no affect on the playback of the content of the display apparatus 200 and no affect on other operations of the user on the display apparatus 200. When the user operates the display apparatus 200, the user can control the display apparatus 200 via voice.

Figure 17:
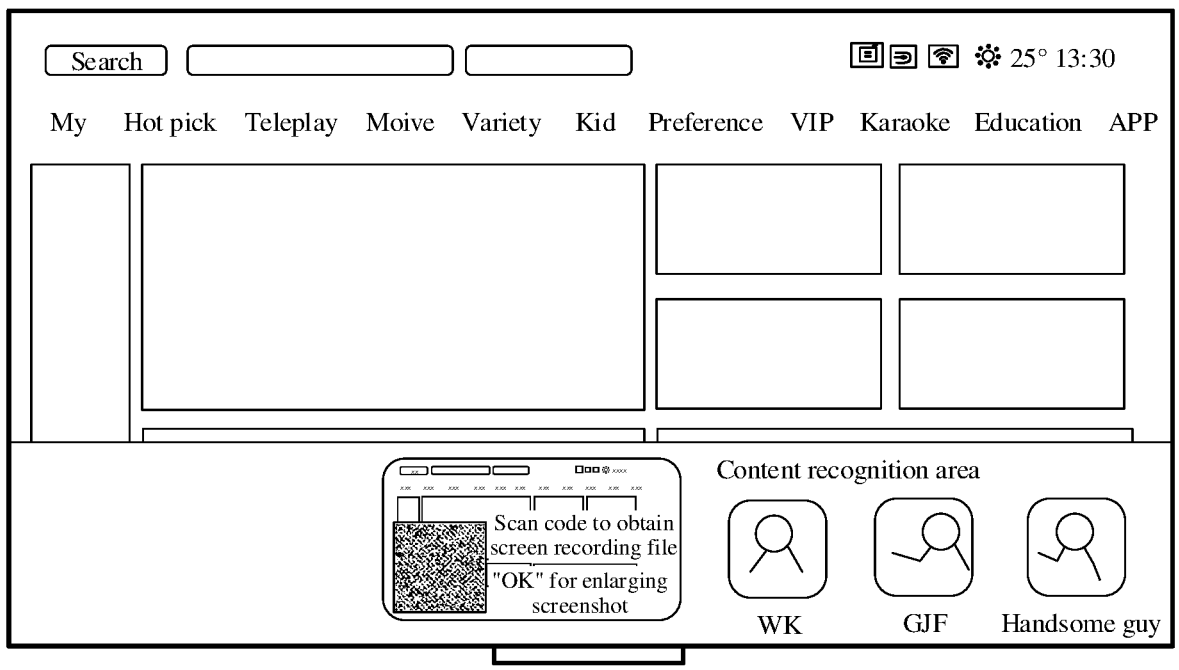
FIG. 17 shows a diagram of a presentation interface with a pop up floating layer according to some embodiments.

FIG. 17 shows a diagram of a presentation interface where the display pops up a floating layer according to some embodiments. As shown in FIG. 17, the display apparatus 200 controls the display 275 to pop up a floating layer on the current display interface if the sharing control has been generated in the process of content playing. A sharing area is set on the floating layer, and a two-dimensional code is presented in the sharing area. The background of the sharing area in FIG. 17 can be a screenshot image, and the two-dimensional code is floated above the screenshot image. In addition, a text prompt of "Scan code to obtain screen recording file" and a text prompt of "'OK' for enlarging screenshot" are set next to the two-dimensional code. When the user wants to enlarge the screenshot image in the sharing area, this can be done by pressing the "OK" button on the remote controller.

In some embodiments, the floating layer further includes a content recognition area where the person recognition result is displayed. As shown in FIG. 17, the thumbnails of the persons' head portraits and the corresponding figure identifiers are presented on the content recognition area. When the user enlarges the screenshot image by pressing the "OK" button, it is easy to know from which screenshot the person recognition result is obtained, and can carefully see the person corresponding to the thumbnail of the person's head portrait.

In the disclosure, regardless of whether the content displayed on the display is a static image or a dynamic image, the controller 250 can record the screen based on the recognition command issued by the user, and the screen recording file can not only be played locally on the display apparatus, but also can be shared by the sharing control to other devices, greatly improving the user's experience of the display apparatus.

An embodiment of the disclosure further provides a screen recording and sharing method, including: the controller 250 in the display apparatus 200 receives a startup command input from a user by pressing a screenshot button on a remote control. The controller 250 determines the sizes of the duration when the user presses the screenshot button and a preset startup duration, and records the display interface presented on the display according to the startup command and generates a screen recording file when the press duration of the screenshot button exceeds the preset startup duration. The controller 250 saves the screen recording file, and generates a sharing control according to the save path of the screen recording file after saving the screen recording file, here the sharing control is used to share the screen recording file. The controller 250 controls the display 275 to present the sharing control on the floating layer of the display interface, so that the user obtains and shares the screen recording file through a mobile device.

Figure 18:
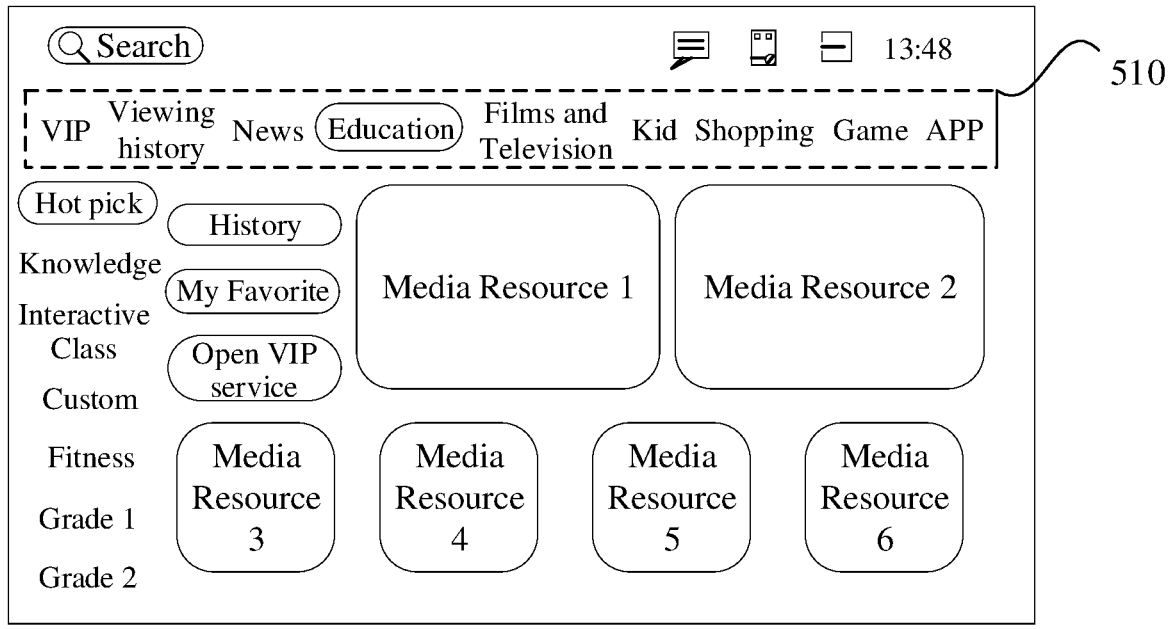
FIG. 18 shows an interface displaying icons of applications in the display apparatus 200 according to some embodiments.

In some embodiments, the display apparatus can directly enter an interface of a preset video-on-demand program after startup. The interface of the preset video-on-demand program may, as shown in FIG. 18, include at least a navigation bar 510 and a content display area below the navigation bar 510, where the content displayed in the content display area will change with the selected control in the navigation bar. The program in the application layer may be integrated in the video-on-demand program to be presented through a control in the navigation bar, or may be further displayed after the application control in the navigation bar is selected.

In some embodiments, the display apparatus can directly enter the display interface of the signal source selected last time or the signal source selection interface after startup, here the signal source may be a preset video-on-demand program or may be at least one of an HDMI interface, a live TV interface, etc. After the user selects different signal sources, the display can display the content obtained from the different signal sources.

In order to illustrate the embodiments of the disclosure clearly, a network architecture according to embodiments of the disclosure will be described below with reference to FIG. 19.

Figure 19:
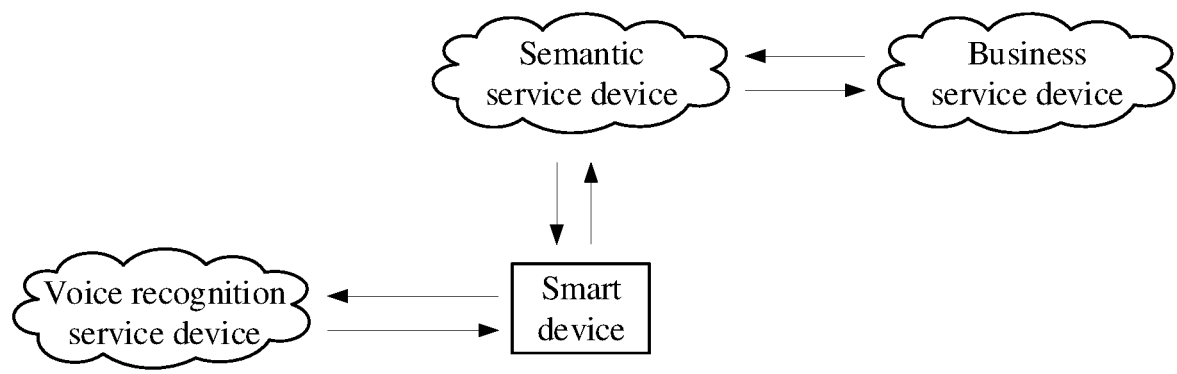
FIG. 19 shows a network architecture diagram according to some embodiments.

Referring to FIG. 19, FIG. 19 is a schematic diagram of a network architecture according to some embodiments of the disclosure. In FIG. 19, the smart device is used to receive the input information and output the processing result of the information; the voice recognition service device is an electronic device providing voice recognition service, the semantic service device is an electronic device providing semantic service, and the business service device is an electronic devices providing business service. The electronic device here may include a server, a computer, etc., and the voice recognition service, semantic service (also referred to as semantic engine) and business service here are web services that can be deployed on the electronic device. Here the voice recognition service is used to recognize audio as text, the semantic service is used for semantic analysis of the text, and the business service is used to provide specific services such as the weather query service of MJ Weather, the music query service of QQ Music, etc. In some embodiments, there may be a plurality of business service devices with different business services in the architecture shown in FIG. 19. Unless indicated otherwise, the business service devices are various types of servers in the embodiments of the disclosure.

The process of processing the information input to the smart device based on the architecture shown in FIG. 19 will be described by examples. Taking the information input to the smart device being a query sentence input in voice as an example, the above process may include the following three stages.

1. Voice Recognition Stage

After receiving the query sentence input in voice, the smart device can upload the audio of the query sentence to the voice recognition service device, so that the voice recognition service device can recognize the audio as text through the voice recognition service and return it to the smart device.

In some embodiments, before uploading the audio of the query sentence to the voice recognition service device, the smart device may denoise the audio of the query sentence, where the denoising process may include steps such as removing echoes and ambient noise, etc.

2. Semantic Understanding Stage

The smart device uploads the text of the query sentence recognized by the voice recognition service to the semantic service device, so that the semantic service device performs semantic analysis on the text through the semantic service to obtain the business field, intent, etc. of the text.

3. Reply Stage

According to the semantic analysis result of the text of the query sentence, the semantic service device sends a query instruction to the corresponding business service device to obtain the query result given by the business service. The smart device can obtain the query result from the semantic service device and output it, for example, output the query result to the display apparatus in the form of wireless, infrared, etc. In some embodiments, the semantic service device may also send the semantic analysis result of the query sentence to the smart device, so that the smart device outputs a reply sentence in the semantic analysis result. The semantic service device may also send the semantic analysis result of the query sentence to the display apparatus, so that the display apparatus outputs a reply sentence in the semantic analysis result.

It should be noted that the architecture shown in FIG. 19 is only an example and does not limit the protection scope of the disclosure. In the embodiments of the disclosure, other architectures may also be used to implement similar functions, which will omit here.

Through the display apparatus 200 in the embodiments of the disclosure, the user can select any area in the target display interface for content recognition according to the user's own needs, and the recognition effect is good. The controller 250 in the display apparatus 200 is in communication with the display 275 and configured to perform the image content recognition process. Unless otherwise specified, the steps performed by the display apparatus in the following embodiments can be understood as being performed by the controller 250 or by the controller 250 in cooperation with other components of the display apparatus 200.

The image content recognition process according to the embodiments of the disclosure will be described below with reference to the accompanying drawings.

The user can directly send a partial recognition command to the display apparatus, or can also send a partial recognition command to the display apparatus through other device.

The controller 250 may receive the recognition command sent from the user. The controller 250 may receive the recognition command input from the user directly through the user input/output interface of the display apparatus 200, or may receive the recognition command sent from the user through other device (such as a mobile phone or a remote control).

The disclosure does not limit the manner or approach for the controller 250 to obtain the recognition command. For example, the user can press a particular button on the remote controller, and the remote controller sends a corresponding recognition command to the display apparatus; or the user can output a voice recognition command to the display apparatus, for example, the user can output the voice "Who is this person?", "Where can buy this dress?", "What's in the scene?", etc. to the display apparatus.

After receiving the recognition command, the controller 250 controls the display 275 to display a partial recognition frame in the displayed target display interface in response to the partial recognition command.

Figure 20A:
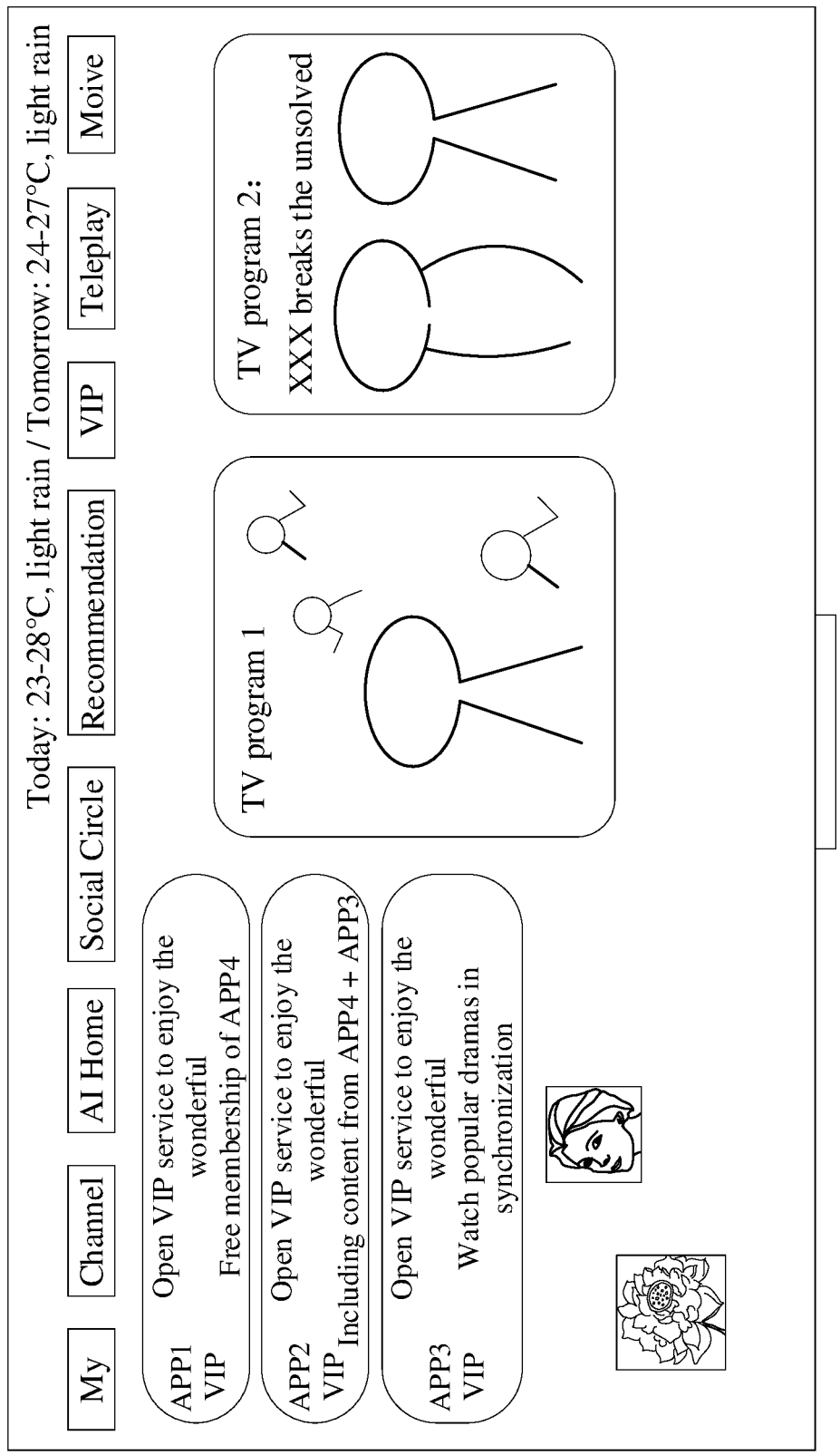
FIGS. 20A to 20J are schematic diagrams showing display effects of a partial recognition frame according to some embodiments.

The target display interface may be the interface currently being displayed on the display 275, such as a user menu interface, an audio and video playing interface, an information presentation interface, etc., which is not limited in the disclosure. There may be one or more partial recognition frames, and the sizes or shapes of multiple partial recognition frames may be the same or different; different partial recognition frames may not overlap with each other, or may fully or partially overlap. The disclosure does not limit the position where the partial recognition frame is displayed on the display 275, nor limit the shape, size, quantity, display mode, etc. of the partial recognition frame. The target interface may be as shown in the example of FIG. 20A.

Figure 20B:
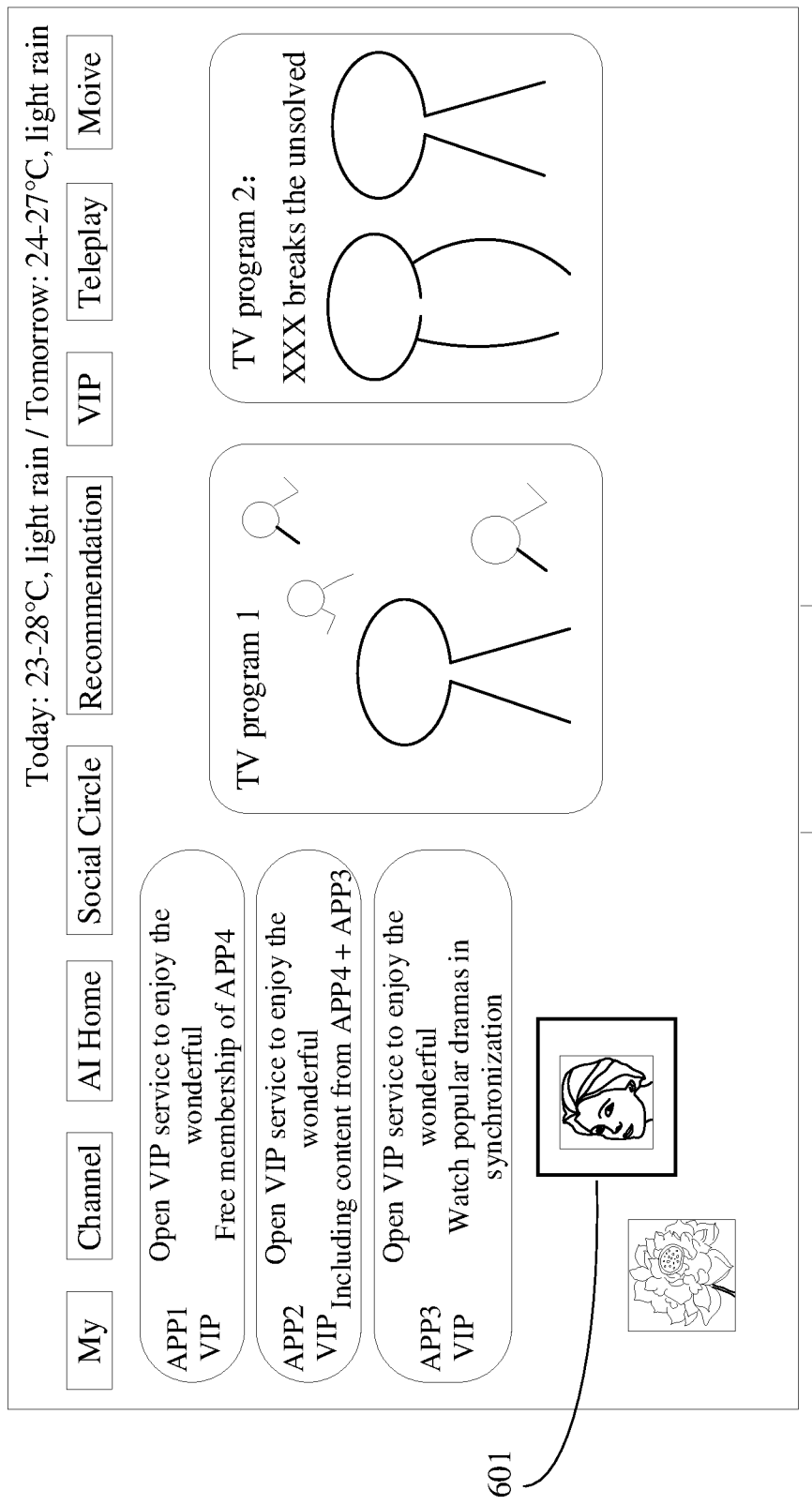
Figure 20C:
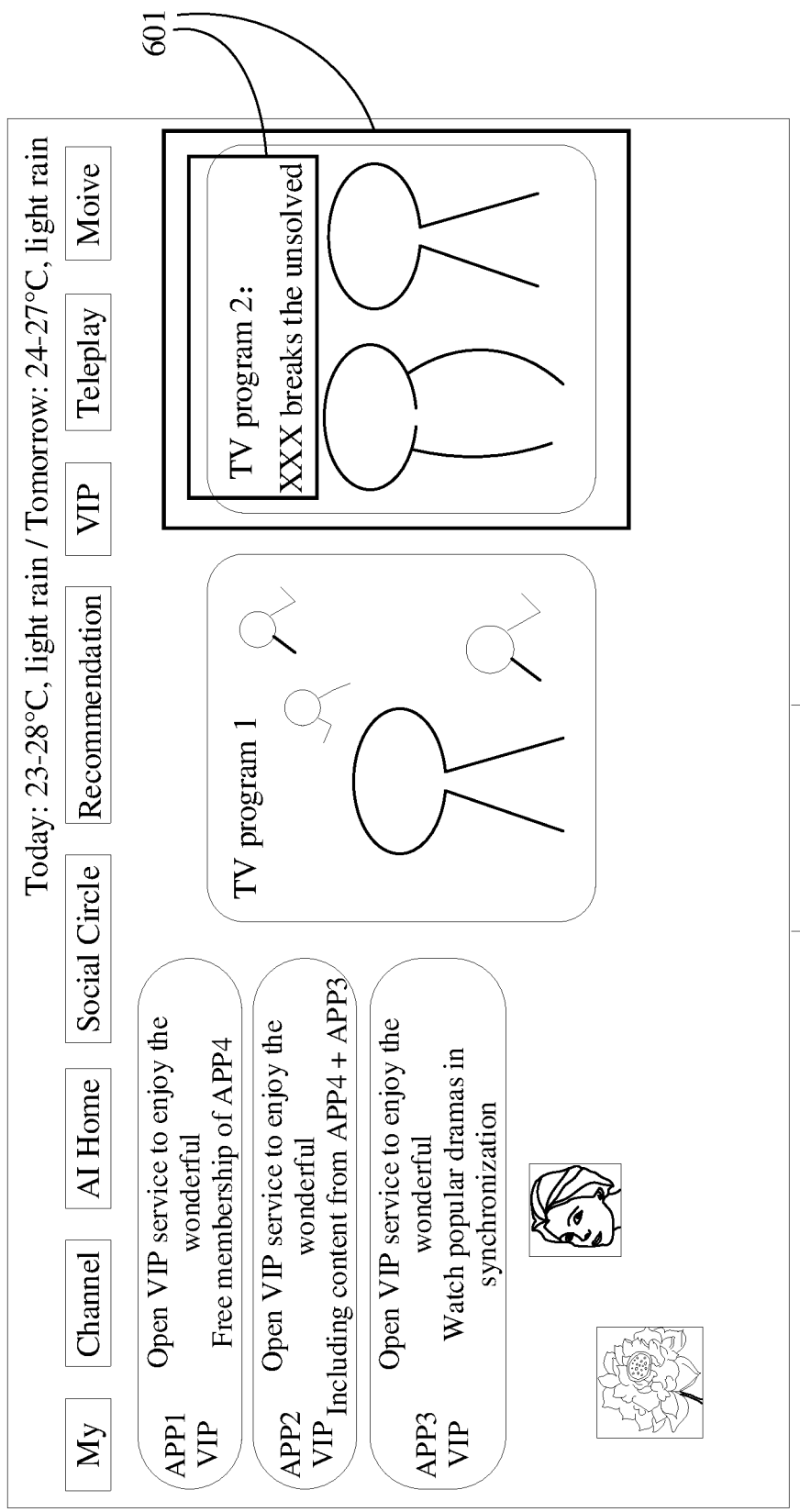

The partial recognition frame may be displayed as a line box, or may be displayed or presented in the form of a specific display effect (e.g., relatively high-brightness display, three-dimensional effect, etc.). For ease of description, a line box is only taken as an example for description in the embodiments of the disclosure, which cannot construe as a limitation to the embodiments of the disclosure. The display effect of the partial recognition frame as a line box may be as shown in examples of FIG. 20B and FIG. 20C.

Figure 20D:
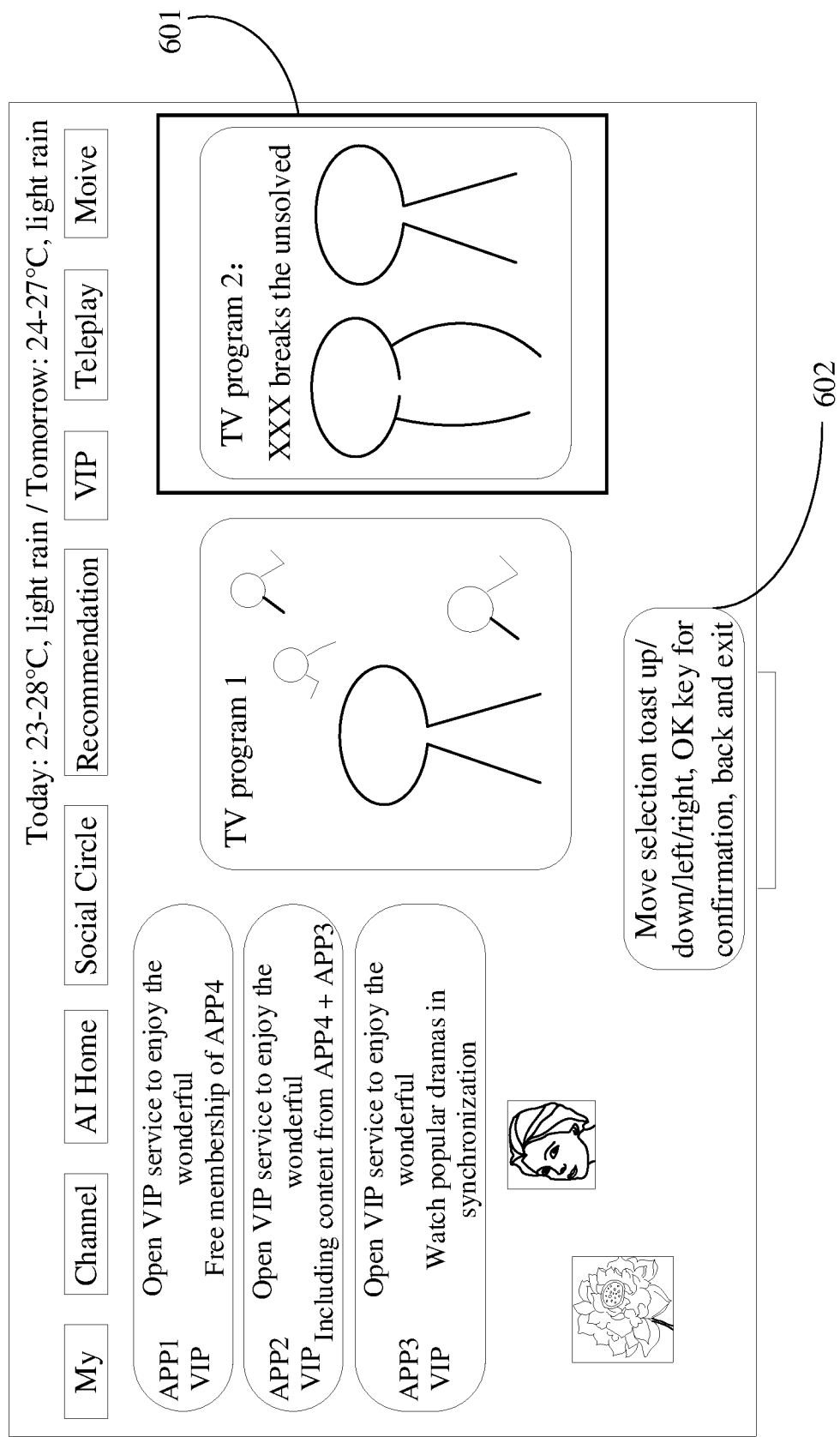

In some embodiments, the display 275 may show other information in addition to the partial recognition frame on the target display interface. For example, a prompt information toast and the prompt information corresponding to the partial recognition frame may also be displayed, where the prompt information may be used to prompt the user for a next operation that can be performed, or may also be used to describe the functions that the partial recognition frame can implement. The prompt information can be displayed in the prompt information toast 602, and the prompt information toast 602 can be displayed in a predetermined position or can be displayed in a position determined based on the partial recognition frame, and the display effect thereof can be as shown in the example of FIG. 20D. It should be noted that the partial recognition frame and the prompt information may be displayed on the same layer or may be displayed on different layers.

In other embodiments, the prompt information toast 602 may display a "re-capture" button or an "original image recognition" button. The user can move the focus to the "re-capture" button by operating the direction keys of the remote control, and can return to the state shown in FIG. 20A by clicking the "re-capture" button. Alternatively, the user can move the focus to the "original image recognition" button by operating the direction keys of the remote control, and click the "original image recognition" button to send the full image of the target display interface to the content recognition server for recognition. After receiving a confirmation command, the controller 250 sends the full image of the target display interface to the content recognition server. In the manner provided by this embodiment, the user can conveniently choose between the full-screen image recognition function and the partial image recognition function.

After a partial recognition frame is displayed in the target display interface, the user can also send an adjustment command, which can be used to adjust the shape, size, position and quantity of the partial recognition frame. After receiving the adjustment command, the controller 250 adjusts the size, shape, position, quantity, etc. of the partial recognition frame based on the content of the adjustment command, and controls the display 275 to display the adjusted partial recognition frame.

Figure 20E:
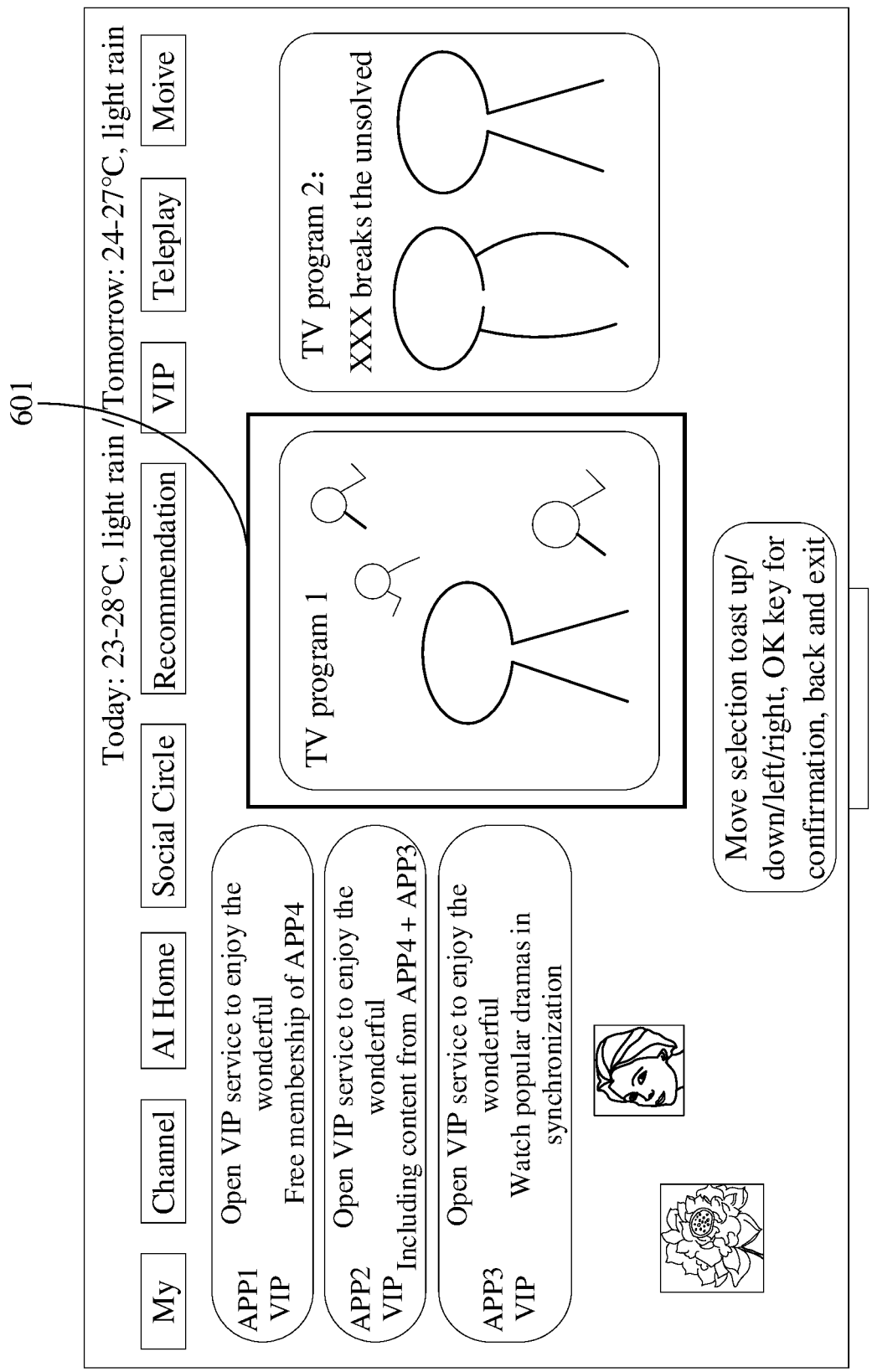

In some embodiments, the position, size, etc. of the partial recognition frame can be determined according to the position of the focus in the target display interface, and changes with the change of the focus position, that is, the area selected by the partial recognition frame is always the area where the focus is located. For example, when the focus is located in a content display window in the target display interface, the area selected by the partial recognition frame may overlap with or include the content display window, and the effect may be as shown in FIG. 20D. When the position of the focus changes and moves from one content display window to another content display window, the position and size of the partial recognition frame also changes, and the effect may be, for example, as shown in FIG. 20E. In this way, the user can adjust the position of the partial recognition frame by adjusting the position of the focus, which is convenient for the user.

Figure 20F:
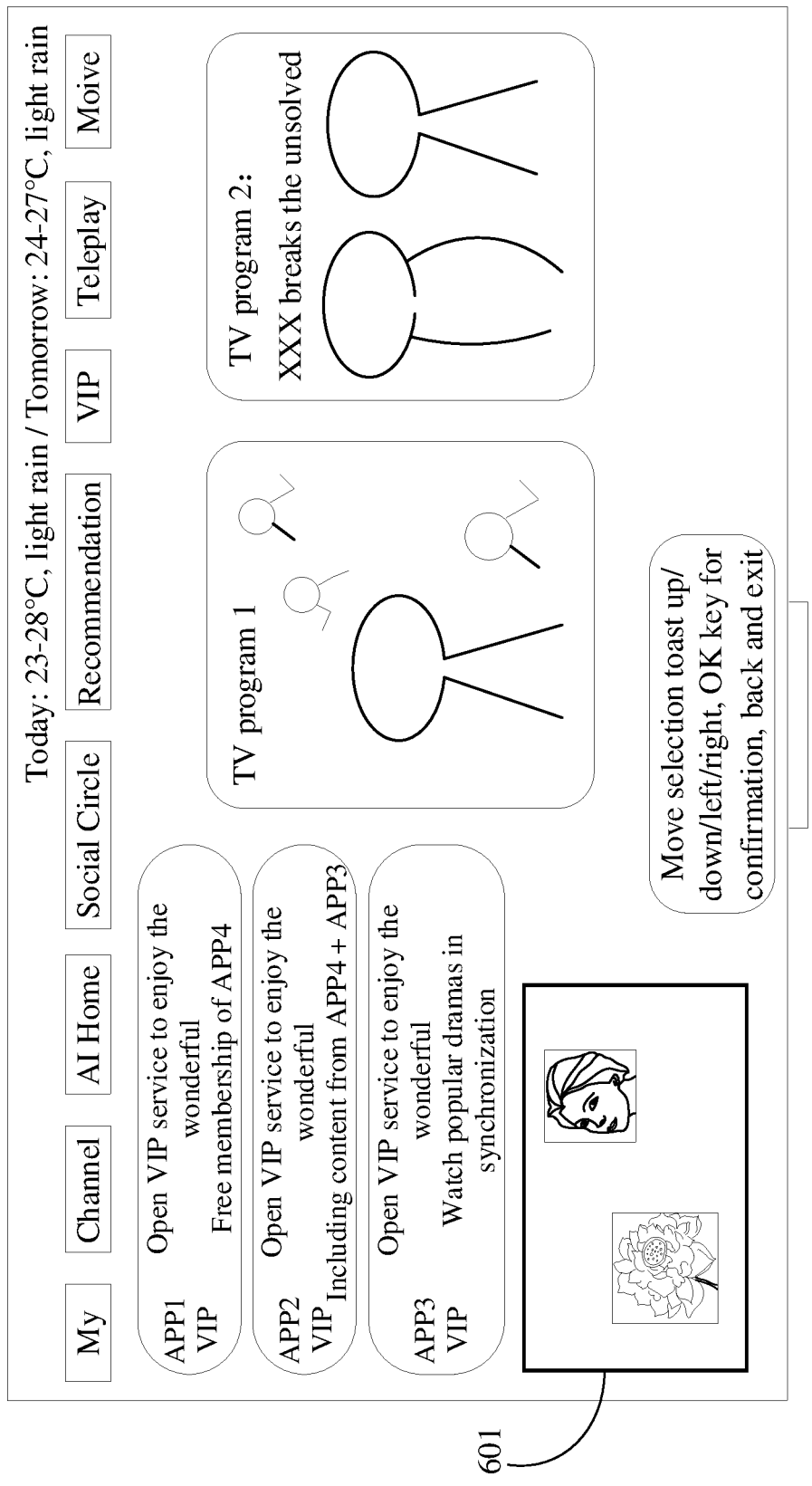
Figure 20G:
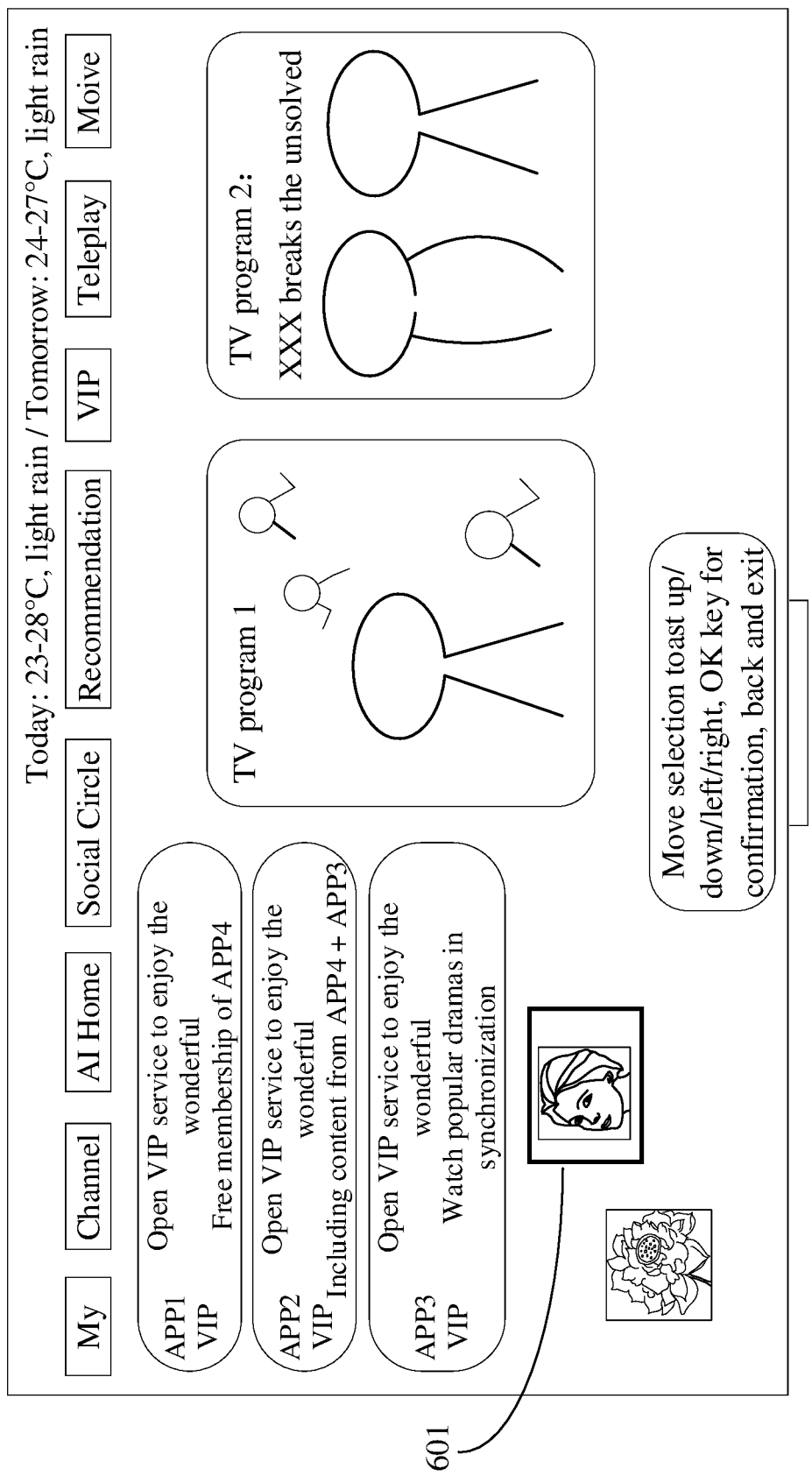

In other embodiments, the partial recognition frame may be displayed with initial size in an initial position in the target display interface, and the controller 250 may adjust the position or size of the partial recognition frame in response to the adjustment command. For example, after receiving the user's recognition command, the display 275 may display a partial recognition frame at the default position of the target display interface (e.g., at the edge or center of the target display interface), and the effect may be as shown in FIG. 20F. If the position of the partial recognition frame does not meet the user's need, then the user can issue a position or size adjustment command of the partial recognition frame. The controller 250 adjusts the position and size of the partial recognition frame in response to the adjustment command, so that the partial recognition frame encloses the image content that the user wants to search, and the effect may be, for example, as shown in FIG. 20G.

Figure 20H:
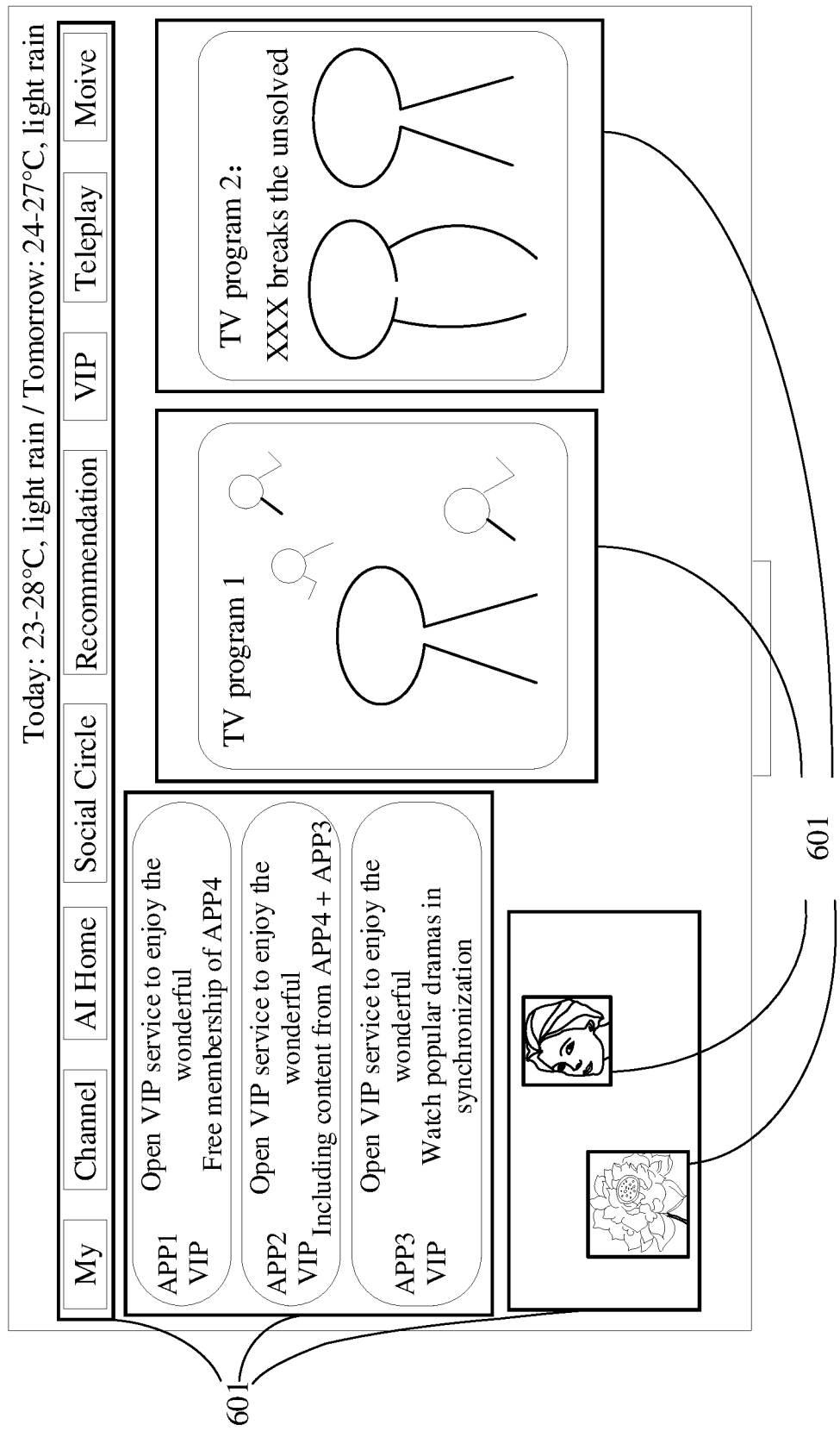

In yet other embodiments, the position and size of the partial recognition frame may be determined according to interface elements included in the target display interface, where the interface elements may be content view, window, menu, picture, text box, etc. When there are multiple interface elements displayed in the target display interface, a partial recognition frame may be displayed for one or more interface elements, and the effect may be as shown in FIG. 20H. Each partial recognition frame corresponds to an interface element, and the region selected by the partial recognition frame is a region where the corresponding interface element is located. Further, the controller 250 may increase or decrease the number of partial recognition frames in response to an adjustment command sent from the user, so as to select the image content that the user wants to search through the partial recognition boxes.

Figure 20I:
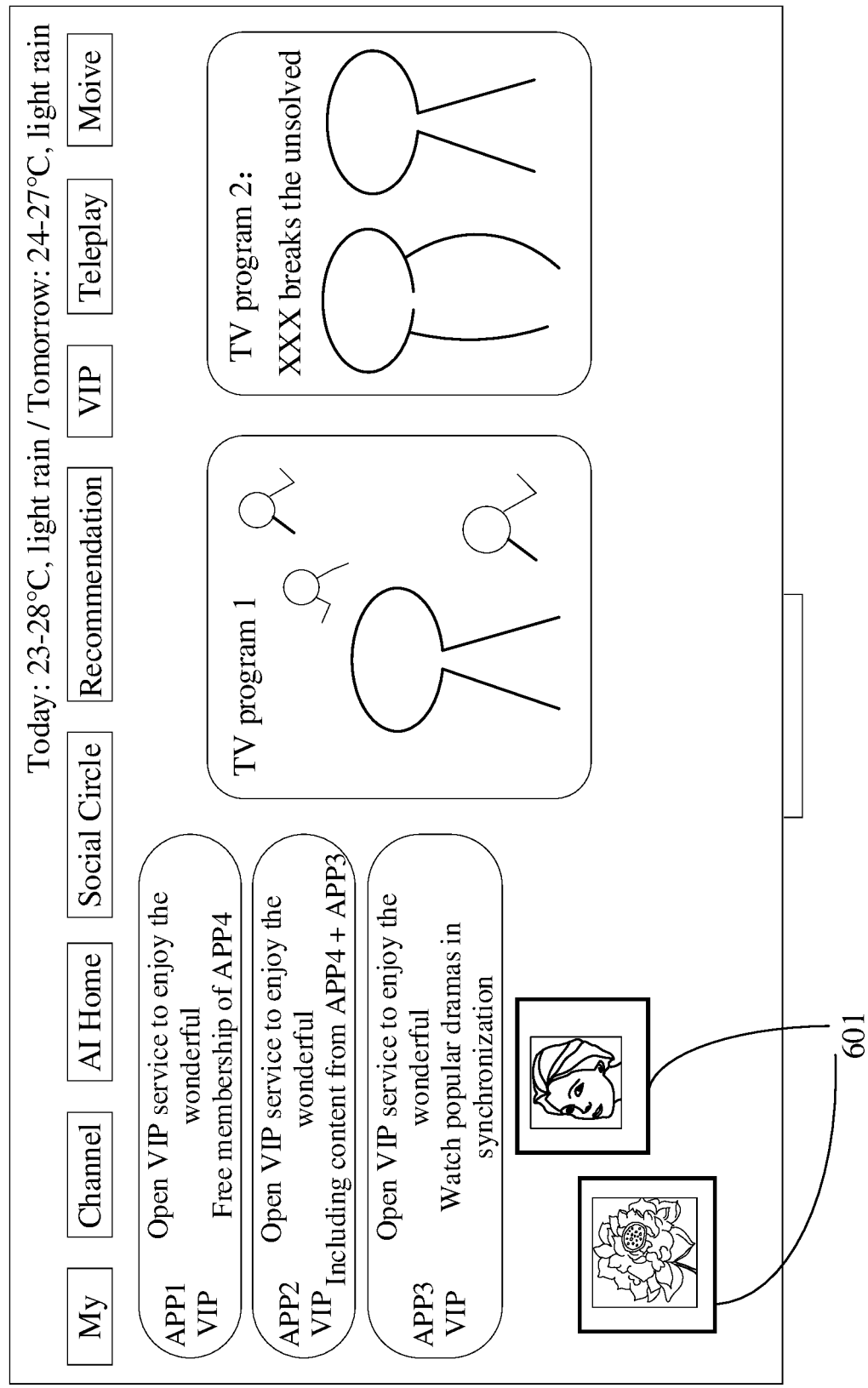
Figure 20J:
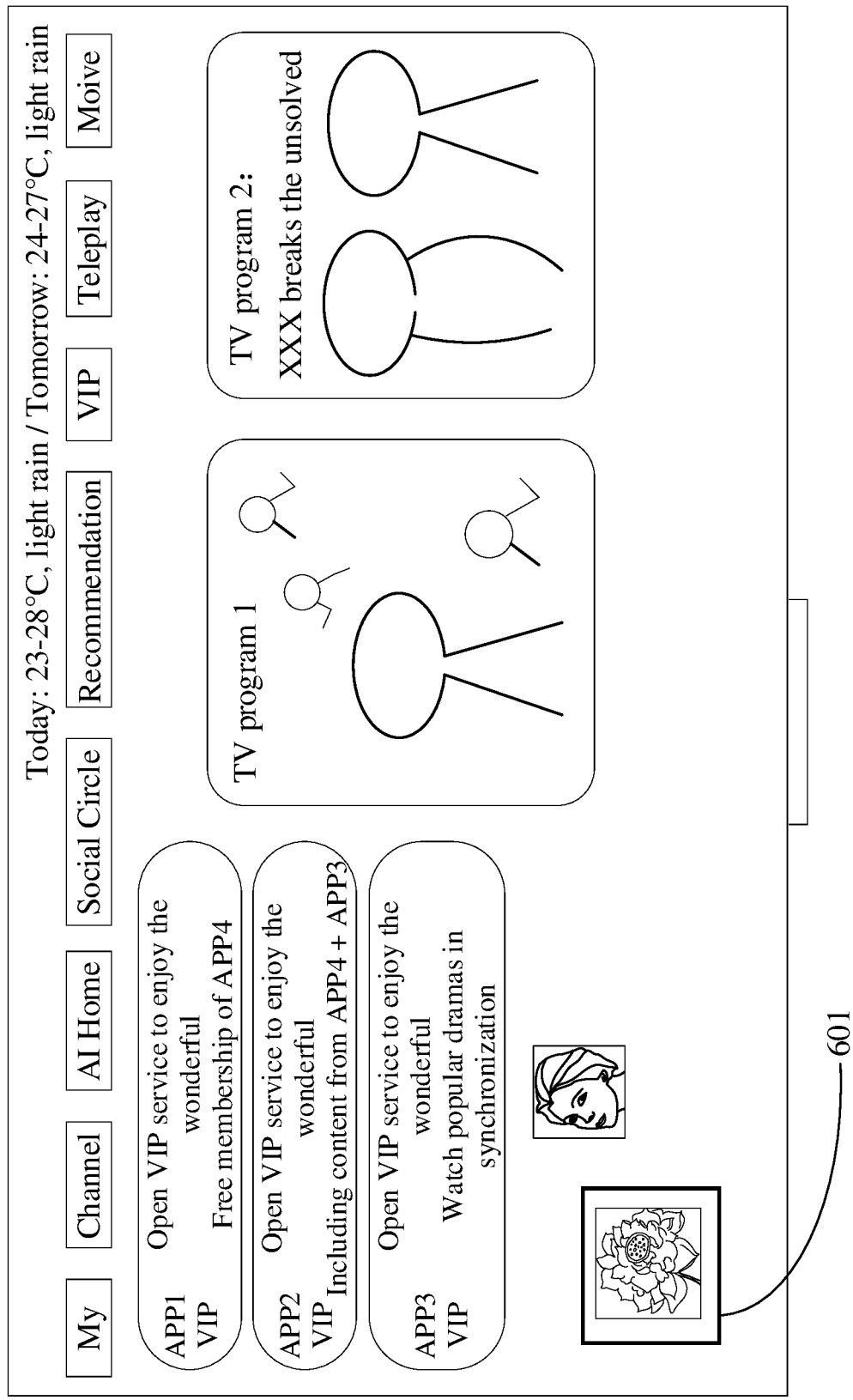

In yet other embodiments, the position and size of the partial recognition frame may be determined according to the content displayed on the target display interface. For example, the controller 250 may preliminarily recognize the target interface in advance, and then determine position and size of the partial recognition frame according to the target object (e.g., an head portrait, animal image or object image in the preliminary recognition) recognized by the controller 250 from the target display interface. When multiple target objects are displayed in the target display interface, a partial recognition frame may be displayed for each target object, for example, as shown in FIG. 20I. Each partial recognition frame corresponds to a target object, and the area selected by the partial recognition frame is the area where the target object is located. Likewise, the controller 250 may increase or decrease the number of partial recognition frames and adjust the shapes or positions of the partial recognition frames in response to an adjustment command sent from the user, so as to select the image content to be searched through the partial recognition frames, for example, as shown in FIG. 20J.

After selecting an image portion of interest through the partial recognition frame, the user can send a confirmation command to the controller 250. After receiving the confirmation command, the controller 250 sends the selected image portion to the content recognition server.

Here, the selected image portion refers to an image of the area selected by the partial recognition frame in the target display interface, and the confirmation command may be directly sent from the user or indirectly sent through other device (such as a remote control), and the confirmation command may be a single command or a combination of multiple commands. The user can issue the confirmation command to the display apparatus through the remote controller or mobile terminal by pressing a specified button of the remote controller or operating the mobile terminal; or the user can also output a voice confirmation command to the display apparatus, for example, the user can issue a voice command such as "recognize this area" or "confirm" to the display apparatus. The disclosure does not limit the specific form and obtaining approach of the confirmation command.

For example, in the state shown in FIG. 20D, the user moves the partial recognition frame left to the position shown in FIG. 20E by operating the direction keys of the remote controller, and the user can issue a partial recognition command to the display apparatus by pressing the confirmation button on the remote controller. The display apparatus may, according to the partial recognition command, cut out the selected image with text and graphics enclosed by the partial recognition frame, and send it to the content recognition server.

In some embodiments, there is only one partial recognition frame. In this case, after receiving the confirmation command, the controller 250 may send the image of the area selected by the partial recognition frame in the target display interface to the content recognition server. For example, when the partial recognition frame is as shown in FIG. 20E, the controller 250 can send the selected image to the content recognition server if the controller 250 receives a remote control signal sent from the remote control when the "OK" key of the remote control is pressed.

In other embodiments, there may be a plurality of partial recognition frames. In this case, after receiving the confirmation command, the controller 250 can select at least one of all the partial recognition frames as the selected partial recognition frame according to the content of the confirmation command, and then send an image of the area selected by the selected partial recognition frame to the content recognition server. For example, when the partial recognition frame is as shown in FIG. 20I, the controller 250 can send a selected image where the current focus is located to content recognition server every time the controller 250 receives a remote control signal sent from the remote controller when the "OK" key of the remote controller is pressed for a short time; and can send all the selected images to the content recognition server if the controller 250 receives a remote control signal sent from the remote controller when the "OK" key of the remote controller is pressed for a long time.

According to different application scenarios or pre-settings, there may be a plurality of content recognition servers simultaneously. The plurality of content recognition servers may be of different types, and different types of content recognition servers may be respectively used to recognize different target objects, and the recognition results that are fed back are different. For example, the content recognition servers may be one or more of various types, such as a person recognition server, an image recognition server, a multimedia server, a media resource server, a search engine server, etc. The content recognition server can be used to recognize different types of recognized targets such as text, image, article and person in the selected image, and feed back the corresponding recognition results. For ease of description, the first content recognition server and the second content recognition server respectively refer to different types of content recognition servers.

The selected image can be sent to only one content recognition server, or can be sent to two or more content recognition servers simultaneously; when there are a plurality of selected images, the plurality of selected images can be sent to the same content recognition server or can be sent to different content recognition servers. For example, the first selected image is sent to the first content server, and the second selected image is sent to the second content server. When the selected image is sent to the content recognition server, the selected image can be sent to a plurality of content recognition servers at the same time; or after the recognition result fed back by the first content recognition server is received, the second content recognition server can be determined according to the recognition result, and the selected image is sent to the second content recognition server. For example, the controller 250 may firstly send the selected image to the person recognition server, and may send the selected image to the image recognition server if the recognition result fed back by the person recognition server includes no valid content (for example, no person information).

After receiving the selected image, the content recognition server may perform recognition or other corresponding processing on the selected image to thereby generate a recognition result, and then send the recognition result to the controller 250. The controller 250 then receives the recognition result sent from the content recognition server correspondingly, where the recognition result may include, besides the information recognized from the selected image, information obtained by further processing or searching based on the recognized information, for example, a search result obtained by searching based on a word or letter recognized from the selected image, or the recommended media resource determined based on an actor recognized from the selected image.

The same target object can correspond to multiple sets of result information. For example, when the content recognition server recognizes two persons from the selected image, the recognition result may include two sets of person information, where each set of person information corresponds to one of the persons; when the content recognition server recognizes a person and an item from the selected image, the recognition result may include a set of person information, a set of item information and a set of item purchase link information, where the person information corresponds to the person, and the item information and the item purchase link information correspond to the item.

In some embodiments, the recognition result may include at least one set of person information, where each set of person information corresponds to a face image in the selected image, and each set of person information may include information of an area where a face image is located (such as coordinates, height H of the area where the face image is located, width W of the area where the face image is located, etc.) in the selected image as well as the identity information of the recognized person, and may also include media resource information and other information obtained based on the identity information. As shown in FIG. 20A, it is a schematic diagram of an area where a face is recognized. In FIG. 20A, the area where the face is located is a rectangular area surrounding the face, the coordinates of the upper left corner of the area where the face image is located in the coordinate system of the display 275 are $(X_0, Y_0)$; the height of the area where the face is located is Ho; and the width of the area where the face is located is Wo. The display apparatus may determine the presentation position of the content information according to the coordinates ($X_0$, $Y_0$), height Ho, and width Wo.

In other embodiments, the recognition result may include at least one set of item information, where each set of item information corresponds to an item in the selected image, and each set of item information may include the name information of the item in the selected image, and may also include product profile or purchase link information of this item or other items similar to this item. Similarly, the coordinate information for the area where the item image is located in the selected image may also be included.

In still other embodiments, the recognition result may include at least one set of media resource recommendation information, where each set of media resource recommendation information corresponds to a selected image, and each set of media resource recommendation information is used to recommend at least one set of recommended media resources based on the selected image, e.g., the recommended media resources determined based on the information of actors included in the selected image, or the recommended media resources determined according to scenarios of persons included in the selected image.

After receiving the recognition result, the controller 250 may control the display 275 to present the content information corresponding to the recognition result. The display position, display mode and display duration of the content information or parameters related to the display of the content information can be preset, or determined according to the type of the selected image, the content included in the recognition result, etc.

Figure 21A:
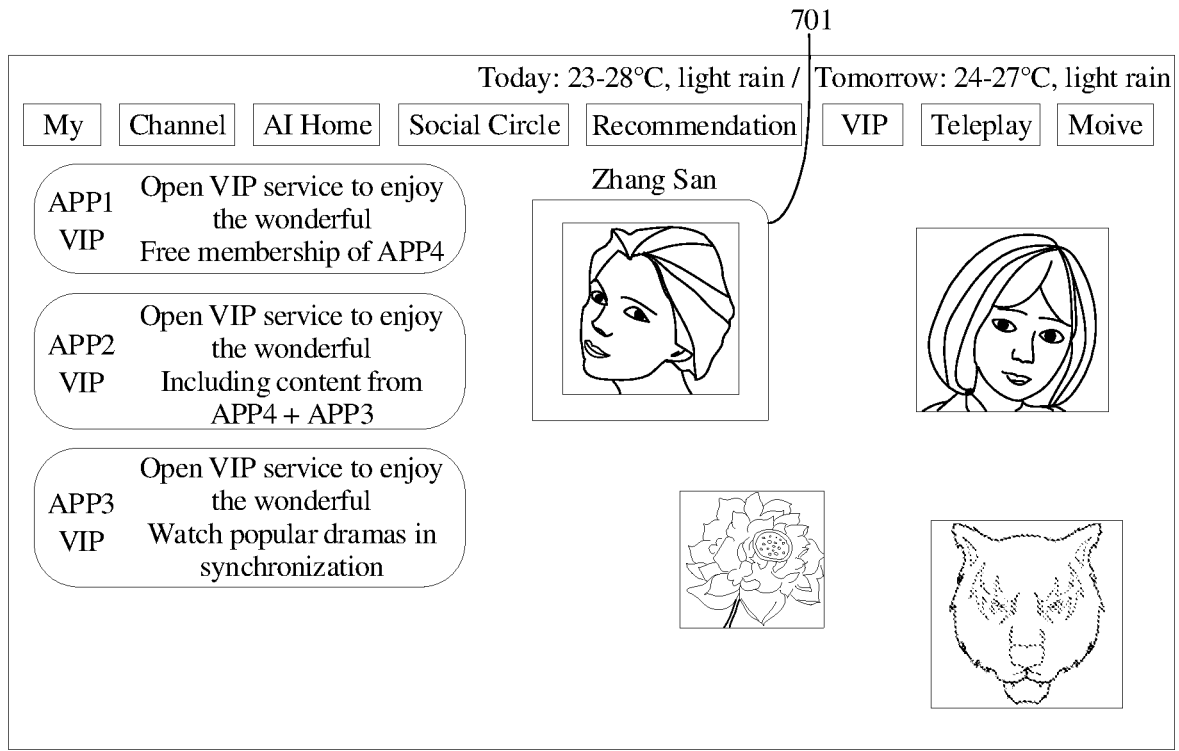
FIGS. 21A to 21C are schematic diagrams showing display effects of the content information according to some embodiments.
Figure 21B:
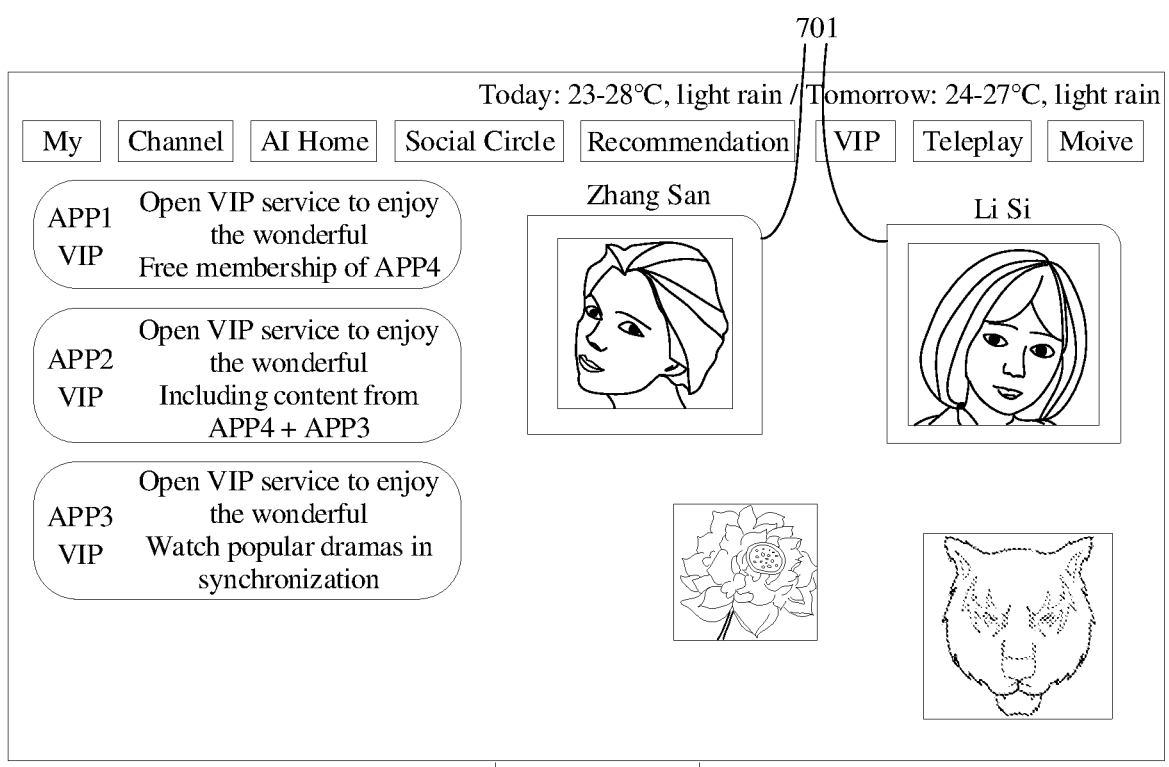
Figure 21C:
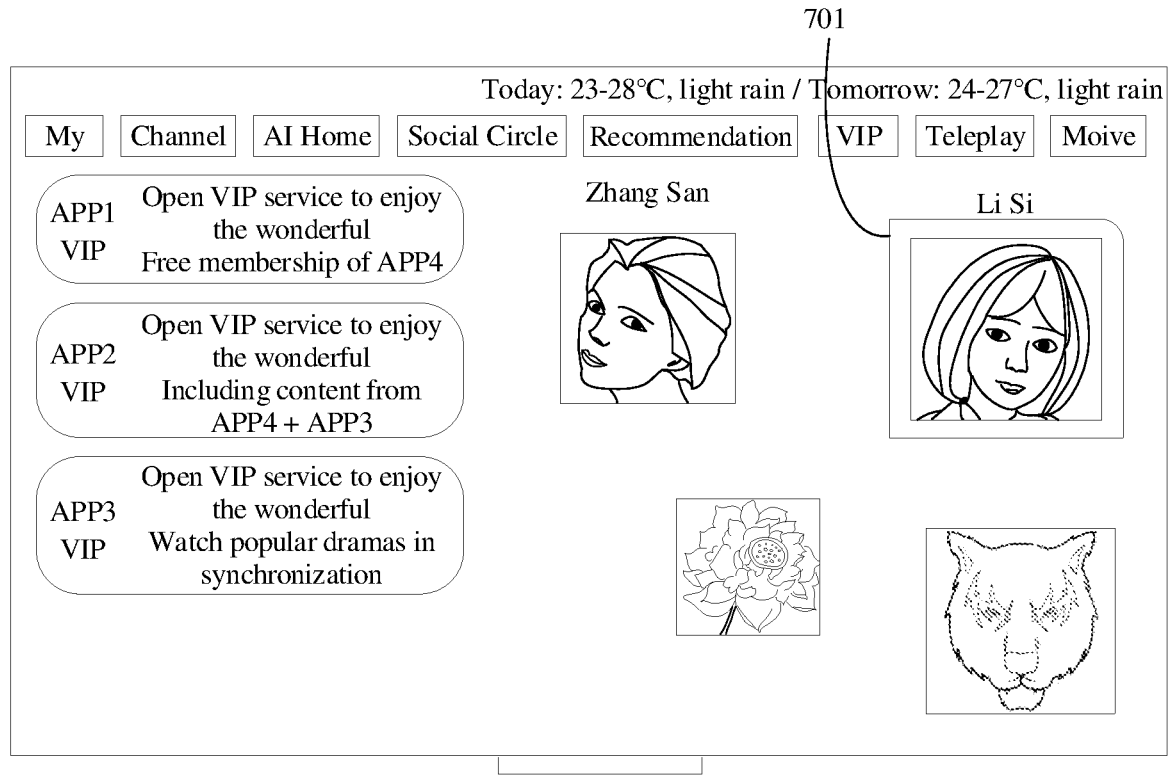

In some embodiments, when the recognition result includes the person information described in the foregoing embodiments, a face recognition box may be displayed on the selected image according to the information such as the coordinates of the area where the face is located, the height H of the area where the face is located, or the width W of the area where the face is located; and the identity information of the recognized person is displayed near the face recognition box. As shown in FIG. 21A, it is a schematic diagram of displaying a face recognition box 701 on a selected image and displaying the identity information of a recognized person near the face recognition box. In FIG. 21A, a face recognition box is presented on the selected image, and the identity information "Zhang San" of the recognized person is displayed near the face recognition box. In FIG. 21B, two pieces of identity information "Zhang San" and "Li Si" are presented respectively.

In other embodiments, when the recognition result includes at least one set of item information, an item recognition box may be displayed according to the coordinate information of the area where the article image is located, and the product profile or purchase link information of the item may be displayed in a preset area. The specific display mode will omit here.

In some embodiments, if the recognition result includes multiple sets of result information, the controller 250 may control the display 275 to simultaneously display all sets of result information according to a preset rule or display mode; or may control the display 275 to display one set or several sets of result information according to a preset rule or display mode, and then may also switch to display other set of result information automatically or according to a switch command sent from the user or switch to the result information in the recognition result fed back by other server.

For example, when the recognition result includes two sets of person information for "Zhang San" and "Li Si" and each set of person information corresponds to one person, the controller 250 can control the display 275 to display one of the two sets of person information; or the controller 250 can control the display 275 to display only the person information of "Zhang San". After receiving a switch command, the person information of "Li Si" is displayed, the person information of "Zhang San" will disappear.

For another example, when the recognition result includes a set of item profile information and a set of item purchase link information corresponding to a same item, the controller 250 can control the display 275 to show the item profile information included in the recognition result fed back from the image recognition server according to a preset rule or display mode; after receiving a switch command sent from the user, the controller 250 can control the display 275 to show the recognition result fed back by a shopping search engine according to the preset rule or display mode.

Figure 21D:
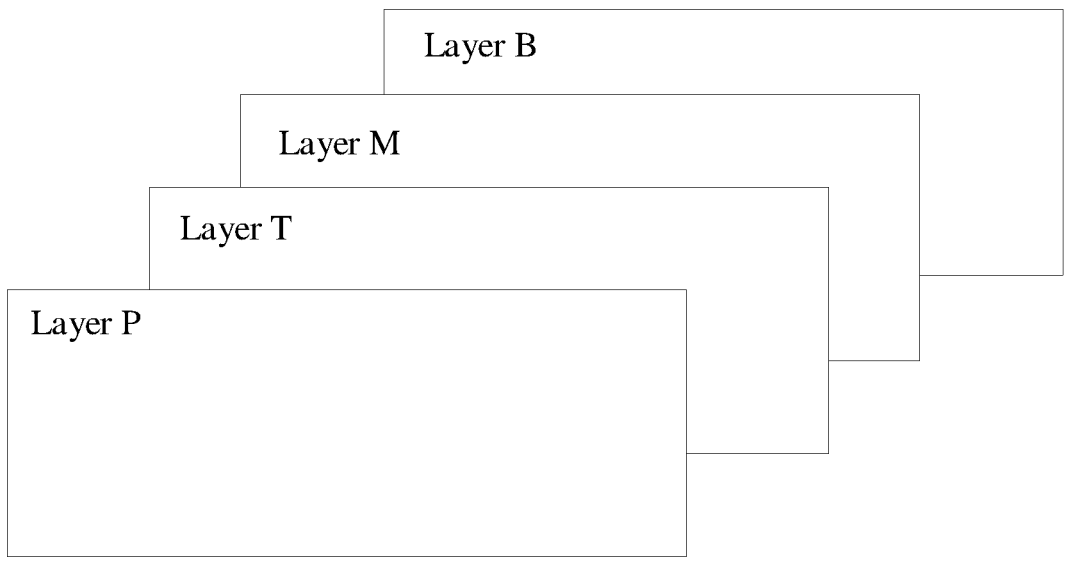
FIG. 21D is a schematic diagram showing the layer distribution according to some embodiments.

It should be noted that the display of the partial recognition frame, content information and other information can be achieved by adding new layers. For example, as shown in FIG. 21D, the layer for displaying the target display interface is referred to as layer B, while the layer for displaying the partial recognition frame is referred to as layer M which is arranged on the layer B, and the layer T for displaying the content information may be arranged on the layer M. Taking the coordinate system defined by the Android system as an example, the Z-axis coordinate value of the layer M is greater than the Z-axis coordinate value of the layer B, and the Z-axis coordinate value of the layer T is greater than the Z-axis coordinate value of the layer M. Different display effects can be achieved by adjusting the display parameters of the layer M or layer T. For example, other areas in the layer M except the area where the partial recognition frame is located may be set to be semi-transparent, so as to highlight the partial recognition frame.

For example, the graphic where the target display interface is located may be the layer B, the partial recognition frame is located in the layer M, and the content information is located in the layer T. The size of the partial recognition frame is a fixed size defined by product or the size that can be issued in the background; when the user moves the partial recognition frame through direction keys in the partial recognition selection state, the current custom View redraws and refreshes the partial recognition frame in the onDraw( ) method through a fixed step size, to achieve the effect that the partial recognition frame moves in real time with the user' key operations. Both the layer M and layer T can be layers where the mask controls in the partial hollowed-out and surrounding semi-transparent style are located. By the custom View, the middle hollowed-out position is consistent with the area of the partial recognition frame, and the color is transparent; and other positions are filled with the semi-transparent color. The layer P may be a layer where the button and prompt text are located, and this layer is the top layer. According to the pre-design definition, the corresponding text, color and pattern can be filled in the specified area, and other areas remain transparent.

In other embodiments, the layer M may also be changed from displaying the partial recognition frame to displaying the content information, so that the layer T does not need to be displayed anymore; or the layer P for implementing other functions or effects may be stacked and displayed on the layer T. In this way, the partial recognition frame, content information and other information can be displayed without changing the content displayed on the target display interface, reducing the display complexity of the information such as the partial recognition frame.

Embodiments of the disclosure provide a display apparatus, where a part of an image presented on the display apparatus can be taken as a selected image, that is, after taking a screenshot of the display interface presented on the display and generating a screenshot image, the full-screen presentation interface is entered by clicking the confirmation on the screenshot thumbnail through the remote controller or voice command; then, in response to a partial recognition command, at least one partial recognition frame is presented in the screenshot image interface in full screen, and the content recognition server is used to perform the content recognition on the image of the area selected by the partial recognition frame, to obtain a recognition result and then display the content information corresponding to the recognition result. That is, the user can select any region in the selected image for content recognition according to the user' need, and the recognition effect is good. Moreover, using the partial recognition frame to select a partial area for content recognition, the recognition area is reduced, the success rate and accuracy of recognition are improved, and it is also more interesting, compared with the method of using the entire image for content recognition. Further, since the recognition area is reduced, the data transmission amount and bandwidth pressure can be reduced and the transmission speed of the content recognition result can be improved when the content recognition server is used for content recognition.

Corresponding to the foregoing embodiments of the display apparatus, the disclosure further provides a display method. The embodiment of the display method of the disclosure will be illustrated below in combination with the drawings.

Figure 22:
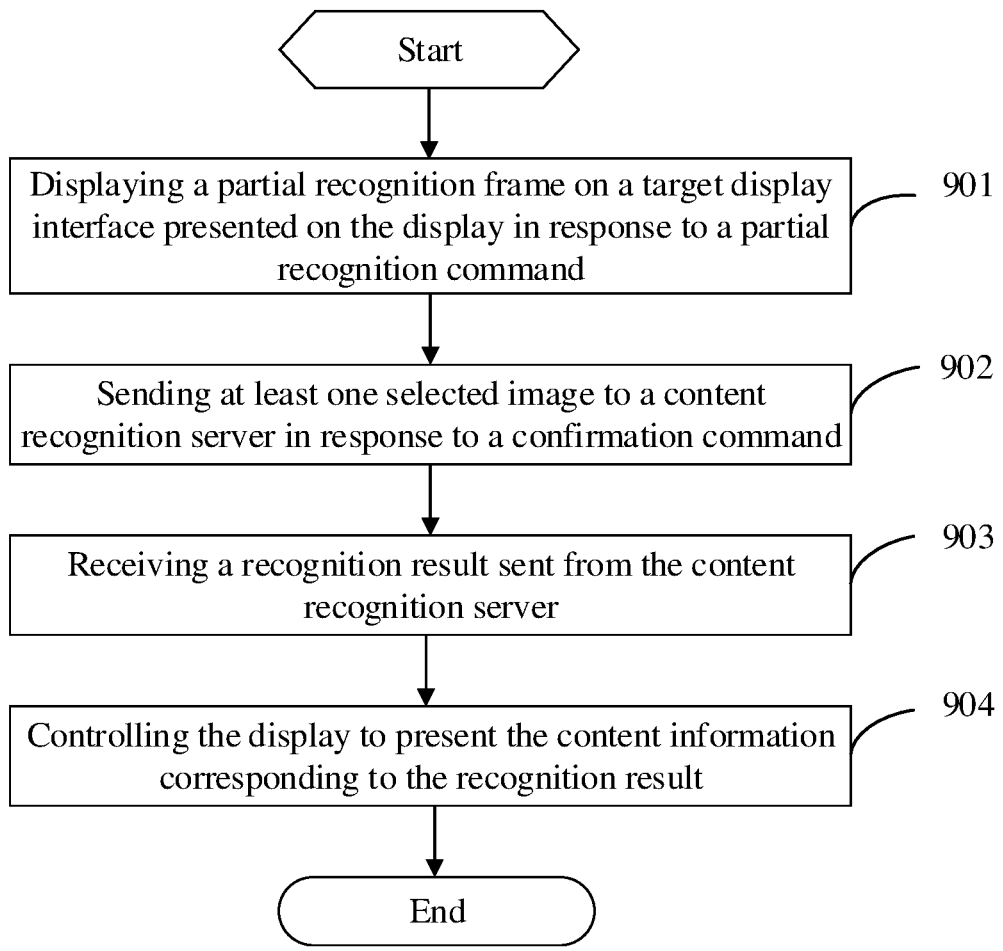
FIG. 22 is a schematic flowchart of an image content recognition method according to some embodiments.

Referring to FIG. 22, it is a flowchart of an image content recognition method provided in the disclosure. As shown in FIG. 22, the method includes the following steps.

Step 901: displaying a partial recognition frame on a target display interface presented on the display in response to a partial recognition command.

The display apparatus can receive a recognition command sent from a user. When the recognition command is a partial recognition command, a partial recognition frame is displayed on the target display interface shown on the display. For how to receive the partial recognition command, reference may be made to the foregoing embodiments, which will omit here.

There are many ways to display the partial recognition frame. At least one partial recognition frame can be added to the content included in the target display interface, or a layer with a partial recognition frame can be superimposed and displayed on the target display interface on the display, which is not limited in the disclosure.

The display position of the partial recognition frame on the display may vary according to different application scenarios. For example, the partial recognition frame may be displayed at a preset position, or displayed at a position determined based on interface elements included in the target interface, or displayed at a position determined based on the position of a target object recognized by the controller from the target display interface, which is not limited in the disclosure either.

After the partial recognition frame is displayed, an adjustment command for the partial recognition frame may also be received, where the adjustment command for the partial recognition frame is used to adjust the display position, size or display mode of the partial recognition frame. For the adjusted display mode of the partial recognition frame, the manner to realize the adjustment of the partial recognition frame, etc., reference may be made to the foregoing embodiments.

Step 902: sending at least one selected image to a content recognition server in response to a confirmation command.

After receiving the confirmation command, the display apparatus may send at least one selected image to the content recognition server in response to the confirmation command.

The disclosure does not limit the number of selected images and the number of content recognition servers, which may be one or more. The contents included in different selected images may be independent of each other or may overlap. There may also be one or more content recognition servers, and different recognition servers may also be used to recognize different types of content from images or provide different pieces of information.

Step 903: receiving a recognition result sent from the content recognition server.

The recognition result may include one recognition result sent from one recognition server, or a plurality of recognition results sent simultaneously or successively from one recognition server, or a plurality of recognition results sent simultaneously or successively from a plurality of recognition servers. Each of the recognition results may contain multiple sets of result information, each set of information corresponds to a target object recognized from the selected image, and the same target object may correspond to multiple sets of result information.

Step 904: controlling the display to present the content information corresponding to the recognition result.

The content information may be the content included in the result information, that is, only the content included in the result information itself may be displayed. For example, the content information may be content such as text, graphics or images. Alternatively, the content information may also be information further generated or obtained based on the result information. For example, the content information may be graphics or images generated based on parameters included in the result information, or page content obtained based on links included in the result information, which is not limited in the disclosure either.

Since the recognition result may contain a lot of content, after the recognition result is received, all the result information included in the recognition result can be displayed at one time through the content information; or the result information included in a part of the recognition result can be firstly displayed, and then the result information included in another part of the recognition result can be displayed; or a part of the result information included in the recognition result can be firstly displayed, and then another part of the result information included in the recognition result can be displayed.

In some embodiments, the content information corresponding to the recognition result of the first content recognition server among the plurality of content recognition servers may be displayed firstly; and after receiving a switch command input from the user, the content information corresponding to the recognition result of the second content recognition server among the plurality of content recognition servers is displayed in response to the switch command.

In other embodiments, the content information corresponding to the recognition result of the first content recognition server among the plurality of content recognition servers may be displayed firstly; and after receiving a switch command input from the user, the content information corresponding to the recognition result of the second content recognition server among the plurality of content recognition servers is displayed in response to the switch command.

Figure 23:
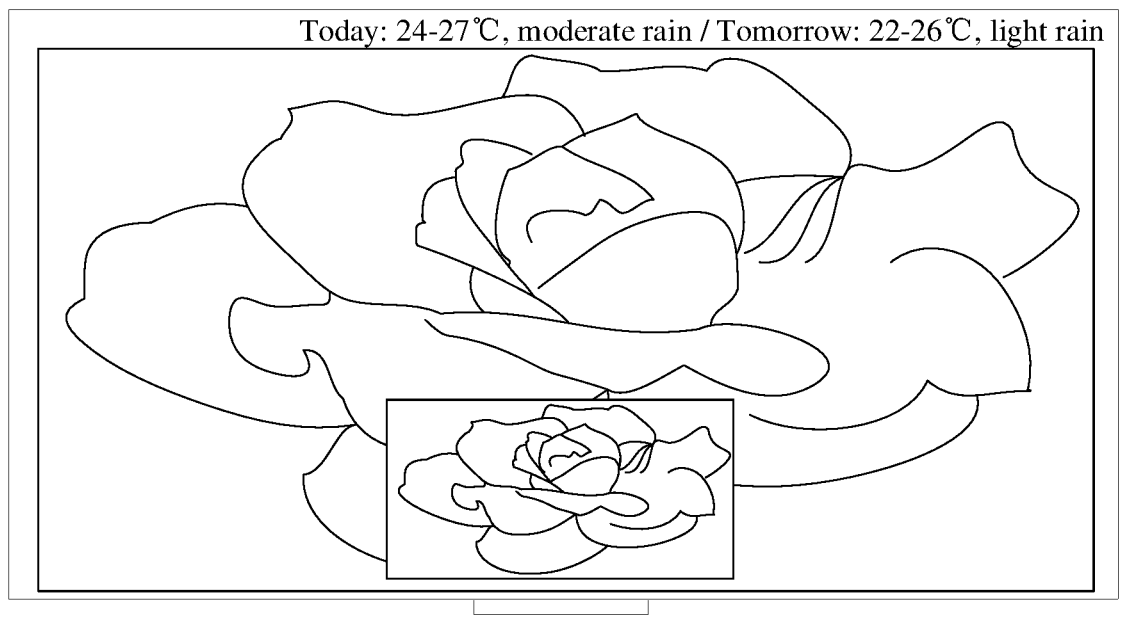
FIG. 23 is a schematic diagram showing the display effect of a screenshot image according to some embodiments.

The controller of the display apparatus 200 in the disclosure may receive screenshot commands in various forms. After receiving a command for getting a sceenshot or a screenshot command, a screenshot operation is performed on the current display interface of the display 275 to obtain a screenshot image in response to the command After obtaining the screenshot image, the display apparatus may display the screenshot image or a thumbnail of the screenshot image. For example, as shown in FIG. 23, the thumbnail of the screenshot image is superimposed on the interface at the upper left corner of the display screen 275, which is not limited in the disclosure.

Here, the screenshot command may be directly sent from the user to the display apparatus 200. For example, the screenshot command in the form of voice, such as "who is this person", "where can you buy this dress", "what's in the picture", etc., is directly sent to the display apparatus 200 in voice; or the screenshot command may be sent from the user to the display apparatus 200 by operating a particular key or function button of a mobile phone, a remote controller or other device. The disclosure does not limit the form of the screenshot command or the manner of how to obtain the screenshot command.

According to different scenarios, the screenshot image may include all the content displayed on the current display interface, or may include only a part of the content presented on the current display interface. In order to reduce the amount of data transmission and reduce the data processing amount in the image recognition process, the screenshot image may only include the content displayed in a part of the current display interface, for example, may only include the content displayed in the video playing window in the current display interface, but not the content outside the video playing window.

Due to the influence of the user operation delay or the data processing delay of the display apparatus 200, the screenshot image may include no target object, where the target object refers to an object that the user may be interested in. For example, there may be a long time delay from the time that the picture including the target object is shown on the display 275, to the time that the user inputs a screenshot command, and then to the time that the screenshot operation is actually performed by the display apparatus 200. The existence of this delay may also cause the final screenshot image to be inconsistent with the display pictures that the user wants to capture, and may also cause the unclear image of the target object or even no target object in the screenshot image. The server 400 performs content recognition on such screenshot image, and may not be able to select a target object therefrom, thereby failing to provide the user with information that may be of interest to the user.

In order to avoid such a situation, when the display apparatus 200 obtains a screenshot image, the display apparatus 200 may also obtain the context information corresponding to the screenshot image and then send the context information to the server 400. Then the server 400 may generate the recommended content or complete the image recognition based on the context information, and then generate the corresponding reply information through which the user is provided with information that may be of interest to the user. In this way, regardless of the content or quality of the screenshot image, and regardless of whether the server 400 can recognize a target object from the screenshot image, the server 400 can feed back the recommended content or a recognition result that may be of interest to the display apparatus 200, for the display apparatus 200 to display.

The implementations of the disclosure will be further described below with reference to some embodiments.

In some embodiments of the disclosure, the context information is the basis for the server 400 to provide the recommended content. After obtaining the context information, the server 400 may provide the recommended content or recognition result corresponding to the scene information. That is, after obtaining the context information, the server 400 may provide different recommended contents or recognition results to the display apparatus 200 according to different contents of the context information. The context information may refer to any information other than the screenshot image. Generally, the context information may include information associated with the video, information associated with the screenshot image, or information of the running status of the display apparatus 200, etc.

For example, the context information may include one or more pieces of information associated with a video being played by the display apparatus 200, such as the video ID of the video, the video name, the video play progress, or whether the video is a local video, etc.; or may include one or more pieces of information associated with the screenshot image, such as the time when the display apparatus 200 receives the screenshot command, the resolution of the screenshot image, the application name for the video, etc.; or may include one or more pieces of information associated with the running status, such as information of the application running on the display apparatus 200, the time during which the display apparatus 200 has been running continuously, etc.

In addition to sending the context information to the server 400 in the information obtaining request, the display apparatus 200 may also send other information such as a screenshot image to the server 400 in the information obtaining request, to facilitate the server 400 to perform content recognition on the screenshot image and then feed back a recognition result or the recommended content determined based on the recognition result to the display apparatus 200. In order to improve the recognition effect of the screenshot image, the auxiliary information for assisting the server 400 to perform content recognition on the screenshot image may also be sent to the server 400, in addition to sending the screenshot image to the server 400. The auxiliary information may also be of various types, and for example, may include images related to the screenshot image (for example, a key frame in the video closest to the screenshot image, an image frame adjacent to the screenshot image, a video clip including the screenshot image, etc.), or may also include information related to the video, such as the video ID, name, source of the video.

There are various ways for the display apparatus 200 to send the information obtaining request. Generally, the display apparatus 200 can send an information obtaining request including the context information to the server 400 after obtaining the screenshot image, so as to send the context information to the server 400 through the information obtaining request. In addition to the context information, the information obtaining request may also include other information such as the screenshot image or auxiliary information. The information obtaining request may also include only the screenshot image and auxiliary information without the context information, which is not limited in the disclosure.

In some embodiments, the display apparatus 200 can send the information obtaining request to the server 400 only when a predetermined condition is met. For example, the display apparatus 200 can send the information obtaining request to the server 400 only when the screenshot image includes a picture of a currently playing video. If the screenshot image does not include a picture of the currently playing video, the screenshot image may be sent to the content recognition server for content recognition in a normal way.

In other embodiments, the display apparatus 200 may also send the information obtaining request to the server 400 only after receiving a confirmation command sent from the user; if the confirmation command sent from the user is not received, the display apparatus 200 may send only the screenshot image in a form other than the information obtaining request to the content recognition server for content recognition, in a normal way after obtaining the screenshot image, without sending the information obtaining request; or the display apparatus 200 may send neither the information obtaining request nor the screenshot image to the server 400, which is not limited in the disclosure.

In various embodiments of the disclosure, the video may be a video that has been stored in the display apparatus 200 in advance, or may be a video generated (for example, a game picture) or captured (for example, an image captured by a camera) by the display apparatus 200 in real time, or may be a video from streaming media, live broadcast signal or TV signal. The type of the video is not limited in the disclosure. The videos stored locally by the display apparatus 200 may also be various kinds of videos, such as a streaming video played by the display apparatus 200, a live TV picture shown on the display apparatus 200, a video image captured by the local camera of the display apparatus 200, etc.

There may be various ways to determine whether the screenshot image includes a picture of a currently playing video. The display apparatus 200 may determine whether the screenshot image includes the picture of the currently playing video according to the working state of the display apparatus 200, the playing program or the received instruction, etc. For example, when the display apparatus 200 is in the video playing state (that is, when a video is being played), it can be determined that the screenshot image includes a picture of the currently playing video; or, when the current display interface includes a video playing window, it can be determined that the screenshot image includes the picture of the playing video; or, the display apparatus 200 may also determine whether the screenshot image includes a picture of the playing video through image recognition. The specific implementation processes of various determining methods will not be repeated here.

The disclosure does not limit the types and the number of servers 400. In different scenarios, the number and type of the servers 400 may also be different. The server 400 may be independent of the display apparatus 200, or may be a part of the display apparatus 200. There may be one or more servers 400. A plurality of servers 400 may be used to implement different functions or provide different information respectively, and the same server 400 may also be used to implement a plurality of functions or provide different kinds of information. The display apparatus 200 may send the information obtaining request to all the servers 400 or only a part of the servers 400.

According to different contents included in the information obtaining request, or different types of the servers 400, the servers 400 process the information obtaining request in different ways. The disclosure does not limit the functions that can be implemented by the server 400 and the implementation processes of the functions. Correspondingly, the content included in the information obtaining request and the content included in the reply information may also be various.

The implementations of the disclosure will be further described below with reference to some specific embodiments.

In some embodiments, the information obtaining request includes a screenshot image, and the reply information may include a recognition result of a target object recognized from the screenshot image; and correspondingly, the server 400 may include a content recognition server.

In this embodiment, the content recognition server is configured to perform content recognition on the screenshot image and generate reply information. There may be a plurality of content recognition servers, and each of the content recognition servers may only be used to recognize a specific type of target object, for example, only one type of target object such as text, person, item, etc. The display apparatus 200 may select one or more content recognition servers as the selected server(s) according to the content of the screenshot command, the content of the confirmation command or other information, and then send the information obtaining request to the selected server(s). For example, when the screenshot command is a voice command of "who is this actor", a person recognition server 400 for person recognition may be selected from a plurality of servers 400, and the information obtaining request is sent to the person recognition server 400. Further, the reply information may also include the recommended content determined by the content recommendation server according to the recognition result, and then the content recognition server or the content recommendation server sends the reply information to the display apparatus 200, where the reply information may include the recognition result and/or the recommended content.

Based on the implementation in this embodiment, the server 400 that conforms to the user's intention for obtaining the information can be selected and used to recognize the screenshot image, so that the result obtained by recognition meets the user's expectation better.

In other embodiments, the information obtaining request includes context information such as a video ID and video play progress, the reply information may include a recognition result of a target object, and then the server 400 may include a content recognition server.

When the user plays an online video, due to restrictions such as traffic or bandwidth, he may choose and play a lower definition version (that is, lower resolution or lower code rate), rather than highest definition version (that is, highest resolution or highest code rate). In this case, the definition of the screenshot image will also be relatively poor, causing difficulty for image recognition or a decrease in the accuracy of image recognition. In this case, after receiving the information obtaining request, the content recognition server can find the highest-definition version of the video according to the video ID of the video, then obtain the highest-definition version of the screenshot image from the highest-definition version of the video according to the play progress of the video, and then perform content recognition on the highest-definition version of the screenshot image to obtain a corresponding recognition result. Further, the reply information may also include the recommended content determined by the content recommendation server according to the recognition result.

Based on the implementation in this embodiment, the server 400 may not need to obtain the screenshot image directly from the display apparatus 200, and the display apparatus 200 may only send the video ID of the video and the play progress of the video to realize the content recognition of the screenshot image, thereby reducing the amount of data transmission, and saving the traffic consumption of the display apparatus 200 in the wireless network scenario.

In other embodiments, the information obtaining request includes context information such as a video ID and video description information of a video, the reply information may include a recognition result of a target object recognized from the screenshot image, and then the server 400 may include a content recognition server.

Since the same target object may have different meanings in different scenarios, the recognition result obtained may be very simple or limited, if only the content recognition is performed on the screenshot image. For example, the same actor will play different roles in different episodes. If only the content recognition is performed on the screenshot image, it is usually only possible to recognize who the actor is, but it is impossible to determine which episode the screenshot image is from and who the actor is playing in the episode. In this case, the display apparatus 200 may use the video ID, name, source and other description information of the video as the auxiliary information. When the description information is included in the information obtaining request, the server 400 may firstly recognize the screenshot image to generate a preliminary result, and then expand or process the preliminary result based on the auxiliary information to obtain a recognition result. For example, the server 400 may firstly recognize the screenshot image to obtain a preliminary recognition result that an actor in the screenshot image is "Zhang San", then determine an episode corresponding to the screenshot image through the description information, and then determine the role played by this actor in the episode as "Li Si" according to the episode. Thus, the final recognition result may be "The actor in the screenshot image is Zhang San, and the role he plays in this episode is Li Si". Further, the reply information may also include the recommended content determined by the content recommendation server according to the recognition result. For example, the episodes with the same or similar role as "Li Si" are used as the recommended content, and then the content recognition server or the content recommendation server sends the reply information to the display apparatus 200, where the reply information may include the recognition result and/or the recommended content, so as to enrich the content included in the recognition result.

In other embodiments, the information obtaining request includes auxiliary information such as a screenshot image and at least one key frame, the reply information may include a recognition result of a target object, and then the server 400 may include a content recognition server.

Depending on different encoding methods, the video may contain key frames and transition frames. For example, if the screenshot image is an image corresponding to a transition frame, the target object in the screenshot image may be unclear, resulting in the low success rate of recognition of a target object. In this case, after receiving the information obtaining request, the content recognition server may not recognize the screenshot image, but directly perform content recognition on the key frames one by one; or may perform content recognition on the key frames when no target object is recognized from the screenshot image. If the target object is recognized from the key frame, the reply information including the recognition result of the target object in the key frame may be generated.

Further, the server 400 may further include a content recognition server, and the reply information may further include recommended content determined based on the recognition result. The content recommendation server may determine the recommended content according to the recognition result, and then the content recognition server or the content recommendation server sends the reply information to the display apparatus 200. It should be noted that the key frame may also be replaced with an adjacent frame of the frame corresponding to the screenshot image in this embodiment, and the specific process will not be repeated here. In this embodiment, when the screenshot image is an image corresponding to a transition frame, the key frame closest to the transition frame or adjacent frame may be used as the auxiliary information, so that the server 400 can also perform content recognition on the key frame in addition to the content recognition on the screenshot image, thereby improving the recognition rate of the target object, and avoiding the failure to obtain the recognition result due to poor timing of the user's screenshot operation.

In other embodiments, the information obtaining request includes context information such as the playback progress of the video, the reply information may include recommended content determined based on the playback progress of the video, and then the server 400 may include a content recommendation server.

In this embodiment, the content recommendation server may store preset content associated with different playback progress intervals of the video in advance. The playback progress interval may be a time period or a time point, different playback progress intervals may be discontinuous or overlap with each other, the preset content types associated with different playback progress intervals may be the same or different, and the preset content associated with each playback progress interval may change with the user operation and time.

For example, a first progress interval of the video (e.g., the $0^{th}$ minute to $15^{th}$ minute of the video) can be associated with some recommended videos as the recommended content, a second progress interval (e.g., the $5^{th}$ minute to $20^{th}$ minute of the video) can be associated with some product recommendation information or purchase links as the recommended content, and a third progress interval (e.g., the $25^{th}$ minute to $30^{th}$ minute of the video) can be associated with some keywords which can be used to determine the recommended content. The playback progress of the video may be indicated by the video ID plus the play duration. After obtaining the information obtaining request, the content recommendation server firstly determines which playback progress interval the playback progress of the video falls into according to the video ID and the play duration, and then uses the preset content associated with the playback progress interval where the playback progress lands as the recommended content. For example, if the playback progress falls into the first progress interval, the recommended videos may be used as the recommended content; if the playback progress falls into the second progress interval, the product recommendation information or purchase links may be used as the recommended content; if the playback progress falls into the third progress interval, the keywords may be used for content search, and then the search result is used as the recommended content.

For another example, a specific video segment in the video may be associated with a set of preset content, which may include information on actors and corresponding roles appearing in the video segment, and may also include media resource information, product purchase links, etc. determined based on the play content in the video segment. If the video segment corresponding to the playback progress is the specific video segment, the preset content may be used as the recommended content.

Based on the implementations in this embodiment, the recognition of the screenshot image and the content recommendation function can be separated, so that the effect same as or similar to the recognition of the screenshot image can also be implemented even if the screenshot image is not recognized or the screenshot image is recognized in other ways than that in the embodiments of the disclosure.

It should be noted that the above embodiments are only some but not all the embodiments of the disclosure. The schemes or steps in different embodiments can be combined with each other to form new embodiments, which are not limited in the disclosure and will not be repeated here.

After receiving the reply information, the display apparatus 200 may further display the recommended content and other content included in the reply information through the display 275. In addition to displaying the recommended content and other content included in the reply information, the display apparatus 200 may also display the screenshot image or a thumbnail of the screenshot image, or other information that has been generated or obtained by the display apparatus 200.

According to different scenarios or different content recommendation servers, there may be many types of recommended content, and the reply information may include recommended content in different types. For example, the recommended content may include media resource recommendation information, product purchase links, travel recommendation information, etc. Depending on different types of recommended content, the ways to present the recommended content may also be different.

Figure 24A:
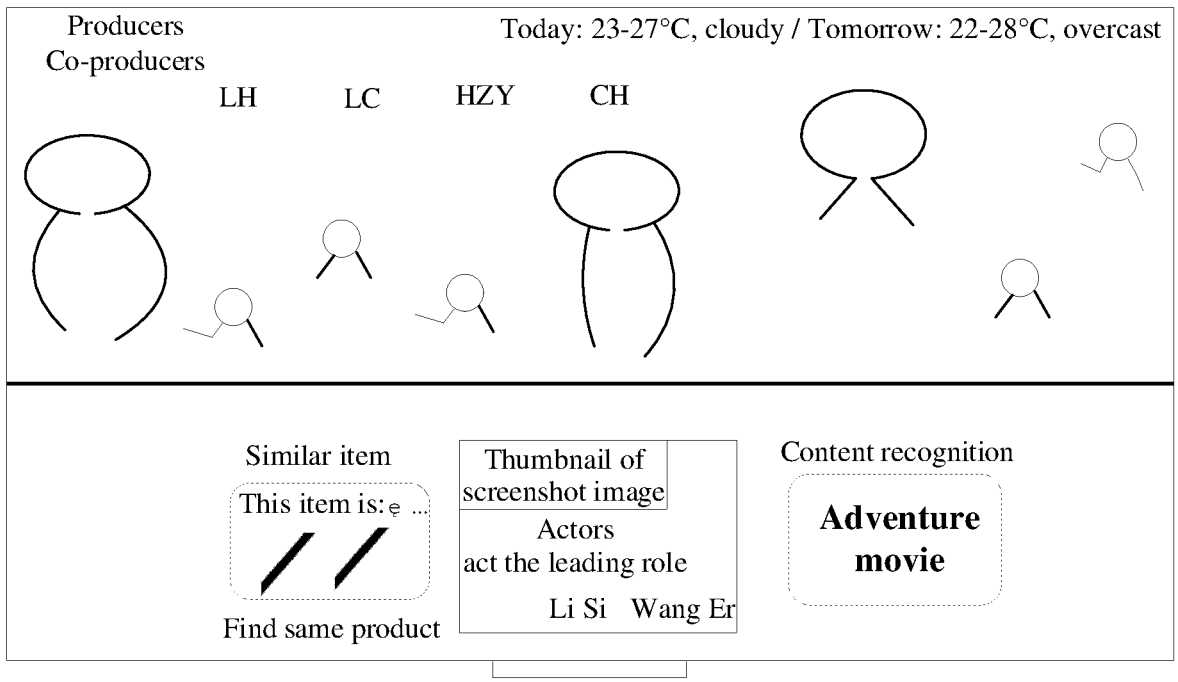
FIGS. 24A to 24F are schematic diagrams showing display effects of recommended content according to some embodiments.
Figure 24B:
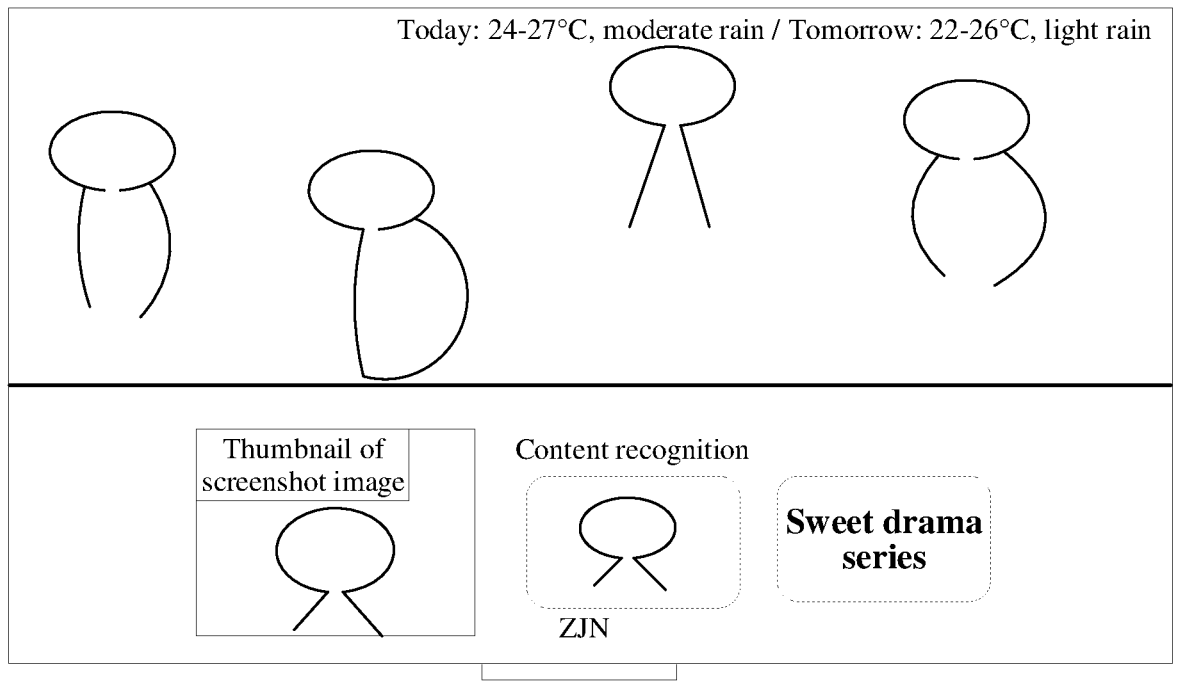
Figure 24C:
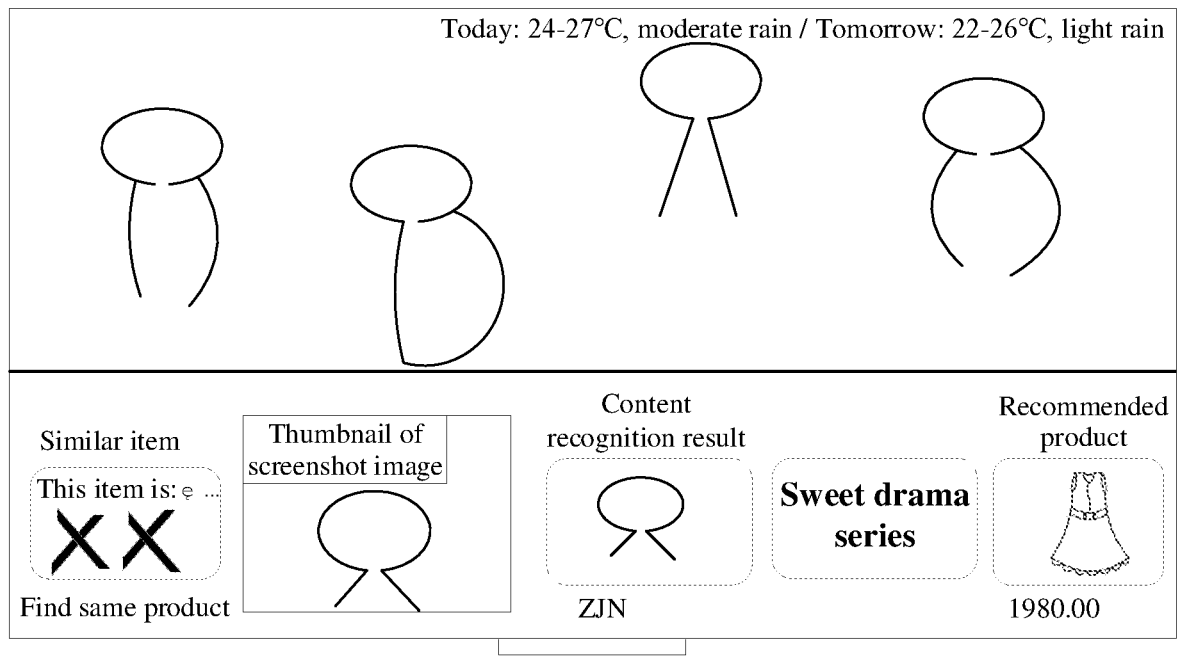
Figure 24D:
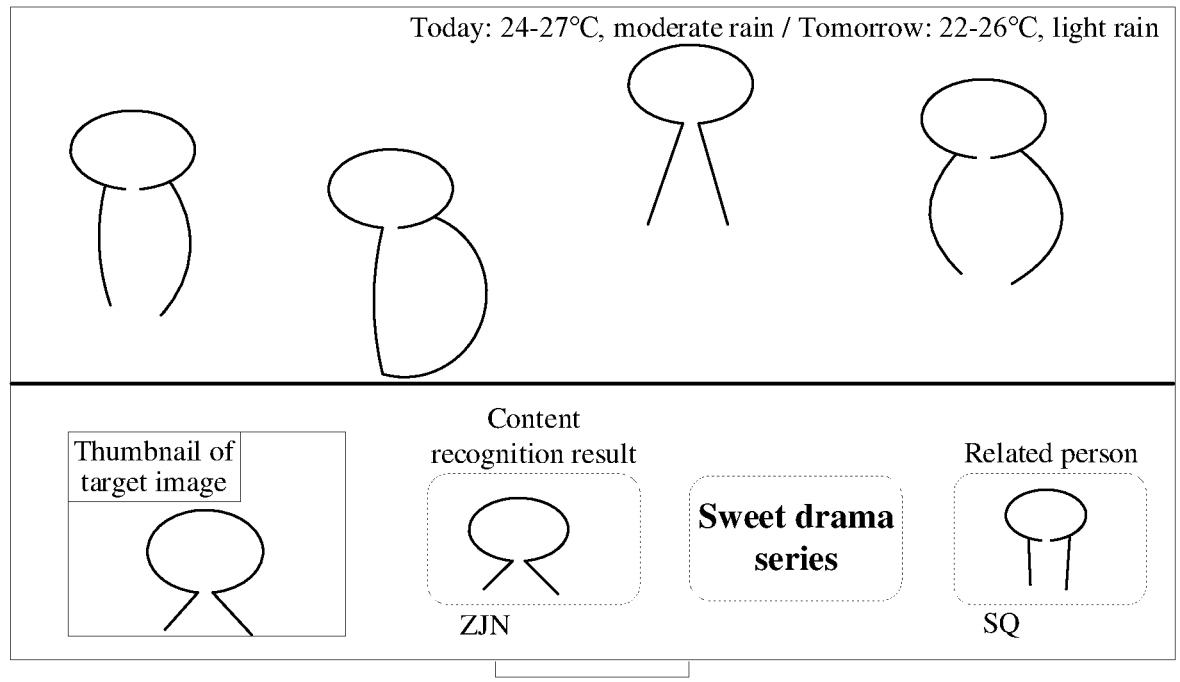
Figure 24E:
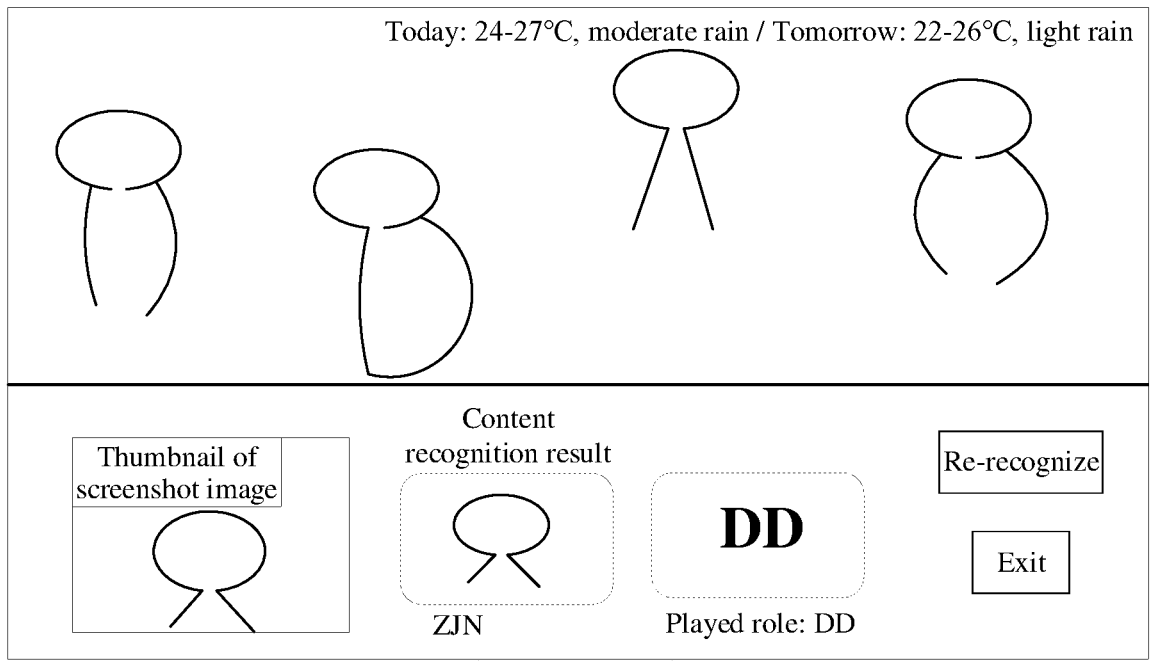

In some embodiments, the display apparatus 200 may be used to display the recommended content through a content recommendation interface. There may be at least one display area for displaying the recommended content in the content recommendation interface. When there are a plurality of recommended contents or the recommended content is of many different types, different display areas may be used to display different types of recommended content, for example as shown in FIG. 24A; or, the same display area may be used to display different recommended content periodically, for example as shown in FIG. 24B to FIG. 24C; in addition to the display area for displaying the recommended content, the content recommendation interface may also have at least one display area for displaying other information such as the thumbnail of the screenshot image, for example as shown in FIG. 24D. The content recommendation interface also includes a display area for displaying the thumbnail of the screenshot image, and a display area for displaying operation buttons and prompt information, for example as shown in FIG. 24E.

There may also be a variety of display modes for the content recommendation interface, which are described below by only some examples.

Figure 24F:
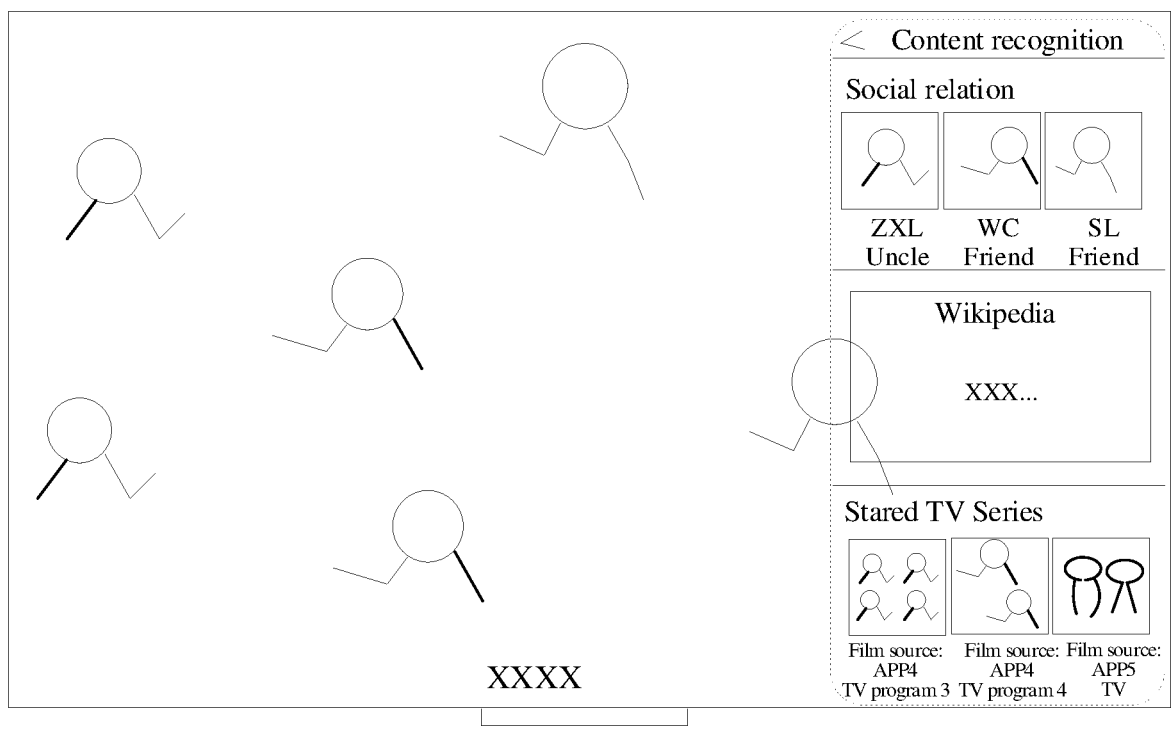

In some embodiments, the content recommendation interface may be superimposed on other interface in the form of a layer. The layer may be a semi-translucent, opaque, or partially-transparent layer, for example as shown in FIG. 24F. When the content recommendation interface is superimposed on other interface, the content displayed on the other interface or the content display mode may remain unchanged or may change temporarily until the content recommendation interface is no longer displayed. For example, if the content recommendation interface is superimposed on the video playing interface, the video playing interface may still maintain the video playing state (that is, without pausing or exiting from the video playing) or may not pause or exit from the video playing; if the content recommendation interface is superimposed on the menu interface, the menu interface may still maintain the periodic switch of the window content or control content, or the content of the menu interface may be frozen so that the menu interface does not change.

Figure 25:
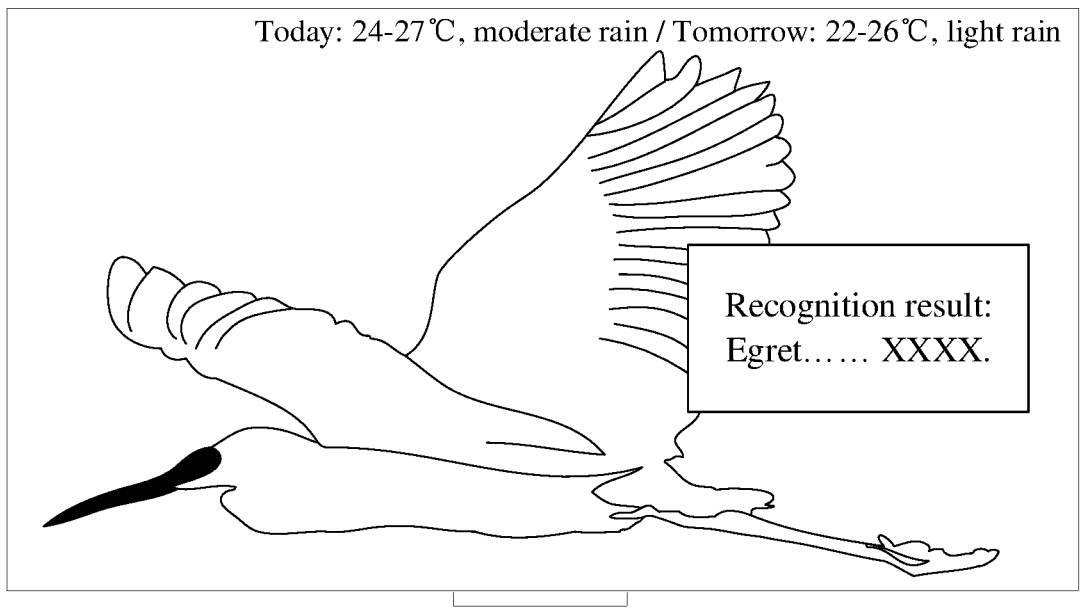
FIG. 25 is a schematic diagram showing the display effect of recommended content according to some embodiments.

In other embodiments, the content recommendation interface may be displayed in the form of a pop-up window, that is, the content recommendation interface may only occupy a partial area of the display screen, for example as shown in FIG. 25. When the content recommendation interface is displayed in the form of a pop-up window, the pop-up window may also be superimposed on other interface. Likewise, when the pop-up window is displayed, the content displayed on other interface or the content display mode may remain unchanged.

In other embodiments, the content recommendation interface may be a specific display interface, and the display apparatus 200 may skip from the currently displayed interface to the content recommendation interface. During the interface skip process, the display apparatus 200 may also display the corresponding transition effect or transition animation, which will not be illustrated in detail here.

Figure 26:
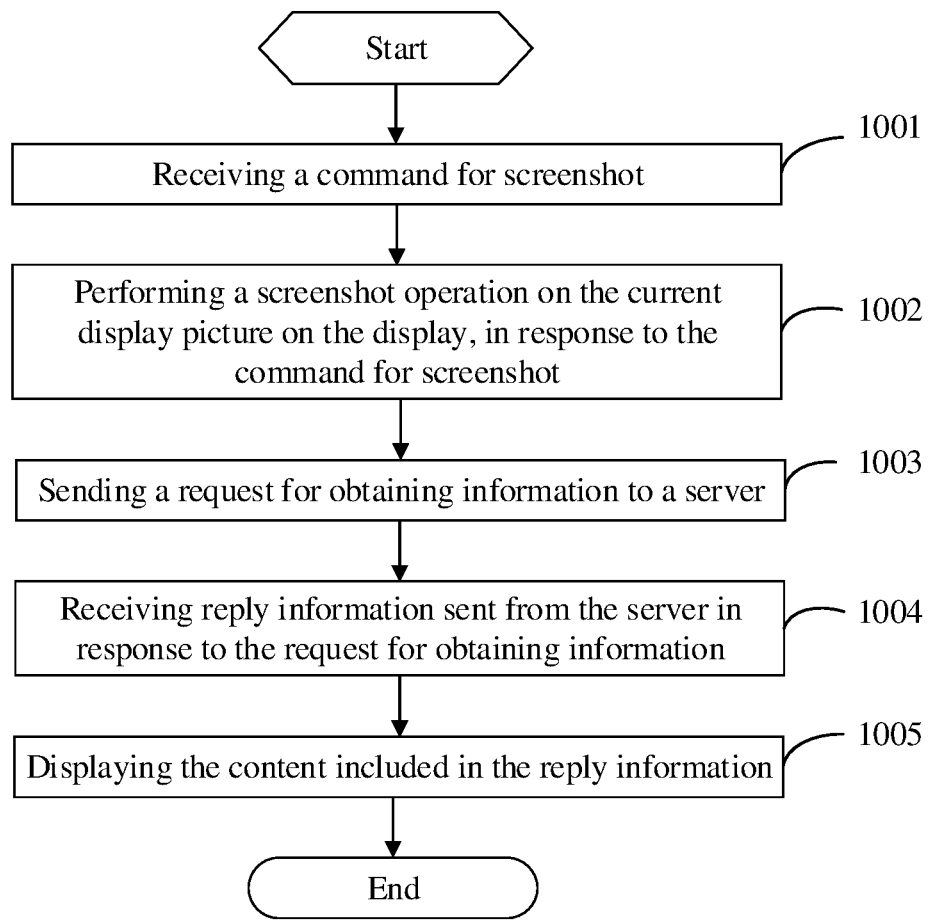
FIG. 26 shows a schematic flowchart of a content presentation method according to some embodiments.

Corresponding to the display apparatus in the foregoing embodiment, the disclosure further provides a content presentation method. As shown in FIG. 26, the content presentation method includes the following steps.

Step 1001: receiving a command for screenshot.

For how the display apparatus receives the command for screenshot, reference may be made to the foregoing description, which will not be repeated here.

Step 1002: performing a screenshot operation on the current display picture on the display, in response to the command for screenshot.

After receiving the command for screenshot, the display apparatus may perform the screenshot operation on the current display picture on the display to obtain a screenshot image. The specific implementation of the screenshot operation and the obtaining method of the screenshot image are not limited in the disclosure, and will not be repeated here.

Step 1003: sending a request for obtaining information to a server.

The display apparatus may send a request for obtaining information (which is also referred to as an information obtaining request) to the server when a predetermined condition is met. The predetermined condition may include: the screenshot image includes graphics in the playing video, and a confirmation operation from a user is received, etc. The information obtaining request may include context information corresponding to the screenshot image, and may also include the screenshot image, auxiliary information and other information.

Step 1004: receiving reply information sent from the server in response to the request for obtaining information.

There may be only one reply or multiple replies. When there are multiple replies, different replies may be sent from different servers. The number of the servers may be multiple, and the types may be multiple. The reply information may include the recommended content corresponding to the context information, and may also include a recognition result of the screenshot image, such as the facial feature information for recognition in the screenshot image, or may include other information. For related portions, reference may be made to the foregoing embodiments, and details will not be repeated here.

Step 1005: displaying the content included in the reply information.

After receiving the reply information, the display apparatus may display all or some of the content included in the reply information. For example, the recommended content or the recognition result included in the reply information may be displayed.

Displaying the content included in the reply information may refer to displaying the content itself included in the reply information, or displaying a processing result obtained after further processing the content included in the reply information, or displaying the content obtained by further searching based on the content included in the reply information, which is not limited in the disclosure.

Based on the content presentation method provided in the disclosure, the problem of too tedious displayable content caused by the content display based on the recognition result of the screenshot image can be avoided, so that the recognized content is more abundant.

Since the above embodiments can be used and combined with other embodiments, different embodiments all have the same parts, and the same or similar parts among various embodiments in the specification can refer to each other, which will not be described in detail here.

What is claimed is:

1. A display apparatus, comprising:
    a display,
        a user input interface configured to receive a command from a user;
        a controller, in communication with the display and the user input interface, and is configured to:
        while the display is presenting a display interface, receive a command for information on the display interface, where the information on the display interface comprises one or more person objects;
        in response to the command for information on the display interface, obtain associated information on the display interface and generate a scene image for recognition;
        obtain facial feature information for recognition corresponding to the one or more person objects in the scene image;
        in response to a matching confidence level of pre-stored facial feature information in a database with the facial feature information for recognition not exceeding a preset confidence level, obtain similar facial feature information, wherein the similar facial feature information is first pre-stored facial feature information whose matching confidence level with the facial feature information for recognition satisfies a preset condition, and the database is configured in a server and comprises a collection of pieces of pre-stored facial feature information;
        obtain average-person recognition data, wherein the average-person recognition data is presentation data corresponding to a person recognized in the scene image, and the average-person recognition data comprises presentation data corresponding to the facial feature information for recognition and presentation data corresponding to the similar facial feature information;
        generate a sharing control for the facial feature information for recognition, wherein the sharing control is configured for sharing the average-person recognition data and available for selection from a user; and
        control the display to present the average-person recognition data and the sharing control on an interface;
    wherein the controller is further configured to:
        control to pop up an information floating layer on the interface of the display, wherein the information floating layer comprises a person area, a similarity area, a face score area and a sharing area, wherein the person area comprises one or more person controls each comprising a thumbnail of a person's head portrait and available for selection from the user;
        in response to a focus being moved to a different person control, control to update the information floating layer with average-person recognition data of a different person corresponding to the different person control;
    wherein:
        the similarity area is configured to present a similar star;
        the face score area is configured to present a face score data; and
        the sharing area is configured to present the sharing control.

2. The display apparatus according to claim 1, wherein the controller is further configured to:
    in response to a matching confidence level of a pre-stored facial feature information in the database with the facial feature information for recognition exceeding the preset confidence level, obtain standard facial feature information, wherein the standard facial feature information is second pre-stored facial feature information whose matching confidence level with the facial feature information for recognition is highest;
    obtain profile information and related media resource corresponding to the standard facial feature information.

3. The display apparatus according to claim 1, wherein the facial feature information for recognition comprises position information of facial features, and the controller is further configured to:
    obtain a thumbnail of a person's head portrait taken from the scene image according to the position information of facial features;
    obtain the face score data generated after comparing the facial feature information for recognition with a facial feature template;
    add a figure identifier to the thumbnail of the person's head portrait according to the face score data;
    determine the similar star through the similar facial feature information, and obtain profile information and related media resource corresponding to the similar star.

4. The display apparatus according to claim 3, wherein the similarity area comprises a plurality of star controls corresponding to a plurality of similar stars respectively, and the controller is further configured to:
    control the information floating layer to skip to a similar star details page in response to the similarity area getting the focus and being confirmed, wherein the similar star details page comprises the similarity area, a profile area and a media resource area, wherein the profile area is configured to present profile information of the similar star, and the media resource area is configured to present related media resource of the similar star.

5. The display apparatus according to claim 3, wherein the controller is further configured to:
generate a character string according to the figure identifier and a timestamp for generating the scene image, a domain name of a server and an identifier of the display apparatus, wherein the server is a server that extracts facial feature information in the scene image;
generating a two-dimensional code according to the character string.

6. The display apparatus according to claim 1, wherein the command for information on the display interface comprises:
a recognition command input from a user by pressing a particular button on a remote controller.

7. The display apparatus according to claim 6, wherein the controller is further configured to:
in response to a press time of the particular button on the remote controller not exceeding a preset startup duration, take a screenshot of the display interface on the display and generate a screenshot image.

8. The display apparatus according to claim 7, wherein the controller is further configured to: in response to the press time of the particular button on the remote controller exceeding the preset startup duration, record the display interface on the display and generate a screen recording file.

9. The display apparatus according to claim 8, wherein the controller is further configured to:
in response to the press time of the particular button on the remote controller exceeding the preset startup time, recording the display interface starting from a time point of receiving the command for information on the display interface;
controlling the display interface to alternatively present a screen recording control for indicating a screen recording duration and a screen recording control for indicating that a screen recording is performing.

10. The display apparatus according to claim 9, wherein the controller is further configured to:
in response to a stop command from the user by releasing the particular button, stopping recording the display interface and generating the screen recording file.

11. The display according to claim 9, wherein the controller is further configured to:
in response to the press time of the particular button exceeding a preset upper-limit duration, stopping recording the display interface and generating the screen recording file.

12. The display apparatus according to claim 1, where the command for information on the display interface comprises a recognition command in voice form from a user.

13. The display apparatus according to claim 1, wherein the controller is further configured to:
after generating the scene image, in response to a partial recognition command, display at least one partial recognition frame on an interface presenting the scene image;
in response to a confirmation command associated with the partial recognition command, send at least one selected image to the server, wherein the selected image is an image of an area enclosed by the partial recognition frame in a target display interface;
receive a recognition result based on the selected image from the server, wherein the recognition result comprises the facial feature information for recognition.

14. The display apparatus according to claim 1, wherein the display interface comprises an image from a playing video, the controller is further configured to:

send an information obtaining request to the server, wherein the information obtaining request comprises context information corresponding to the scene image, wherein the context information comprises information of the playing video and progress time corresponding to the scene image;
receive reply information based on the information obtaining request from the server, wherein the reply information comprises facial feature information for recognition corresponding to the context information.

15. A method for person recognition and presentation, comprising:
while a display of a display apparatus is presenting a display interface, receiving a command for information on the display interface via a user input interface of the display apparatus, where the information on the display interface comprises one or more person objects;
in response to the command for information on the display interface, obtaining associated information on the display interface and generating a scene image for recognition;
obtaining facial feature information for recognition corresponding to the one or more person objects in the scene image;
in response to a matching confidence level of pre-stored facial feature information in a database with the facial feature information for recognition not exceeding a preset confidence level, obtaining similar facial feature information, wherein the similar facial feature information is first pre-stored facial feature information whose matching confidence level with the facial feature information for recognition satisfies a preset condition, and the database is configured in a server and comprises a collection of pieces of pre-stored facial feature information;
obtaining average-person recognition data, wherein the average-person recognition data is presentation data corresponding to a person recognized in the scene image, and the average-person recognition data comprises presentation data corresponding to the facial feature information for recognition and presentation data corresponding to the similar facial feature information;
generating a sharing control for the facial feature information for recognition, wherein the sharing control is configured for sharing the average-person recognition data and available for selection from a user;
controlling the display to present the average-person recognition data and the sharing control on an interface;
wherein the method further comprises:
popping up an information floating layer on the interface of the display, wherein the information floating layer comprises a person area, a similarity area, a face score area and a sharing area, wherein the person area comprises one or more person controls each comprising a thumbnail of a person's head portrait and available for selection from the user;
in response to a focus being moved to a different person control, updating the information floating layer with average-person recognition data of a different person corresponding to the different person control;
wherein:
the similarity area is configured to present a similar star;
the face score area is configured to present a face score data; and
the sharing area is configured to present the sharing control.

16. The method for person recognition and presentation according to claim 15, further comprising:
   in response to a matching confidence level of a pre-stored facial feature information in the database with the facial feature information for recognition exceeding the preset confidence level, obtaining standard facial feature information, wherein the standard facial feature information is second pre-stored facial feature information whose matching confidence level with the facial feature information for recognition is highest;
   obtaining profile information and related media resource corresponding to the standard facial feature information.

17. The method for person recognition and presentation according to claim 15, wherein the facial feature information for recognition comprises position information of facial features, the method further comprises:
   obtaining a thumbnail of a person's head portrait taken from the scene image according to the position information of facial features;
   obtaining the face score data generated after comparing the facial feature information for recognition with a facial feature template;
   adding a figure identifier to the thumbnail of the person's head portrait according to the face score data;
   determining the similar star through the similar facial feature information, and obtain profile information and related media resource corresponding to the similar star.

18. The method for person recognition and presentation according to claim 15, further comprising:
   after generating the scene image, in response to a partial recognition command, displaying at least one partial recognition frame on an interface presenting the scene image;
   in response to a confirmation command associated with the partial recognition command, sending at least one selected image to the server, wherein the selected image is an image of an area enclosed by the partial recognition frame in a target display interface;
   receiving a recognition result based on the selected image from the server, wherein the recognition result comprises the facial feature information for recognition.

19. The method for person recognition and presentation according to claim 15, wherein the display interface comprises an image from a playing video, the method further comprises:
   sending an information obtaining request to the server, wherein the information obtaining request comprises context information corresponding to the scene image, wherein the context information comprises information of the playing video and progress time corresponding to the scene image;
   receiving reply information based on the information obtaining request from the server, wherein the reply information comprises facial feature information for recognition corresponding to the context information.

* * * * *